(12) United States Patent
Wilson et al.

(10) Patent No.: US 9,734,490 B1
(45) Date of Patent: *Aug. 15, 2017

(54) SYSTEMS AND DEVICES CONTROLLED RESPONSIVE TO DATA BEARING RECORDS

(71) Applicant: DadeSystems, LLP, Miami, FL (US)

(72) Inventors: David L. Wilson, Palmetto Bay, FL (US); Douglas M. Hathaway, Miami, FL (US); Carlos Rodriguez Buehl, Miami, FL (US); Pilar E. Rodriguez, Palmetto Bay, FL (US)

(73) Assignee: DADESYSTEMS, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,039

(22) Filed: Aug. 16, 2016

Related U.S. Application Data

(63) Continuation of application No. 15/165,066, filed on May 26, 2016, which is a continuation-in-part of application No. 14/658,148, filed on Mar. 14, 2015, now Pat. No. 9,449,312.

(60) Provisional application No. 62/204,691, filed on Aug. 13, 2015, provisional application No. 62/292,593, filed on Feb. 8, 2016.

(51) Int. Cl.
*G06K 7/00* (2006.01)
*G06Q 20/10* (2012.01)
*G06K 7/14* (2006.01)
*G06Q 30/02* (2012.01)

(52) U.S. Cl.
CPC .......... *G06Q 20/10* (2013.01); *G06K 7/1417* (2013.01); *G06Q 30/0207* (2013.01)

(58) Field of Classification Search
USPC ......... 235/375, 379, 380, 383; 705/5, 35–45
See application file for complete search history.

(56) References Cited

U.S. PATENT DOCUMENTS

| 9,449,312 | B1 * | 9/2016 | Wilson | G06Q 20/042 |
| 2014/0006194 | A1 * | 1/2014 | Xie | G06Q 20/3278 705/21 |
| 2014/0270463 | A1 * | 9/2014 | Narendra | G06Q 20/08 382/137 |
| 2015/0302377 | A1 * | 10/2015 | Sweitzer | G06Q 20/20 705/17 |

* cited by examiner

*Primary Examiner* — Matthew Mikels
(74) *Attorney, Agent, or Firm* — Ralph E. Jocke; Walker & Jocke

(57) ABSTRACT

A device (12, 312, 494) operates to cause financial transfers responsive to data read from data bearing records. The device includes a reader (20, 314) that is usable to read check data from financial checks. The reader is also usable to read record document data associated with goods provided to a purchaser. At least one circuit (54, 332) of the device is operative to cause a determination to be made that check data and/or record document data corresponds to stored data. Responsive to the determination, check data and record data are made available to a payee terminal (346).

23 Claims, 51 Drawing Sheets

FIG 9

CREDIT MEMO — 244
CM 1234

VENDOR No — 246
8204R

JOHN'S FARM FOODS

CUSTOMER No — 248
94AC71

PURCHASER

GOLDEN HARVEST BUFFET
3400 FINCH ROAD
PERRY, IL 43265 — 250

REASON FOR CREDIT

1 BSHL OVERRIPE TOMATOS

CREDIT $7.50 — 252

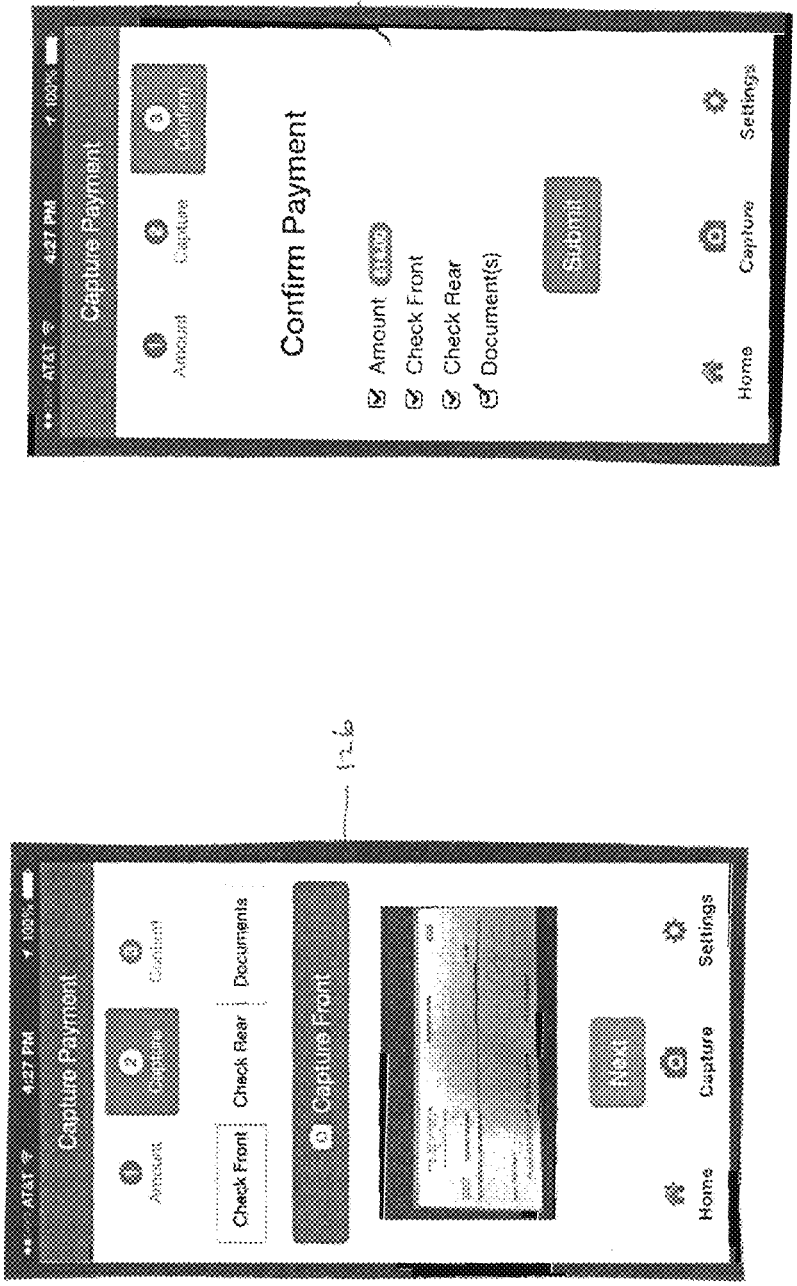

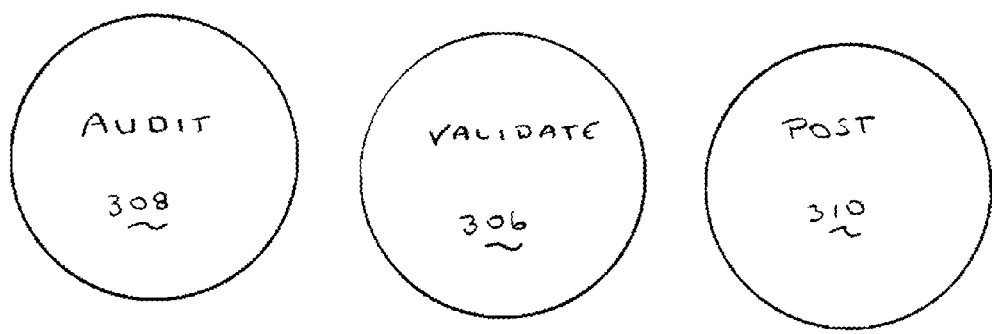
FIG 20

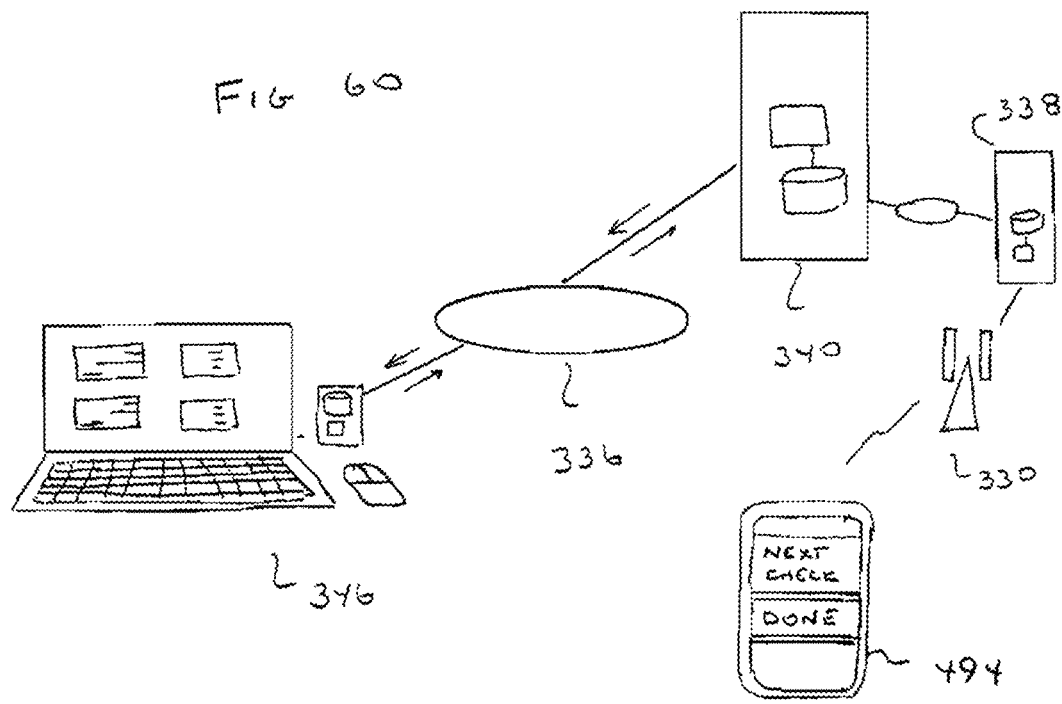
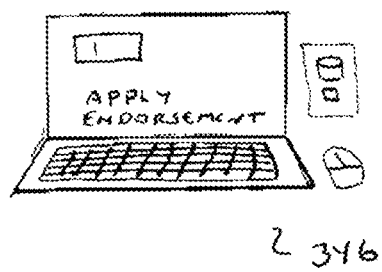
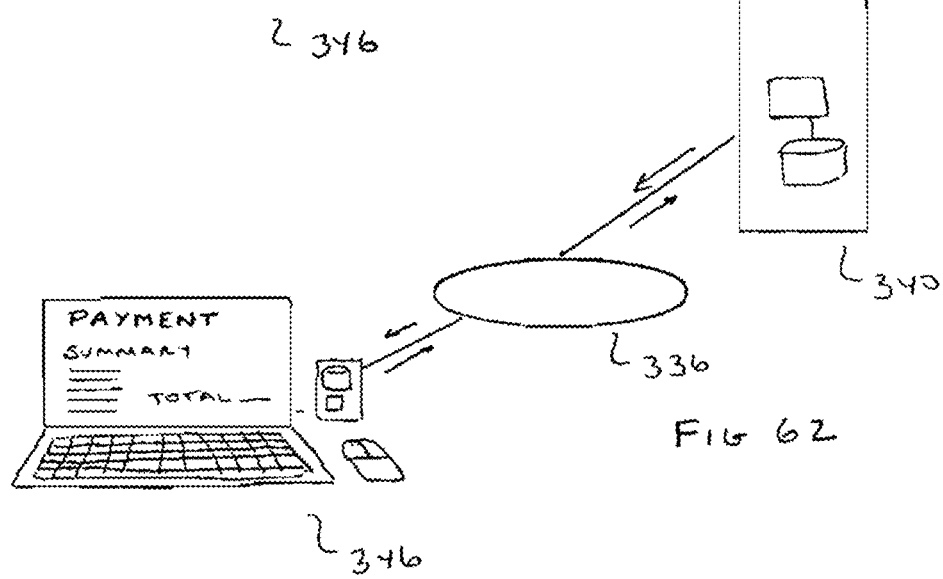

SYSTEMS AND DEVICES CONTROLLED RESPONSIVE TO DATA BEARING RECORDS

CROSS REFERENCE TO RELATED APPLICATIONS

This Application is a continuation of U.S. application Ser. No. 15/165,066 filed May 26, 2016, which application is a continuation-in-part of U.S. application Ser. No. 14/658,148 filed Mar. 14, 2015; which application is a continuation-in-part of U.S. application Ser. No. 13/486,497 filed Jun. 1, 2012.

U.S. application Ser. No. 15/165,066 also claims priority pursuant to 35 U.S.C. §119(e) of U.S. Provisional Applications 62/204,691 filed Aug. 13, 2015 and 62/292,593 filed Feb. 8, 2016.

TECHNICAL FIELD

This invention pertains to systems and devices controlled by data bearing records which may be classified in U.S. Class 235, Subclass 379. In exemplary embodiments, such systems include devices that read identifying information from records including financial checks and other documents, and cause the devices to be controlled responsive to the data read to carry out financial transfers.

BACKGROUND

Systems and devices are known which read data bearing records such as user cards, checks, vouchers, invoices, receipts and other items. Such readers may include optical readers, imagers, scanners, magnetic readers, radiation readers, radio frequency signal readers and other types of reading devices. Such systems and devices may operate to compare data read from such data bearing records to stored data for purposes of making a determination if the data that has been read corresponds to an authorized user, account or participant. The results of the comparison may be indicative that a transaction is authorized, and such devices and systems operate on the basis of a favorable comparison to control the devices to enable financial transfers between accounts. Such systems may also include devices for perfecting and/or documenting such financial transfers such as printing or recording devices which operate to provide documentation of the transactions and/or financial transfers.

Such systems may benefit from improvements.

SUMMARY

The exemplary embodiments relate to devices and systems which read data from data bearing records. Such records include financial checks, invoices and other documents associated with financial transfers. The exemplary device is operative to read the data from such documents and cause the data read to be compared to stored data regarding authorized system users. In response to a positive determination, the device and systems are controlled to carry out financial transfers between accounts of system users. Recording means are operated to perfect and document the control of the system in the making of such transfers.

Some exemplary embodiments include devices that are configured to be carried by individuals who deliver goods such as food items to restaurants or similar eating establishments. In some exemplary systems, the device includes a reader that is configured for reading invoices, credit items or other documents related to deliveries to such establishments. Exemplary devices are also operative to read data from financial checks or other records which correspond to forms of payment presented by the recipients of such goods. Some example embodiments are operative to cause a comparison to be made between the data read from the records to stored data to determine if a transaction is authorized, as well as the nature and amounts of such transactions, and to cause appropriate transfers between the accounts of such establishments and entities providing goods or deliveries thereto. The devices, systems and principles described herein may also be applied to other types of transaction environments.

BRIEF DESCRIPTION OF DRAWINGS

FIG. 9 is a schematic view of an invoice record highlighting areas of invoice data that may be used in an exemplary system.

FIG. 10 is a schematic view of a credit item highlighting items of credit item data that may be used in an exemplary system.

FIGS. 11-17 are exemplary display outputs from a device that is operated by an individual in connection with an exemplary system for the delivery of food goods to restaurants or similar establishments.

FIG. 20 is a schematic view of functional program elements associated with an exemplary system.

FIGS. 60-62 are schematic views of portions of the exemplary system shown in FIG. 48 representing the display of record document data and check data at a payee terminal.

DETAILED DESCRIPTION

Figure 1:
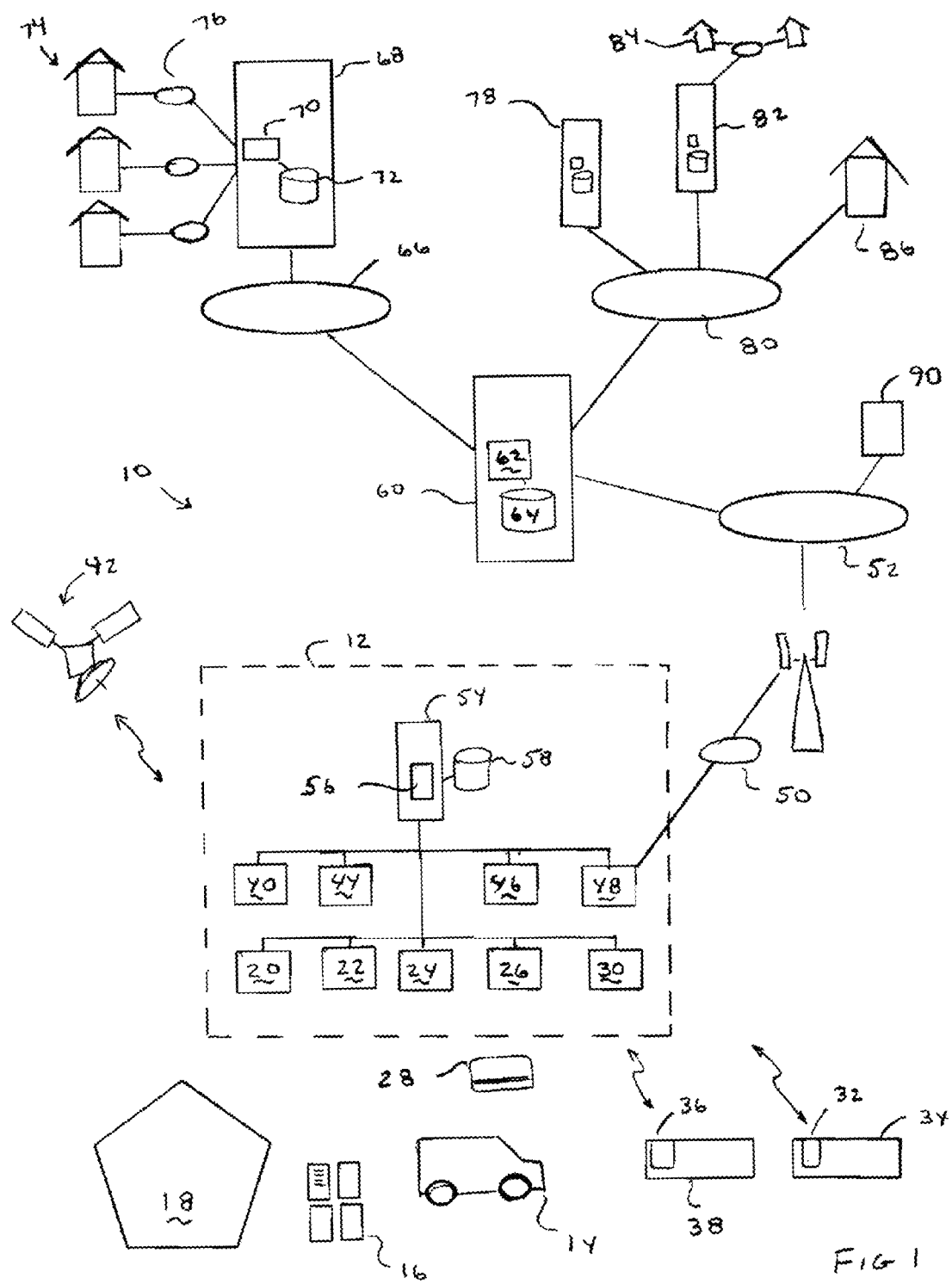
FIG. 1 is a schematic view of an exemplary system controlled responsive to data bearing records.

Referring now to the drawings and particularly to FIG. 1, there is shown therein an exemplary system generally indicated 10. System 10 includes a device 12 shown schematically. In exemplary embodiments, device 12 is configured to be carried by an individual. In some example arrangements, the individual is a person who drives a delivery vehicle schematically indicated 14, and who delivers goods schematically indicated 16 to purchaser establishments 18. In some exemplary embodiments, the goods delivered include food items which are delivered by the individual to purchasers who operate eating establishments such as restaurants. However, this use for the principles discussed herein is exemplary and such systems may be used in other types of transaction environments as later discussed herein.

The exemplary device 12 includes at least one reader 20. In the exemplary embodiment the reader includes an image scanner that is operative to read data included in documents such as checks, invoices and credit items as hereinafter discussed.

The exemplary device 12 further includes a display 22. In exemplary arrangements, the display 22 is a display that provides outputs of visual indicia that can be perceived by the individual who carries the device. In some arrangements, display 22 may be a touch screen type display which provides outputs and also serves as an input device. Exemplary devices may also include other types of displays such as projection displays which can provide perceivable outputs on items which can be viewed by a user. This may include surfaces adjacent to the device including, for example, a body surface of a user who wears the device. Exemplary displays may also include a lens such as a transparent lens that may be worn by a user operating the device. Of course these types of displays are exemplary.

The exemplary device 12 further includes at least one input device 24. Input device 24 may include a manual input device which is configured for receiving alphabetical and/or numerical inputs such as a keypad or keyboard. In some arrangements, input device 24 may include a contact surface of a touch screen display. In other arrangements, input device 24 may include an audible input device which is suitable for receiving inputs in the form of voice commands from an individual. In other embodiments, the at least one input device 24 may include a pointing device, a device for tracking eye movements in a field of view of a user, or other device through which one or more inputs may be provided.

The exemplary device 12 further includes a card reader 26. The exemplary card reader 26 is operative to read data on data bearing records such as financial cards schematically indicated 28. Card reader 26 in some exemplary embodiments may be configured to read magnetic data such as magnetic stripe data associated with a financial card such as a credit card or debit card. In other arrangements, card reader 26 may be operative to read chip data such as an EMV chip which provides account data as well as security data from a financial card or other device. In other exemplary arrangements, the card reader 26 may include a wireless reader that is operative to receive data wirelessly from a user card or similar article. Such wireless data may include radio frequency data exchanged with a card that includes user or financial account identifying data for a financial account with which the card is associated. In still other arrangements, the card reader 26 may be operative to read RFID tags or other card or item data which corresponds to a purchaser and/or purchaser financial accounts to which amounts can be charged and/or credited.

The exemplary device 12 further includes a wireless communication port 30. In example arrangements, the wireless communication port 30 provides a wireless interface through which the device can communicate with other devices and systems in proximity to the device. In some exemplary arrangements, the wireless port 30 may include a Bluetooth interface or a Near Field Communication (NFC) interface. In still other arrangements, the wireless port may enable communication via other types of RF communication or through infrared (IR) or other types of communication.

In some example systems, the wireless port 30 operates to communicate with devices that are used by the individual in connection with delivering goods to purchasers. For example, the wireless port 30 may enable the device to communicate with a wireless interface of a printer circuit 32 associated with a printer 34. Printer 34 may be associated with the individual and used to print documents associated with goods delivery or other transaction activities. Such documents may include receipts for payments, packing slips, payment acknowledgments, invoices, credit items or other documents that the individual using the device 12 may need to print in the course of the activities associated with the system.

Other example devices with which an exemplary wireless port 30 may communicate include a wireless interface of a depository circuit 36. The depository circuit may be associated with a depository 38. The depository 38 may include a safe, strongbox or similar structure which is included in the delivery vehicle 14 operated by the individual. In exemplary arrangements, the depository 38 may be used to hold cash, checks, credit items or other items of value that the individual receives from purchasers in the course of activities related to the system.

In other example arrangements, the wireless port 30 may be used to communicate with other types of devices and systems. Further it should be appreciated that the functionality of the wireless port 30 may be combined with or included as a part of other components of the device such as the at least one input device 24 and/or the card reader 26.

The exemplary device 12 further includes a global positioning system (GPS) receiver 40. The exemplary GPS receiver 40 is operative to receive signals from GPS satellites schematically indicated 42. The GPS receiver is operative to receive the GPS signals and enable a determination to be made concerning the location of the device 12. Further in exemplary embodiments it should be understood that the device 12 may also be used with wireless network based localization principles and techniques and/or other devices that are usable to enable a location determination of the device 12 to be made.

The exemplary device 12 further includes a biometric reader 44. The exemplary biometric reader is operative to read one or more types of biometric feature inputs from individuals. In exemplary arrangements the biometric reader is operative to read biometric feature inputs from the individual or individuals who are authorized to operate the device 12. The read biometric data is enabled to be used to verify that an individual is an authorized user of the device. Such verification that enables the device to be operated to carry out one or more functions is later explained.

In exemplary arrangements the biometric reader may include a fingerprint reader which is operative to read fingerprint typography data from one or more fingers of a user. Of course it should be understood that in other arrangements, other types of biometric reading devices such as those usable to identify features of a user's iris, retina, facial features or other identifying characteristics may be used. Further in some exemplary arrangements, the biometric reader functionality may be carried out through other components of the device such as at least one reader 20.

The exemplary device 12 further includes an audio interface 46. In the exemplary arrangements, the audio interface 46 includes one or more speakers and microphones through which audible outputs may be provided and audio inputs received. The audio interface 46 in exemplary embodiments provides capabilities for delivering instructions and information from the device to the individual using the device. The audio interface 46 of exemplary arrangements also enables the receipt of audible inputs and instructions from the individual who uses the device. Of course it should be understood that in exemplary arrangements, the audio input capability associated with the exemplary audio interface 46 may be accomplished through other components of the device such as the at least one input device 24.

The exemplary device 12 further includes a wireless communication interface 48 which is alternatively referred to herein as a transceiver. In the exemplary device the wireless communication interface includes a communication interface circuit or chip that enables communication with a cellular network 50 which enables the device to communicate with other networks such as a wide area network 52. Wide area network 52 may include public and/or private networks. Such wide area networks 52 may include a public network such as the Internet. Alternatively network 52 may include a private network that is limited to a particular group of users or systems. Of course it should be understood that wireless communication interface 48 of the device is exemplary of communication methods that may be used, and in alternative embodiments other types of wireless communications such as satellite communications or other data communication methodologies may be accommodated through suitable communication interfaces in addition to, or as alternatives for, wireless communication interface 48.

The exemplary device 12 further includes a processor circuit 54. The exemplary processor circuit includes circuitry suitable for carrying out the functions later described herein in detail. The exemplary processor circuit 54 includes one or more processor chips or chipsets 56 which are operative to execute computer executable instructions. Processor circuit 54 further includes a data store 58. Data store 58 includes one or more types of suitable data storage media. Such data storage media may include computer readable data and computer executable instructions which instructions may include non-transitory computer executable instructions that constitute programs for operating the device. It should be understood that such data stores may include suitable computer readable medium including solid state storage medium, magnetic storage medium, optical storage medium, random access memory, programmable read-only memory, hard drive storage memory or other suitable memory which can store computer executable instructions and data. Further, it should be understood that the processor circuit may include suitable circuits and components in the form of electronic hardware, software and other components so as to carry out the functions described herein. Such circuitry may include integrated circuits including, for example, an application specific integrated circuit (basic ASIC), a field programmable gate array (FPGA), solid state microprocessors, organic microprocessors and other similar devices that are suitable for carrying out the functions described herein. Structures for processor circuits may include, correspond to and utilize the principles described in the textbook entitled Microprocessor Architecture, Programming, and Applications with the 8085 by Ramesh S. Gaonker (Prentiss Hall, 2002), which is incorporated herein by reference in its entirety. Of course it should be understood that these processor circuit structures are exemplary and in other embodiments, other circuit structures for storing, processing, resolving and outputting information may be used. Processor circuits may alternatively be referred to herein as circuits, circuitry or processors.

It should be understood that exemplary device 12 has been described as including certain components and features. However, other devices which may be used in exemplary systems may include lesser or greater numbers of such devices as well as different devices. Further in exemplary arrangements, device 12 may include a specific purpose device which operates to carry out the functions described herein. However, in other arrangements, device 12 may include commercial devices such as a smart phone, tablet computer, laptop computer or other suitable device for purposes of carrying out the functions as described herein and other related or desirable functions which may be apparent to those having skill in the relevant art.

In exemplary arrangements, device 12 may communicate with one or more servers schematically indicated 60. Server 60 of exemplary arrangements may comprise a plurality of computing devices which include circuitry, processors, co-processors, controllers or other types of computing devices of the types previously discussed schematically indicated 62. The processors 62 are in operative connection with one or more data stores schematically indicated 64. While servers 60 schematically shown represent a server environment, it should be appreciated that the functions carried out by server 60 may be operated in a distributed computing environment such as in a cloud-based environment in which computer executable instructions are executed in numerous different computer devices that communicate across a local area network or a wide area network. Further in some exemplary arrangements the functions of the server 60 may be operated in a virtual processing environment such that the server 60 functions are carried out by different instances operating within a larger computing environment which includes redundant simultaneous operation of virtual servers to assure continuous operation of the server functions. Of course these approaches described are exemplary and in other arrangements, other approaches may be used.

In exemplary arrangements, server 60 is operative to carry out functions and operations such as those that are described in co-pending U.S. patent application Ser. No. 13/486,497 filed Jun. 1, 2012, the disclosure of which is incorporated herein by reference in its entirety. Such disclosed functionality which will not be fully repeated herein for purposes of brevity, includes the capability for sorting a "load" of transaction related information related to one or more vendors who participate in the system described. Such information may include, for example, delivery information, invoice information, accounts receivable information, customer information, information about goods/services, information about individuals who deliver goods, customer location information, device information, financial account information and other suitable information which may be utilized in connection with the operation of exemplary systems. Further, exemplary arrangements may be operable to carry out the processing of transactions between vendors and purchasers and to maintain respective account information therefor. Further exemplary arrangements may be operative to enable amounts received through transactions to be deposited in vendor accounts, deducted from purchaser accounts and otherwise accounted for through appropriate account processing. Further exemplary embodiments include capabilities described in the incorporated disclosure to analyze transaction information and to validate transaction information so that payments are properly applied to the corresponding transactions, and activities of participants in the system are properly accounted for.

In the exemplary system, server 60 is operatively in connection with a check presentment network schematically indicated 66. The exemplary check presentment network is operative to process check data including to present check image replacement documents to a financial institution on which received checks are drawn for payment. The exemplary check presentment network is further operative to route payments for checks that are paid upon presentment to the server 60 so that vendors who have received such checks may have the funds received added to their accounts. Further in exemplary arrangements, check presentment network 66 is operative to route checks that are dishonored upon presentment for return so that the nonpayment is promptly identified and appropriate actions can be taken through operation of the systems associated with server 60.

In the exemplary embodiment, the check presentment network 66 includes a plurality of servers 68, each of which includes associated processor circuitry 70 and data stores 72. In some exemplary arrangements, the check presentment network 66 may be a private network operated by a consortium of financial institutions such as banks who exchange for presentment, the checks that are deposited by their respective customers. In other arrangements, the check presentment network 66 may include a check presentment network operated by the U.S. Federal Reserve System. The Federal Reserve operates a check clearinghouse to process checks between regulated financial institutions. Such participating financial institutions are represented in FIG. 1 by banks 74. Banks 74 operate servers which include their respective financial account information. Such banks communicate through various different networks 76 which may utilize the same communications network as the check presentment network 66 or different network communications.

In exemplary arrangements, images of received checks along with electronic records including amount information for each respective check and the account information which identifies the financial account on which the check is drawn, is transmitted for presentment to the financial institution 74 which holds the financial account upon which the check has been written. If funds are available in the respective account to pay the check, the financial institution pays the funds corresponding to the check and assesses such funds to the account of its account holder. Such payments may be consolidated and processed through the network 66 so that the received funds are transmitted to the financial institution holding the account of the payee to whom the check amount is payable.

In situations where funds are not available to pay the check, the check is dishonored by the financial institution on which it is drawn when the check is presented for payment. Information concerning the dishonored check and the image thereof is sent to the bank of the payee of the check who has sought to deposit the check into the payee's account. The payee of the check is notified that the check was not paid, so in this exemplary embodiment the payee or operator of the system can take appropriate action. Such action may include re-presentment of the check for payment through the check presentment network 66. Alternatively other actions may be taken, such as to assess late charges, to discontinue the ability to purchase on credit, or other steps which are taken against the purchaser entity who provided the bad check. Of course this description of the activities carried out by check presentment networks is highly simplified, but is sufficient for purposes of understanding the exemplary embodiments.

The exemplary system 10 further includes the capabilities for the device to be in operative connection with one or more payment processing networks. Such payment processing networks may include, for example, servers associated with a credit card network 78. Credit card network 78 is accessible through one or more public or private networks schematically indicated 80. Credit card network 78 provides the capabilities for participants to charge for purchases against credit card accounts that are maintained by such participants. Such accounts may be affiliated with credit card organizations such as for example, VISA, MasterCard, Discover or American Express. Such credit card networks enable participants to make charges against their financial accounts for purchased items and then to make payment to such accounts for such purposes.

Alternatively the exemplary system has the capability for the device to be in operative connection with one or more debit card networks schematically represented by servers 82. Such debit card networks 82 are in operative connection with computers of financial institutions schematically indicated 84 in which entities hold checking accounts or similar accounts from which funds can be withdrawn. Debit card networks 84 enable participants to make payment for goods or services they receive through electronic funds transfers which accomplish deductions from the respective accounts.

Such debit card networks may be operated by entities such as Pulse, Vantiv, Cirrus, Star or Plus, for example.

Exemplary embodiments may also communicate with servers associated with financial institutions or other similar entities schematically indicated 86 that are operative to advance lines of credit to purchasers who participate in the system. Such lender institutions 86 may provide purchasers of goods with funds on an as-needed basis for purposes of carrying out purchaser business operations. Such lenders may operate systems so as to advance funds for payments in a manner similar to the payment of funds from checking accounts or credit accounts for such business entities who do not have such funds immediately on hand. Of course it should be understood that the types of financial networks which are accessible through operation of the system 10 are exemplary and in other arrangements, other or different types of financial related networks may be operated and accessed in conjunction with the system operation.

Exemplary embodiments are used in connection with systems in which one or more vendors deliver goods to purchasers and through which the vendors receive payment for the delivered goods. In exemplary arrangements, the goods include food items that are delivered to operators of eating establishments such as restaurants. However, in other arrangements other types of goods and payments may be handled. For example, exemplary systems may be utilized in connection with deliveries to retail outlets such as stores. Exemplary arrangements may also handle goods such as beverages including items such as beer and wine, the distribution of which may need to be tracked for regulatory and tax purposes. Other exemplary systems may be utilized to distribute other types of goods such as tires to service centers. Other exemplary systems may involve the distribution of auto parts to auto repair shops and/or to resellers. Other examples may involve the distribution of consumer products to retail outlets. Further embodiments may be used for the distribution of other goods such as drug items, ammunition or other things that require regulation and tracking. Example embodiments may be applied to various types of goods or services for which orders can be placed and payments can be received.

In the exemplary arrangement, the system is operated to receive orders for food items from purchasers. This process for receiving such orders is carried out in the exemplary embodiment by the central server arrangement 60. Of course it should be understood that in other exemplary arrangements, other servers or the portable devices themselves may be operative to carry out the functions that are described as being carried out by the central server.

Figure 2:
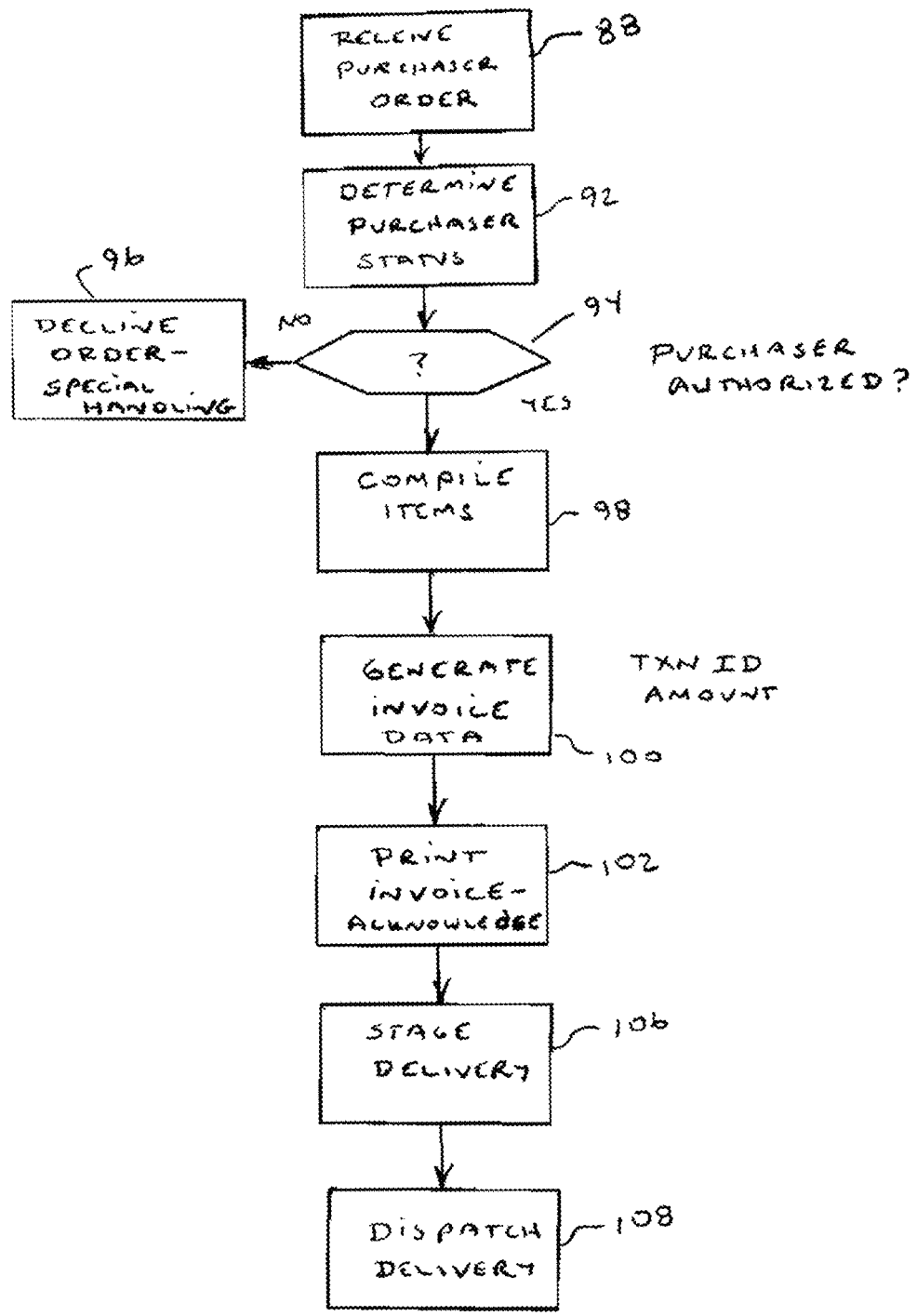
FIG. 2 is a schematic view of process steps carried out by the system in advance of a transaction involving a delivery of goods.

FIG. 2 shows a schematic view of the logic flow associated with the receipt of orders for goods through the central server. Orders from purchasers are received in a first logic step 88. The receipt of orders in step 88 may be accomplished by purchasers communicating goods orders to the central server from electronic terminals such as purchaser terminal 90 which is shown in FIG. 1. Purchaser terminal 90 may in some embodiments include a personal computer, smart phone, tablet or other suitable computing device that can present information associated with the purchaser and the desired goods to the central server. In exemplary arrangements, the purchaser terminal operates to communicate the purchaser's identity and if necessary, the purchaser location where the goods need to be delivered. Further, the purchaser terminal may communicate the type and quantity of the goods to be delivered. The purchaser terminal may also be operated to indicate the timing for the deliveries and to provide other information associated with the transaction to be carried out. In some exemplary arrangements, the central server may also provide to the purchaser terminal information about pricing, quality or other items that may be pertinent to the purchaser for purposes of placing their order. Of course it should be understood that these aspects of the purchase order placement step 88 are exemplary and in other arrangements, other approaches may be used.

In the exemplary logic flow represented in FIG. 2, central server 60 operates in accordance with its programming to determine if the purchaser attempting to place the order is authorized to use the system. Further in exemplary arrangements, the central server may operate to conduct other status checks concerning the purchaser such as whether the purchaser is in default of payments, over a credit limit, recently had a check dishonored or is otherwise not allowed to place orders through the system. This activity is represented by a step 92. The server then determines based on the information about the purchaser, whether the purchaser is authorized to place the order through the system as represented in a step 94. If the purchaser is determined not to be authorized to place the order, then the central server acts to cause the potential purchaser's request to be declined and/or sent to a special operation for handling in the manner appropriate for the particular purchaser. This is represented in a step 96.

If the purchaser placing the order is authorized, the central server 60 of the exemplary embodiment operates in accordance with its programming to cause the items associated with the order to be compiled. This is represented in a step 98. The compilation of the items may include for example sending information about what is to be included in the delivery corresponding to the order to a warehouse or other facility or individual so that the items to be delivered can be compiled and/or acquired for purposes of delivering them to the purchaser.

The exemplary central server then operates in accordance with its programming to generate the records associated with the particular purchase transaction. This includes generating invoice data for the requested delivery. The generation of invoice data which is represented in a step 100 includes in the exemplary embodiment, generating the information that will go on an invoice that corresponds to the delivery to be made. In the exemplary arrangement, this includes the generation of a transaction identifier, a listing of the items to be delivered, the amounts to be paid in connection with the delivered items, information identifying the vendor of the items and the purchaser of the items, a bar code or other indicia to be included in the invoice or related documents, and any other indicia to be included thereon. After the invoice data is generated, the central server 60 then operates in accordance with its programming to print the invoice document, acknowledgment document or other documents to be delivered with and/or which correspond to the particular transaction. This is represented in a step 102. For purposes of this disclosure an invoice will be deemed to include an invoice associated with a delivery of goods as well as separable portions thereof and separate record documents that are associated or provided with a delivery of goods. An invoice may include a remittance advice, payment stub, delivery acknowledgement or other record or portion thereof that includes indicia usable to identify the items provided to the purchaser and for the particular transaction associated therewith. In an exemplary arrangement, the system is operative to cause an invoice document to be printed at an appropriate location so that it can be received by the individual who is responsible for delivering the order. It should be understood that such a document may be printed at a printer that is remote from the central server 60. An example of an invoice which may be utilized in connection with some exemplary arrangements is represented by invoice 104 shown in FIG. 9.

In the exemplary arrangement, the exemplary central server 60 is operative to carry out the steps associated with staging the delivery. This is represented in FIG. 2 in a step 106. Staging the delivery may include, for example, directing that the items included in the delivery and that correspond to the order be sent to a particular location from which a delivery vehicle may be dispatched. Such staging may also include assigning a method for transporting the items to the purchaser facility where they are needed. Such staging delivery activities may also include assigning the delivery to a particular delivery vehicle or individual responsible for the territory in which the delivery is to be made. Staging the delivery may also include sending notifications and receiving confirmations so that everything necessary to complete the delivery of the items is in place.

After the completion of step 106 in staging the delivery, the central server 60 is then operative to cause the delivery to be dispatched. This is represented in a step 108. The dispatch of the delivery may include activities such as messages which cause the items in the particular order to be loaded into a particular vehicle. Dispatching the delivery may also include providing to the individual who makes the delivery through the delivery vehicle, instructions to stop at the purchaser's facility where the goods are needed and deliver the items. Further, the dispatch of the delivery may also include providing to the individual who will make the delivery, the invoice or other documents that are associated with the particular order. Additional steps may also include sending to the device associated with the individual, information about the particular order so that the individual knows to make the particular delivery. This may include, for example, providing information about the place, time, type and quantity of goods and other things that are required to be carried out in connection with the order. Of course it should be understood that the steps represented in FIG. 2 are exemplary high level steps. Additional steps are generally required in connection with order scheduling, management and delivery. Further in other embodiments other or different steps may be carried out.

Figure 3:
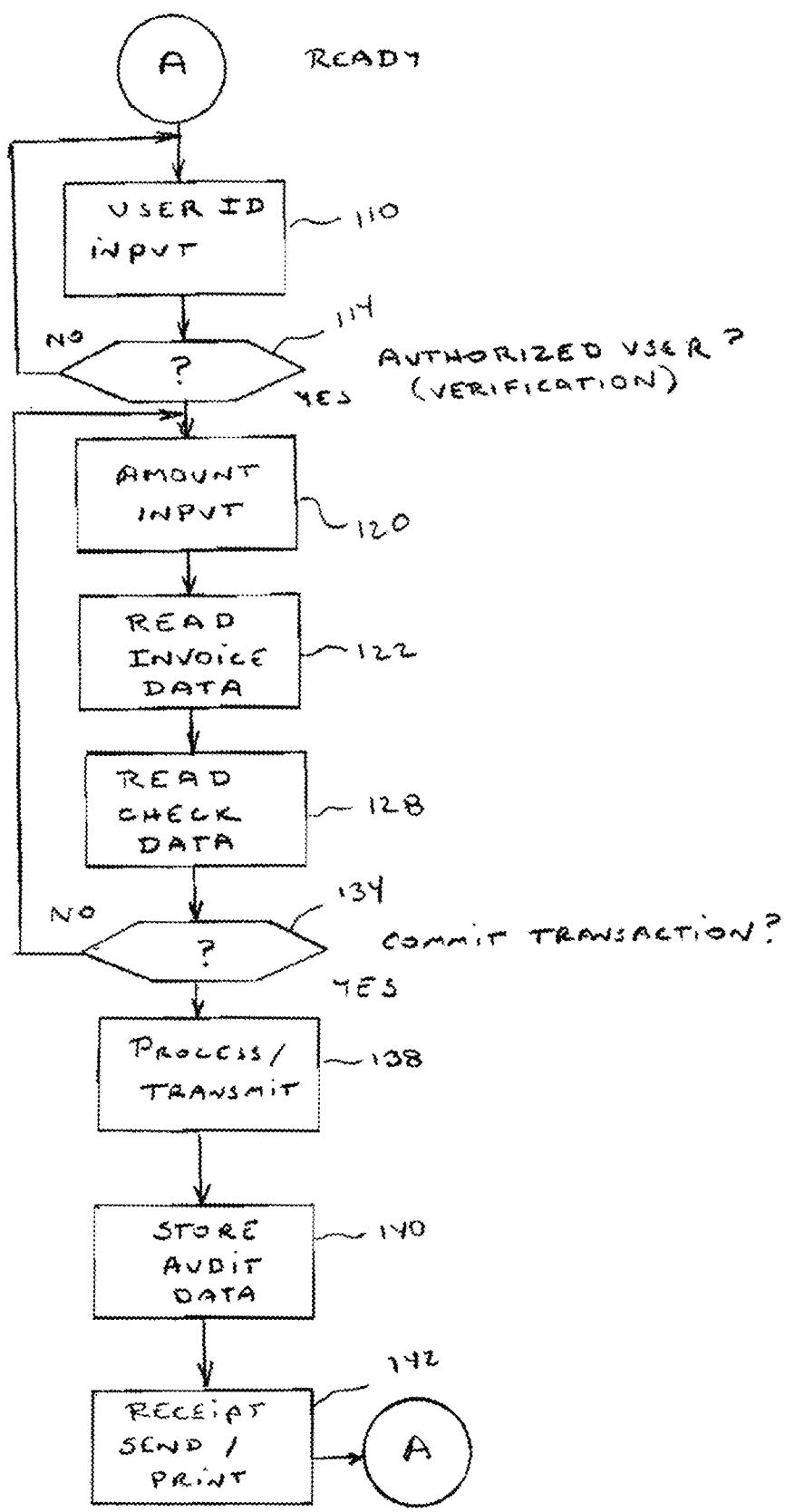
FIGS. 3-5 are schematic views of logic flow carried out in connection with an exemplary device and system.
Figure 4:
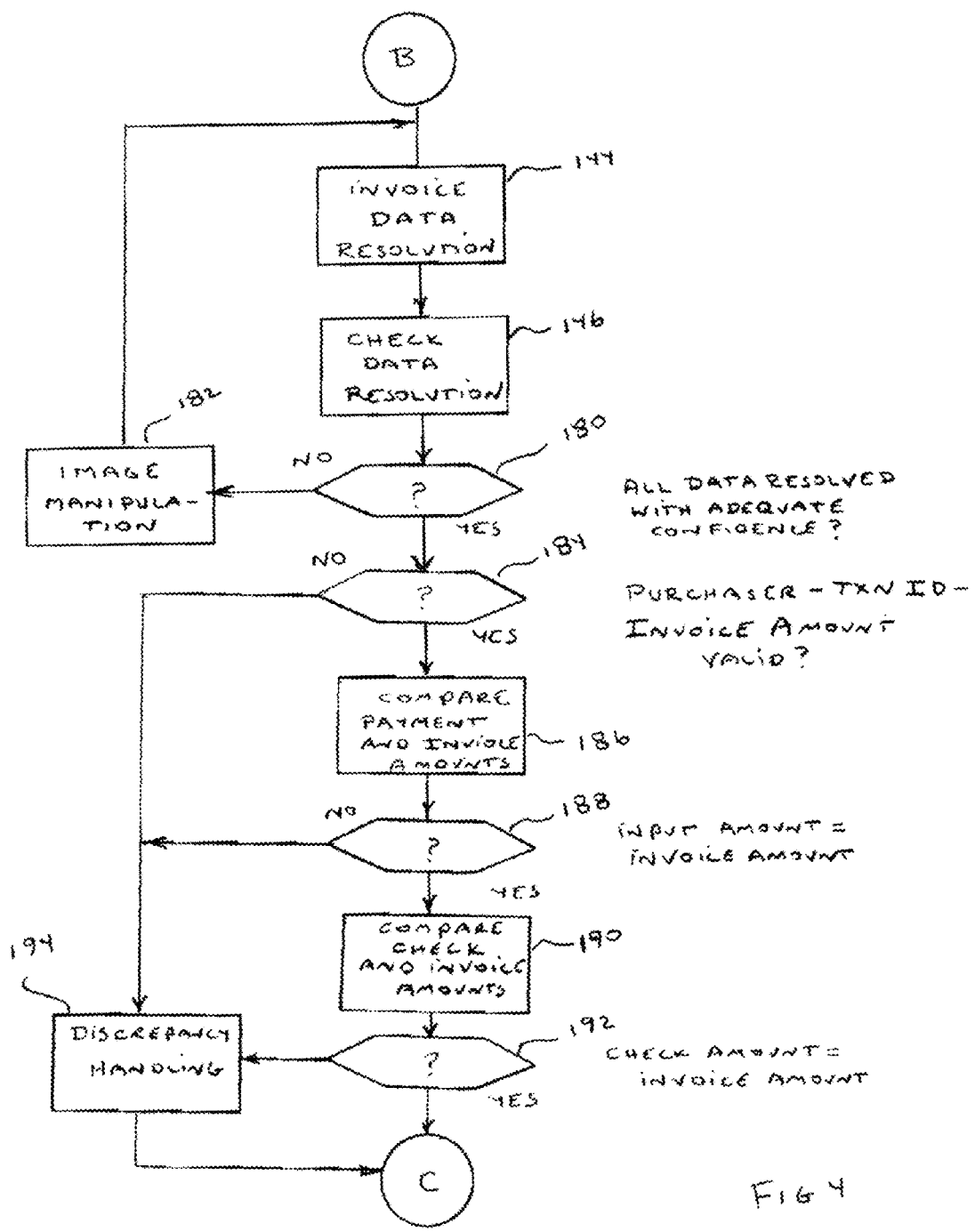
Figure 5:
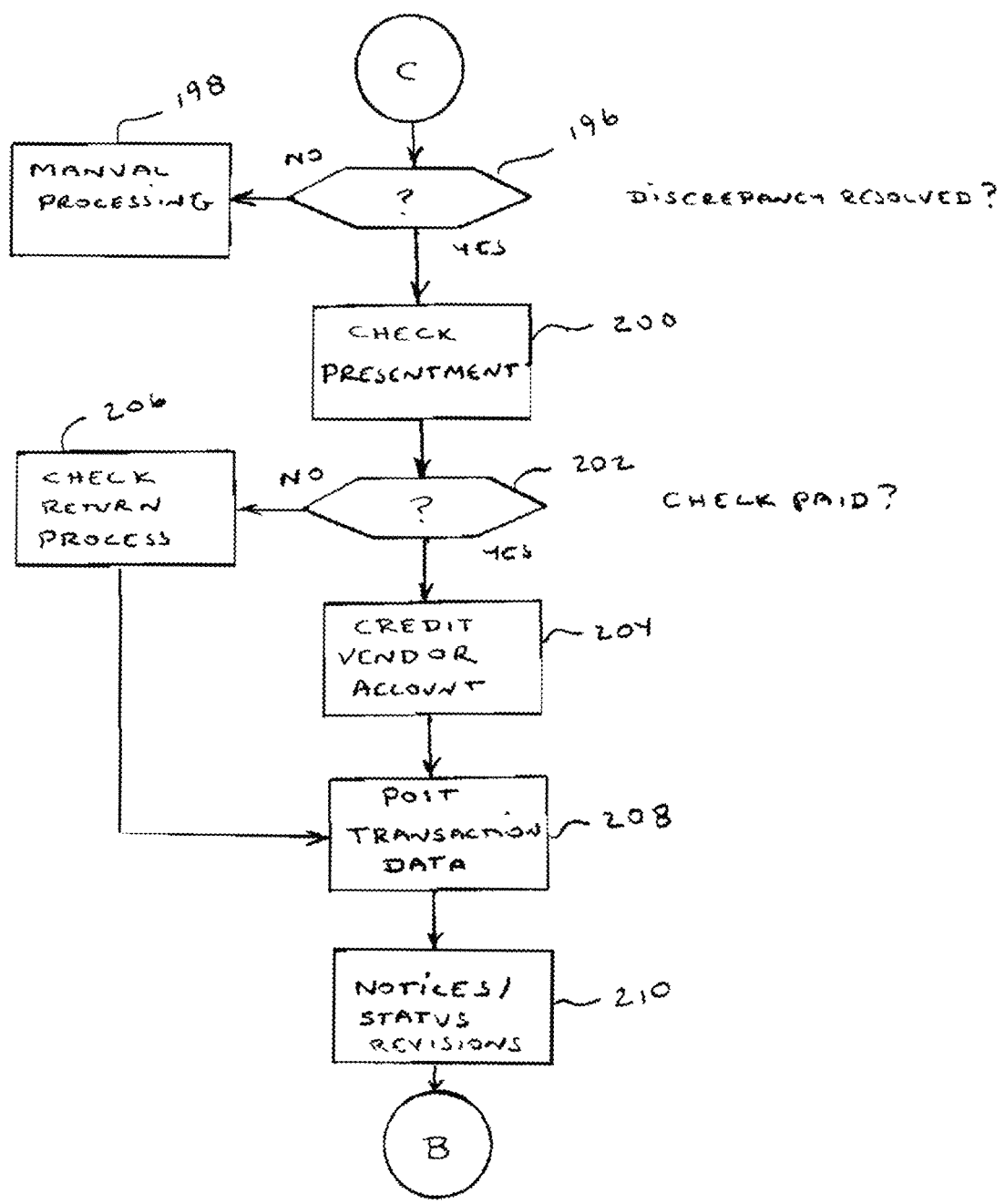
Figure 11:
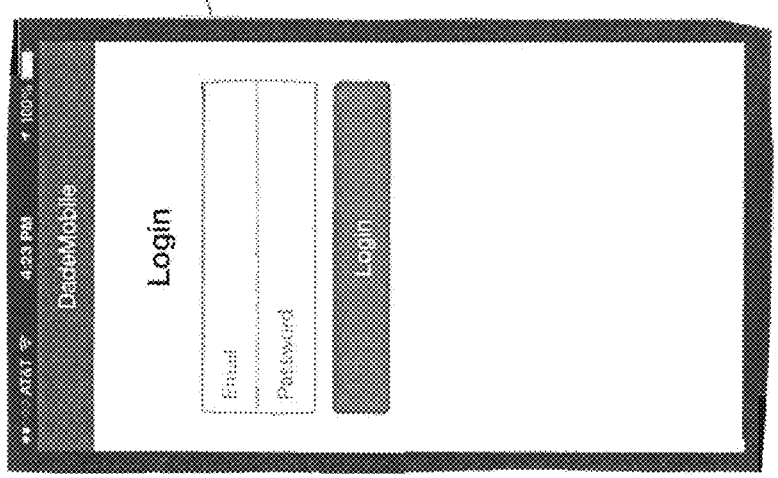

FIGS. 3-5 describe a high level schematic logic flow carried out through operation of the exemplary device 12 in connection with a delivery of items to a purchaser by the individual who is responsible for delivering such items. In the exemplary arrangement, the device 12 includes security features that limit the operation of the components thereof to authorized individuals. As represented in step 110 in FIG. 3, the individual wishing to use the device must first be verified as an authorized user of the device in order to carry out device functions. The authentication of the individual and their rights to carry out the functions of the device may be done in numerous different ways. For example in an exemplary arrangement, the individual may be required to provide inputs that include their e-mail address and a particular password. An exemplary display screen 112 shown in FIG. 11 corresponds to a user authentication step of this type. FIG. 11 shows an output screen which may be output from the display 22 of the device in order to prompt the user to input this information. The user may then input this information to the device using a keypad that appears on the screen of the device when the display is a touch screen, or may alternatively input such information through a keypad, audio interface or other input device. Once the individual has input this information, they provide an input selecting the "login" as shown in FIG. 11. In response to this user input, the exemplary device 12 causes the processor circuit 54 to operate to determine if the input data corresponds to data for an authorized user in the data store 58. This is represented in FIG. 3 by a step 114. If the input data corresponds to an authorized user, the device enables the user to further operate the device. If the inputs do not correspond to an authorized user, operation of the device is not authorized and the user is allowed to try again to provide their input credentials. Of course it should be understood that limits on the number of unsuccessful login attempts permitted before the device locks itself out in accordance with its programming, may be included as a feature of the device.

In other exemplary arrangements, individuals may be identified as authorized users of the device by providing biometric inputs through the biometric reader 44 of the device. In response to the biometric input, the processor circuit 54 may operate in accordance with its programming to determine if the biometric input data corresponds to data for an authorized user in the at least one data store 58. If the input data corresponds to the authorized individual user, then the device is enabled to be further operated and a login to the device enabled. If the data does not correspond, no further operation of the functions described is permitted other than a later login attempt.

While the operation of the device 12 for purposes of authenticating a user has been described as comparing input information from the user to data stored in a data store in the device, it should be understood that in other arrangements, input data may be transmitted from the device through operation of the wireless communication interface to the central server 60 or other remote computer for authentication. The individual input information may be verified as corresponding to an authorized user by comparison and/or manipulation of the data at a remote system and then authorization to operate the device sent in messages from the remote system. Of course it should be understood that these approaches are exemplary and in other arrangements, other approaches may be used.

Figure 12:
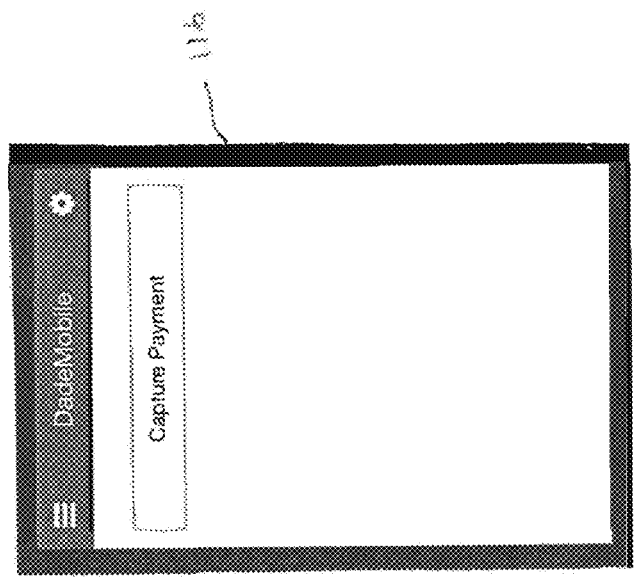
Figure 13:
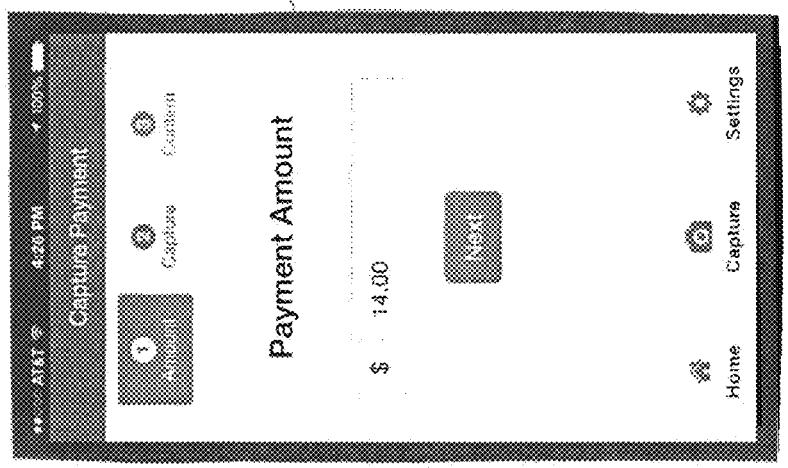

Once the individual in possession of the device has been verified as an authorized user, the individual may operate the device to document the activities associated with a delivery of goods to a purchaser and to receive payments in connection therewith. As represented in FIG. 12, when an individual making such a delivery is ready to receive a payment, the individual may select a capture payment option by providing an input in response to the screen 116 output from the display shown in FIG. 12. In response to the individual providing the input corresponding to an indication that they wish to capture a payment for goods delivered, the processing circuitry of the exemplary device 12 is operative in accordance with its programming to cause the display to output a screen 118 shown in FIG. 13. Screen 118 provides a prompt to the individual to input a payment amount. In the exemplary arrangement, the screen 118 prompts the individual to input a monetary amount that corresponds to a payment that is received from a purchaser in connection with the delivery of goods. In response to the prompt shown in FIG. 13, the individual inputs the amount received in payment from the purchaser through at least one input to the device. Provision of this input is represented by a step 120 in FIG. 3. It should be understood that this input amount may be provided through a keypad presented on a touch screen display, a separate keypad or other type of input device.

Figure 7:
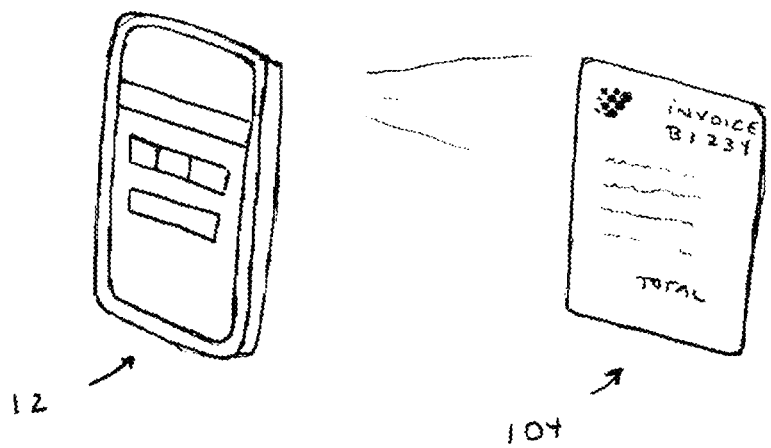
FIG. 7 is a schematic view of an exemplary device used in connection with reading invoice data.
Figure 14:
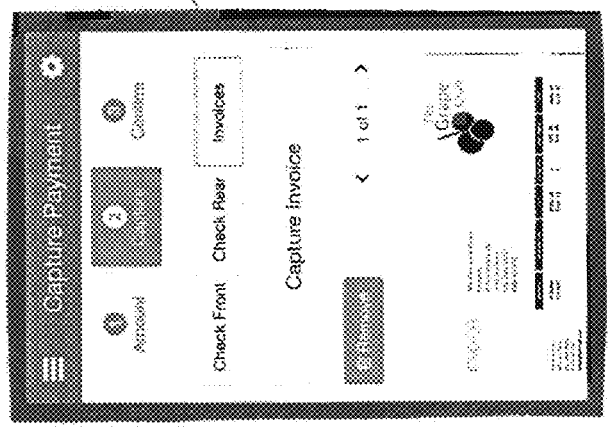

After inputting the payment amount in step 120, the individual operating the device is then prompted to operate the device to read invoice data. This is represented in a step 122. In the exemplary arrangement, the processor circuit of the device is operative to cause the screen 124 shown in FIG. 14 to be presented through the display of the device. In response to presentation of the screen 124, the individual is prompted to provide an input in which the invoice is "captured." In the exemplary embodiment, this refers to using the at least one reader 20 of the device to read invoice data from the invoice. This includes in an exemplary embodiment the device 12 operating to capture an image of the invoice through operation of the reader device such as an imager or camera of the device. The reading of the invoice data is represented in FIG. 7. In addition, as represented in FIG. 14 if the invoice associated with a particular delivery has multiple pages, the individual is prompted to operate the reader to read the invoice data from all the pages associated with the invoice. Further, in the exemplary arrangement, the programming associated with the processor circuit enables a user to cancel and delete invoice data in the event that the appearance of the invoice data on the screen of the device is somehow incorrect or improper. As can be appreciated from FIG. 14, in the exemplary arrangement the user is enabled to view the image of the invoice including the read invoice data from the display of the device. This helps to assure that the desired invoice data is properly read through operation of the device.

In some exemplary arrangements, the device may also operate software which helps to facilitate the reading of image and other data by the device. For example, an exemplary embodiment operates software available from Mitek Corporation which enables the reading and analysis of image data. Such software analyzes the read data to verify that the data that has been read includes the data required. In other arrangements, the software may operate to assure that the image quality, contrast and other aspects of the read image data is suitable for analysis of the characters that are represented therein. Further in some exemplary arrangements, the exemplary software may be operative to cause the device to provide outputs in the event that read image data is not suitable for operation of the system, and may prompt a user to reconduct the image reading activity. Of course these approaches are exemplary and in other arrangements, other approaches may be used.

After the invoice data has been read in a step 122, the exemplary device operates in accordance with its programming to prompt the user to operate the device to read check data from a check that the individual has received in payment in connection with the delivery that has been made. In the exemplary arrangement, the processor circuit of the device is operative to cause the display to output a screen 126 as represented in FIG. 15. Screen 126 prompts a user to use the device to read check data from the check provided by a purchaser. This is represented in FIG. 3 by step 128. In the exemplary arrangement, the processor circuit of the device is operative to prompt the user to read check data from both the front side and the rear side of the financial check. This is because while the front side of the check includes most of the data of interest to the system as later discussed, information on the rear side of the check may be necessary for purposes of check processing.

Figure 6:
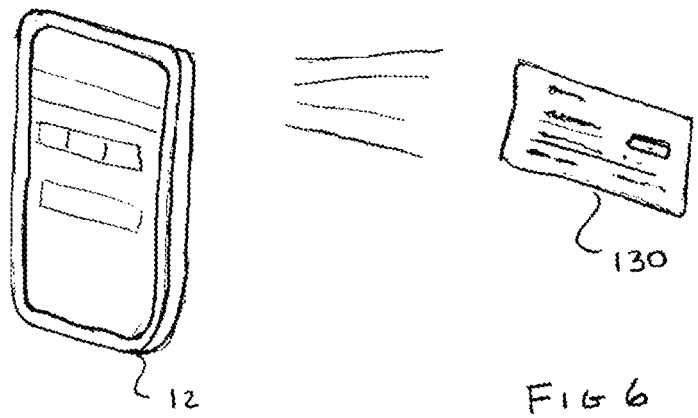
FIG. 6 is a schematic view of an exemplary device used in connection with reading check data.
Figure 8:
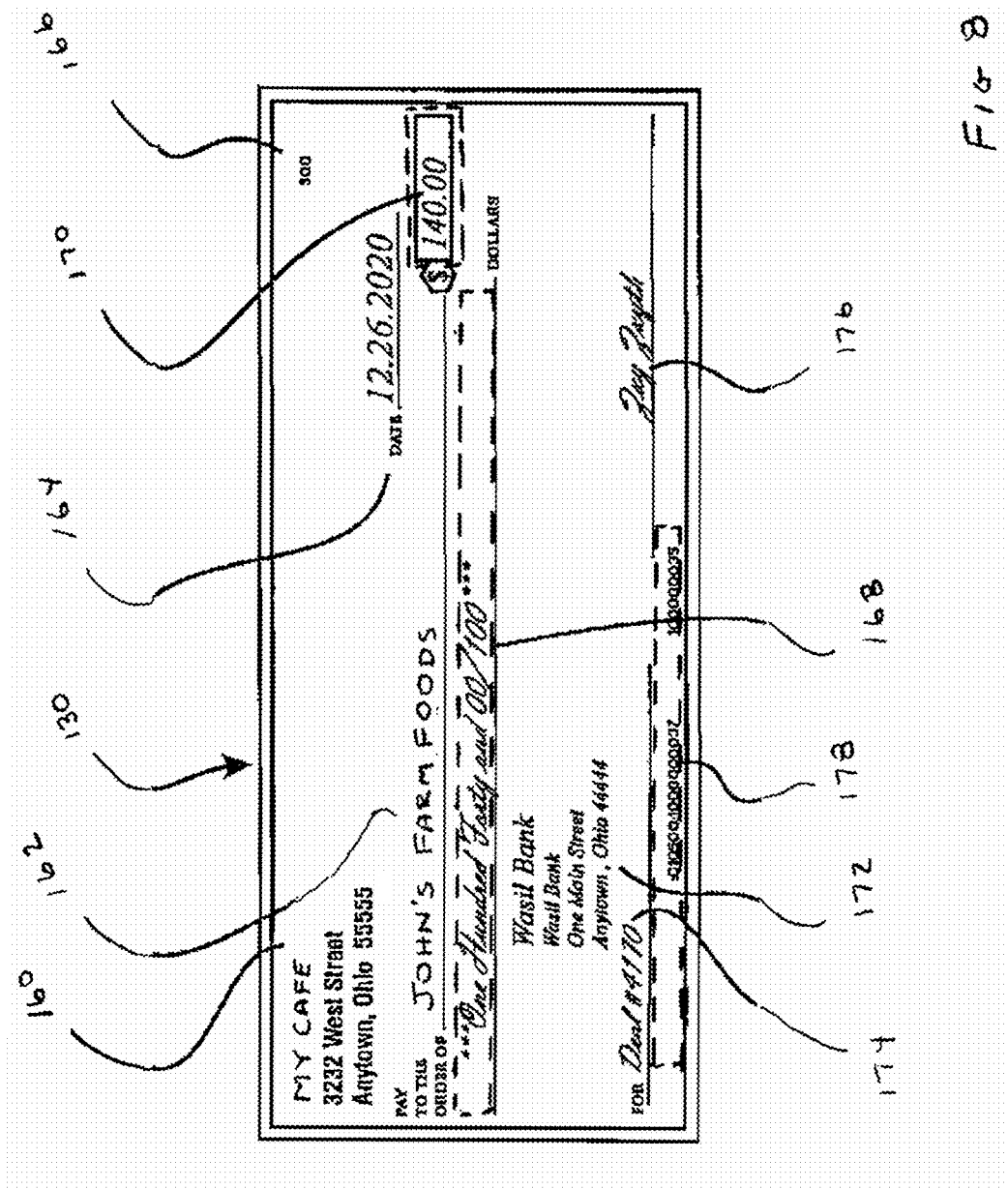
FIG. 8 is a schematic view of a financial check highlighting areas of the check with check data that may be used in an exemplary system.

An exemplary check 130 is shown in FIG. 8. The reading of check data from check 130 by the device 12 is represented in FIG. 6.

It should be appreciated that in this exemplary embodiment with the display screens shown, the device 12 is only configured to enable the individual to accept payments in the form of checks. In other exemplary arrangements which are later discussed, the device and system is configured to accept multiple different types of payments and also to process credits on behalf of purchasers. Further it should be understood that in the exemplary arrangement, the checks received by the individual making the deliveries may be in amounts that do not correspond to the amount on the invoice associated with the delivery. This may occur, for example, when the purchaser is making payment not only for the goods currently being delivered, but also paying toward a balance that the purchaser may owe for other deliveries or items. In these circumstances, the exemplary embodiments facilitate resolution of the applicable accounts receivable of the vendor to which the purchaser's payment is to apply.

Also in exemplary arrangements, software functions similar to that described in connection with the reading of invoice data may be applied to the reading of check data. This includes analyzing the check data that is received and verifying that it is suitable for processing or alternatively providing an indication to the individual operating the device that the check data that has been read is not suitable and needs to be read again through operation of the device. Of course it should be understood that these steps are exemplary and in other embodiments, other approaches may be used.

Once the check data has been read, the processor circuit of the device is operative to cause the display to output a screen 132 represented in FIG. 16. Screen 132 indicates to the individual that they have input the amount that has been received, and operated the device to read check data and the invoice data. Screen 132 then prompts the user to provide an input to indicate that they are ready to submit the transaction and commit to carrying the transaction forward with the data that has been provided. This logic step associated with committing the transaction is represented by a step 134 in FIG. 3.

Figure 17:
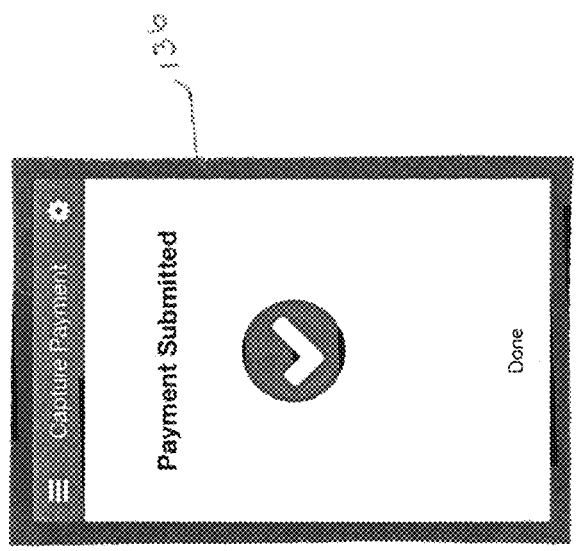

In the event that the individual operating the device fails to provide an input indicating that they wish to commit the transaction within a given time or otherwise provides an inappropriate input, the processor circuit of the device is operative to clear the transaction and require that the data again be input and read. Alternatively if in step 134, the individual indicates that they are prepared to commit the transaction, the processor circuit of the device is operative to cause the display 22 of the device to output the screen 136 as represented in FIG. 17. This screen informs the individual operating the device that the transaction has been submitted.

In some exemplary arrangements, the device 12 is operative to carry out the necessary processing to complete the receipt of money and the transfers as appropriate to obtain payment of the check and to transfer the funds corresponding thereto, into a bank account or other account associated with the vendor. However, in the exemplary arrangement these steps are carried out with the assistance of the central server 60. In this arrangement, the read image data, read check data, amount data and other information is sent to the central server for processing. This is represented in FIG. 3 by a step 138.

In the exemplary arrangement after transmitting the data associated with the purchaser transaction to the central server 60 through the wireless communication interface 48, the device is operative to cause the information to be stored in the data store 58 associated with the device. This is represented in a step 140. Further, in an exemplary embodiment the device may communicate with the depository 38 included in the delivery vehicle 14 concerning the details of the check that has been received from the particular purchaser. Communication of these details to the depository circuit 36 provides information about the particular check that the individual should have deposited into the depository after receiving it from the purchaser. This information can be used later to verify that none of the checks that the individual received from purchasers in connection with the delivery of goods have been misappropriated or modified. Of course these approaches are exemplary and in other arrangements, other approaches may be used.

In exemplary arrangements, it may be desirable after the individual has received the check from the purchaser, to provide the purchaser with documentation concerning the transaction. This may be done, for example, by the individual providing inputs to the device that cause the printing of a receipt for the transaction. This may be accomplished, for example, by the device communicating with the printer circuit 32 so as to cause the printer 34 to print for the purchaser a receipt. The printer 34 may be carried by the individual or alternatively included in the delivery vehicle so that the individual can provide the purchaser with the printed receipt at the time of the transaction.

Alternatively or in addition, the device may be operated to cause an electronic receipt to be sent from the device to a purchaser terminal such as terminal 90. Such an electronic receipt may be sent from the device 12 or alternatively the operation of the device may cause the receipt to be sent from the central server. In this way, the purchaser has a record of the delivery being made. The record data sent to the purchaser may include numerous details about the delivery, including for example, the date, time, delivery locations, goods, pricing, charges, payment methods, credits and other transaction related data. These actions of the exemplary device are represented in a step 142.

Of course it should be understood that the steps represented in FIG. 3 are exemplary and in other arrangements, other or different approaches may be used. Further, while in the exemplary arrangement, the read invoice data, read check data and other information are sent from the device 12 to the central server 60, in some arrangements the central server or other remote computer may operate to provide direct control of the device 12 carried by the individual. In such a system, the device 12 may include only a very thin client with the control for and outputs from the device 12 including outputs from the display, etc. provided through instructions delivered in messages from a remote server. In such an arrangement, read data from the reader would be sent directly to the central server may not be stored locally within the device. Of course it should be understood that these approaches are exemplary and in other embodiments, other arrangements may be used.

FIGS. 4 and 5 represent schematically high level logic flow carried out through operation of the central server 60 or other related computing devices which function to complete the processing of the data associated with the delivery of goods to purchasers.

In the exemplary arrangement, the programming associated with the central server is first operative to analyze the read invoice data and read check data. This is represented by steps 144 and 146 in FIG. 4. Also in these steps, the data values that are included in the invoice data and the check data are resolved so that such values may be utilized in connection with the particular transaction.

For example, in exemplary arrangements, software operated in the central server determines the locations within a received image file where values of interest are located. As can be understood, the device 12 sends read invoice data that corresponds to an electronic representation of visual images of the invoice. Likewise the read check data corresponds to an electronic representation of a visual image of both sides of the check. For example in the exemplary invoice 104 shown in FIG. 9, the programming associated with the central server is operative to identify the data included in areas bounded by dashed lines within the electronic representation of the invoice. In this exemplary arrangement, these data items include a transaction identifier in the form of an invoice number 148. Other exemplary data fields in the invoice data which may be used by an exemplary system include data included in a vendor identifying field 150. As can be appreciated, the data included in the vendor identifying field may be utilized to identify the particular vendor associated with this purchase transaction. This information is used by the central system to identify the particular vendor to which the transaction pertains. Of course in some arrangements such information can be resolved based on the transaction identifier 148.

Exemplary invoice 104 further includes a field with a customer identifying number 152. The data included in field 152 may serve as a purchaser identifier to the system. Alternatively or in addition, the purchaser identifying data may also include data that identifies a particular purchaser location to which the invoice pertains in cases where the purchaser has multiple locations. A further exemplary field 154 corresponds to a written purchaser name and address.

The exemplary invoice 104 further includes an invoice amount field 156. The invoice amount field corresponds to the amount charged to the purchaser by the particular vendor in connection with the delivery of the items represented in the invoice. Further, exemplary invoices may include machine readable indicia such as one or two-dimensional bar codes. Such machine readable indicia represented in FIG. 9 by the two-dimensional bar code or QR code 158 may include or enable resolution of numerous items of data or items of data from which information corresponding to the invoice where the goods or services represented thereon correspond. For example in some arrangements, the bar code 158 may include all the information related to the particular delivery which is represented in the invoice.

In the exemplary step 144 represented in FIG. 4, software operating in the central server is operative to analyze the data included in one or more of the fields included on the invoice. The analysis of the electronic representation of the visual image is represented through numerous pixel values included in the image. This data is analyzed through character recognition software and electronic image manipulation software to resolve the values which correspond to the data in the selected fields. Such software for carrying out these types of image analysis are available from companies such as Mitek Corporation, A2iA, Unisys or other providers of character analysis and recognition software. Once the values of interest are resolved from the invoice, they may be stored in a data store for use in connection with the processing later described.

Similar to the analysis conducted for data included in read invoice data, read check data is also analyzed for purposes of resolving values and information included in the read check data. As shown in FIG. 8, the front of check 130 includes numerous different items of information. Such items included in the exemplary arrangement are a printed name of the check payor or maker indicated 160. The check payor will generally correspond to the purchaser name in exemplary arrangements, but in other embodiments may not.

Further data included on the front side of the check includes the check payee 162. The payee in the exemplary embodiment corresponds to the vendor who is to receive the payment from the purchaser for the goods delivered and perhaps for other items. The check further includes a date 164. The date data indicates the date on which the check is written. The exemplary check 130 further includes check number 166. The check number corresponds to the particular numbering system utilized by the payor of the check.

Further data items included on the face of the check include the legal amount for which the check has been written 168. The legal amount 168 is the amount written in words for the dollar value of the check. The front of the check also includes the courtesy amount 170 which is a numerical representation of the check value. While both the legal amount and the courtesy amount appear on the check, the legal amount is considered the controlling value and the amount for which the check has been written. The courtesy amount is used to verify the legal amount.

Further appearing on the face of the exemplary check 130 is the bank name 172. The bank name identifies the particular bank on which the check is written and with which the maker of the check has their account. Other information appearing on the exemplary check is the notation 176. Notation 176 corresponds to information the maker of the check has chosen to include on the face of the check for record keeping or other purposes. A notation, similar to notation 174 is generally provided so that the writer of the check has a record on the cancelled check of the particular transaction for which the check was written. The check further includes the maker's signature 176. The maker's signature is the authority of the payor to pay the check instrument. Of course as can be appreciated, check 130 is a personal check. Other types of checks from commercial or other entities will generally include a printed or stamped payor authorization.

Further included on the front of the exemplary check 130 is a micr line. The micr line includes magnetic ink character recognition characters. These characters can be read through operation of a magnetic reader as well as by optical character recognition methods. The micr line on the exemplary check 178 will include data which corresponds to the particular payor's account number which is alternatively referred to as the check maker's account number, as well as the financial institution that holds such account. The micr line data also includes data usable to route the particular check to the bank to which it can be presented for purposes of paying the check amount from the account of the payor/maker.

It should also be understood that although only the front of the particular check is shown, other data may be included on the rear of the check. Generally the rear of the check includes the endorsement data of the payee of the check. The endorsement of the payee indicates that the payee has negotiated the check for purposes of presenting the check to the payor's financial institution and receiving payment. Of course other information may also be included on the rear of the check including certain restrictive endorsements or other information that may be useful for purposes of check processing.

In the exemplary arrangement in step 146, the check data which is most useful in connection with processing transactions includes the courtesy and legal amount information related to the check. That is why this information is shown within the fields of interest of the check represented by the dashed lines in FIG. 8. The courtesy and legal amounts are of interest because they indicate the amount of the check and whether there is a discrepancy between the two different amounts. In addition, the micr line data is of interest. This is because the micr line indicates information concerning the account and the bank on which the particular check is drawn. For some commercial checks the micr line may also represent other data such as the check amount. The micr line information enables routing of the check for presentment and payment.

In other exemplary arrangements, additional data in fields on the check may be analyzed for purposes of resolving the data therefrom. This may include, for example, making sure that the check is completely filled out with all the appropriate information. Such analysis may also help to assure that the payee of the check is the appropriate entity. In other arrangements, the signature of the payor of the check may be analyzed to determine if it is genuine. In still other arrangements, all the fields on the front and rear of the check may be analyzed to assure that all of the data that is required on a legal check is present or for features which may indicate a fraudulent check. Computer software which is usable to conduct such an analysis is produced by entities such as Mitek Corporation, A2iA, Unisys and others. In the exemplary arrangement such software is operated in step 146 to resolve the values of interest from the read check data.

As represented in FIG. 4, in order to assure that data from the invoice and the check has been properly read and analyzed, the central server makes a determination based on a software analysis that the data required has been resolved from the read data with a sufficient degree of confidence. In exemplary systems, character recognition software operates to not only resolve the "best match" for the data represented in fields of interest, but also indicates the degree to which the software is confident that the data has been resolved correctly. In cases where the characters are not well formed or the captured images are not of sufficient clarity, the confidence level for certain values may not be as high as would be desirable. In a step 180, the determination is made whether all the data has been resolved with adequate confidence. If the data has been resolved with confidence that it is at least at a threshold, the processing of the data continues.

Alternatively if the data is not resolved with sufficient confidence, the central server operates in a step 182 to try to increase the confidence levels. Step 182 may include, for example, carrying out image manipulation functions for the captured invoice or check data that is providing the low confidence levels. Such image manipulation may include, for example, modifying the electronic data in the images to change pixel values or to change pixel values to binary values rather than grayscale values. Such changes may facilitate the ability to resolve characters included in the fields of interest. Alternatively, step 182 may include the application of different character recognition algorithms or taking other steps that are designed to resolve the data in the fields of interest and to increase the level of confidence in the resolved data.

Once the data has been resolved with adequate confidence, the central server then carries out a step 184 in which it is determined that the required character fields are valid. This includes the central server making a determination that the purchaser data corresponds to a purchaser that is authorized to make purchases through the system. This may also include verifying that the transaction identifier 148 associated with the transaction corresponds to the other data for the transaction, such as the purchaser and the amount of the transaction as received in the invoice data.

In response to the determination in step 184 that the purchaser transaction identifier and invoice amount data correspond to data stored in the system, the central server is then operative to compare the payment data from the read check data and the invoice amount corresponding to the invoice. This is done in a step 186. The result of the comparison of the amount that was input by the individual carrying out the transaction and the invoice amount is analyzed to see if they are the same at a step 188. In a step 190, the central server is operative to compare the amount of the check received and the invoice amount. The result of this comparison is then reviewed in a step 192.

If in either of the steps 184, 188 or 192 there is a potential discrepancy, the central server operates in accordance with its programming to identify the situation as being associated with a discrepancy. In the exemplary arrangement, the central server operates in accordance with the teachings of the incorporated disclosures in U.S. patent application Ser. No. 13/486,497 which is incorporated herein by reference in its entirety, to automatically attempt to resolve any discrepancies and to apply amounts included in payments made by the purchaser to amounts that are owed by the purchaser to the vendor. For example, such circumstances may commonly arise where the purchase has paid more than the amount due for the goods delivered in connection with the invoice. The discrepancy handling step 194 as represented in FIG. 4, is operative to determine the reason that the purchaser has paid the additional amount and to properly apply the additional amount to unpaid invoices, upcoming deliveries or other outstanding amounts owed. The central server then operates to determine in a step 196 whether the discrepancy was handled on an automated basis in step 194. If not, the central server is operative to flag the particular transaction information and to deliver the information to a user terminal of a service provider for purposes of manual processing. This is represented in a step 198. The manual processing by the service provider will generally include reviewing the pertinent information from the system and applying the payment or otherwise gathering additional information and providing additional inputs so as to resolve any discrepancies.

It should be appreciated that in exemplary arrangements where the steps represented in FIGS. 4 and 5 are carried out through operation of the device 12, the discrepancy information may be presented to the individual for purposes of resolution. This may be appropriate in situations where the operator of the system is a small business who delivers goods to a limited number of customers who may have the information as is appropriate to resolve the discrepancy. In such situations the input devices associated with the device 12 may be utilized for purposes of providing the additional information and inputs so as to resolve discrepancies. Alternatively, in other situations where systems may involve large numbers of purchaser entities and numerous vendor entities, remote terminals associated with the particular vendor entity's service representatives may be operative to present the discrepancy information for purposes of identifying issues and for providing resolution. Numerous different alternative approaches may be required depending on the nature of the particular system.

In the exemplary system in connection with the transaction described, the central server 60 then operates to carry out electronic check presentment as represented in a step 200. As previously discussed, electronic check presentment includes providing information concerning the amount of the particular check and the bank and account information on which the check is drawn to the check presentment network 66. In exemplary arrangements, the check is presented as an image replacement document which corresponds to an electronic representation of the front and back of the check. The data regarding the check amount, payor and payee information is also provided with the electronic representation of the check. Generally in exemplary embodiments, the check is presented on behalf of a financial institution into which the vendor who is the payee of the check will make a deposit including the amount of the check. The information sent with the check includes information concerning the vendor bank and bank account so as to facilitate the receipt of payment when the check is paid. Further in exemplary arrangements checks that are sent to the check presentation network are sent in groups or bundles with other checks received by the particular vendor or multiple vendors who use the system, so as to facilitate the payment processing. Of course these approaches may vary depending on the nature of the particular system.

Once a check has been presented to the bank on which it is drawn, the check will generally be paid from the payor's account. However, in the event that the payor does not have sufficient money in their account, the check will be dishonored. A determination is made at a step 202 concerning whether the check has been paid. If the check has been paid, the funds are effectively transferred through the check processing network to the bank account associated with the vendor, and the central server operates to cause the amount of the paid check to be credited to the vendor account as represented in a step 204. Alternatively in the event that the check is dishonored, steps associated with a check return process are carried out as represented in a step 206. The check return process indicates that the check could not be paid and therefore the right to again present the check for payment at a later date is reserved to the vendor should the vendor wish to do so. In some exemplary embodiments the check return process 206 may include re-presentment of the check automatically after the passage of a certain period of time. This approach might be effective to have the check paid in the event that the deficiency in the payor's account was due to a temporary cash flow problem, for example.

In the exemplary arrangement the result of the check presentment process is posted in a step 208. Step 208 generally involves the record keeping functions of noting in the vendor account that the purchaser has paid the amount associated with the paid check. Such steps may also include indicating in a vendor account that the purchaser has paid to the vendor the amount associated with the invoice or a different amount. Alternatively if a provisional credit has been granted in connection with the check, the provisional credit may be revoked due to the nonpayment of the particular check. Such data is posted or recorded in connection with the various accounts.

In a step 210, additional steps may be taken in accordance with the programming associated with the central server 60 and the particular requirements and practices of the vendor and system operator. For example, if a check has been dishonored, the system may be operated so as to generate an electronic notification of the status to a vendor representative. Such electronic notice of the nonpayment of the check may also be sent in an electronic message to the purchaser terminal 90. Alternatively or in addition, a status revision may be implemented and stored in a data store in the system. Such a status revision may indicate that orders are no longer to be accepted from the particular purchaser absent specific approval. Alternatively status changes may include, for example, a requirement that a purchaser pay for any goods to be delivered in advance so that payment by check can be documented as valid before the goods are delivered. Alternatively or in addition, the payment status may be changed in the system so that the individual delivering the goods is required to not leave them with the purchaser unless the purchaser makes payment for the goods at the time of delivery in cash. Of course such actions included in step 210 are exemplary and in other arrangements, other approaches may be used.

Alternative exemplary embodiments of the system may provide additional payments and other capabilities in connection with the deliveries by vendors to purchasers. Such alternatives may include the ability of the individual who makes the deliveries and accepts payments to receive additional payment types from purchasers. Such payment types may also include the ability to receive multiple forms of payment in connection with a given delivery. Such capabilities in exemplary systems may also include capabilities to process credit items in connection with transactions. Such credit items include documents or other items which correspond to a credit that is to be provided to a purchaser in connection with the transaction or transactions that are conducted between the purchaser and the vendor.

Figure 18:
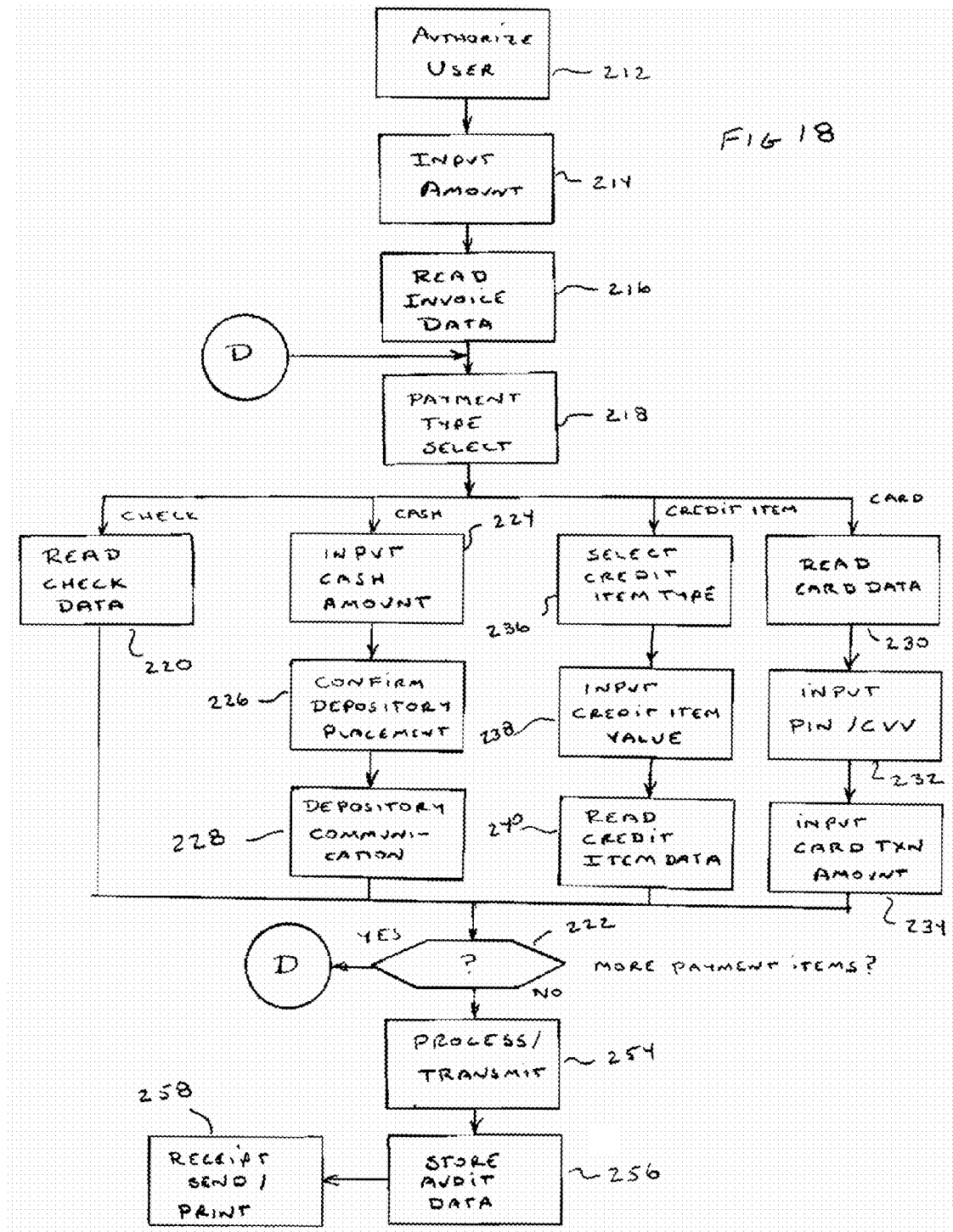
FIG. 18 is an alternative schematic representation of logic flow carried out through operation of the system including different payment alternatives from purchasers.

FIG. 18 represents schematically logic flow executed through operation of an exemplary device 12 that is used in a system in which multiple different types of payment methods can be accommodated. In the exemplary logic flow, a user of the device is first authorized to operate the device's functions and capabilities. This is represented in a step 212. Step 212 includes the capability for verifying the identity of the particular individual who is to operate the device. Step 212 may correspond to the activities discussed in connection with steps 110 and 114 of the previous embodiment. Alternatively, step 212 may include additional steps for verifying the identity of the individual as an authorized user.

In the exemplary arrangement, the processor circuit of the device is then operated to enable receipt of an amount input from the individual. This is represented in a step 214. Step 214 may correspond to an amount input in a manner like that discussed in connection with step 120 of the prior embodiment.

The device then operates to read invoice data in a step 216. The reading of invoice data corresponds to capturing information on an invoice document or documents associated with the particular transaction. The reading of invoice data in step 216 may include those activities that were discussed in connection with step 122 of the previously discussed embodiment.

In this alternative embodiment, the individual is enabled to provide one or more inputs to select different payment types that may be associated with the payment or payments received from the purchaser in connection with the particular delivery transaction. The selection of the particular payment type through one or more inputs is represented in a step 218. In the exemplary arrangement, the selectable payment types include payment via check, the receipt of cash, or payment using a card account such as a credit card, debit card or stored value card. Further in the exemplary embodiment the purchaser is enabled to obtain credits associated with credit items that the purchaser has received. The credit items correspond to an amount which the purchaser is entitled to have credited against amounts owed to the vendor. Of course it should be understood that these payment type selections in this embodiment are exemplary and in other embodiments, additional types of payments or different or lesser numbers of payment types may be provided through operation of the device and the system.

In the exemplary arrangement, if the payment type selected corresponds to a payment by check, the device then operates to execute a step 220 in which check data is read. The reading of check data may correspond to activities like those discussed in connection with step 128 of the previously discussed embodiment. After the reading of the check data, the processor circuit of the device then operates to provide the individual with an appropriate output that queries the individual as to whether or not there are more payment items to be received from the purchaser in connection with the transaction. This is represented in a step 222. If more payment items are to be received, then the logic flow returns to step 218 to enable selection of another payment type.

In the exemplary arrangement instead of receiving a check payment, the individual delivering the goods may receive the payment of cash. This may be required in some instances where the purchaser is only entitled to receive goods in exchange for immediate payment of cash upon delivery. Alternatively in some arrangements, vendors and/or purchasers may prefer payment in cash. In response to selection of this payment type in step 218, the processor circuitry operates to provide outputs through the display that prompts the individual to provide inputs of the amount of cash received from the purchaser. This is represented in a step 224. In response to the prompt, the individual operating the device inputs the cash amount. In some arrangements, the input cash amount may include only a total. Alternatively in other arrangements, the individual may be prompted to input the denomination of each item of bills or coins that have been received from the purchaser. For example, the prompts may include the requirement that the individual input the number of $100 bills, the number of $50 bills, and so on for the denomination of each type of bill or coin received. This may be done in some arrangements to facilitate the development of an audit trail in connection with cash received. Of course these approaches are exemplary and in other arrangements, other approaches may be used.

After inputting the cash amount received, the device then operates in accordance with its programming to prompt a user to provide at least one confirmation input that they have placed the cash in the depository 38 or other appropriate receptacle for holding the cash. This is represented in a step 226. In response to the individual operating the device providing the confirmation input that the cash has been placed in the depository, the device then operates in accordance with its programming to cause communication between the wireless port 30 and the depository circuit 36 to cause to be stored in connection with the depository circuit, the information regarding the nature, amount, transaction identifier, purchaser or other data associated with the particular cash. This is represented in a step 228. In exemplary arrangements, this data is stored in connection with the depository circuitry as well as in the data store associated with the device for purposes of providing an audit trail so that any misappropriation of cash can be detected. After the completion of step 228, the logic flow returns to the step 222 to enable the exercise of more payment options.

In the event that in step 218 payment by a card transaction is requested, the logic flow causes the device to operate to carry out a credit card, debit card or stored value card transaction in which funds are paid from a card associated account of the purchaser. In an exemplary arrangement, the device causes the card reader 26 to read card data from a user's card such as the card schematically indicated 28. The reading of card data is represented in a step 230. As previously mentioned, the reading of card data may be done on a contact basis by reading magnetic stripe data from the card and/or reading data from a processor chip included on the card. Such read card data generally includes reading data that corresponds to an account number with which the card and the holder thereof is associated and from which a payment amount can be paid.

After the reading of the card data in step 230, the exemplary arrangement requires an appropriate input of any validation data that may be required for purposes of processing the card payment transaction. These additional inputs are represented by a step 232.

For example, in the case of a credit card payment transaction, processing the transaction may require the input of a card verification value ("CVV") which is included on the back of the card. In such transactions, the logic flow executed through operation of the processor circuit may cause the display of the device 12 to prompt the individual to input the CVV value through an input device thereon. Alternatively in the case of a debit card transaction, the input of a customer personal identification number or a purchaser signature may be required in order to process the debit card transaction. In such cases the individual may provide the device to purchaser or a purchaser representative for the private input of the customer's personal identification number. Alternatively the device may include software to capture a customer signature. For example, in some arrangements a purchaser signature may be captured by the purchaser representative "writing" their signature by passing their finger across the face of a touch screen display. Other or alternative verification values may be provided as required to process the card transaction in connection with step 232.

As represented in a step 234, the processor circuitry operates in accordance with its programming to obtain an input of a card transaction amount. This card transaction amount may be provided as a numerical or other input by the individual operating the device. Alternatively in some arrangements the input amount may be provided through reading of characters associated with the invoice or other documents. Of course other approaches may be used depending on the particular type of card-based transaction. Once the data and information necessary for purposes of carrying out the card-based transaction have been received, the device then operates in accordance with its programming to return to the step 222.

In this exemplary embodiment, the device 12 may also be configured to handle credit items that are in the possession of the purchaser. Credit items include items for which the purchaser is entitled to a credit as against amounts owed by the purchaser to the vendor. Such credit items may commonly include items such as credit memos, returned goods acknowledgments, rebate coupons that have been redeemed by the purchaser from consumers, discount offers offered by the vendor, promotional offers or other types of items for which the purchaser may receive a credit from the vendor. Of course it should be understood that these types of credit items are exemplary and in other arrangements, other types of credit items may be used.

In the exemplary embodiment the processor circuit of the device operates to prompt the individual operating the device to provide an input to select a particular type of credit item which is being presented by the purchaser. This is represented in a step 236. The device then prompts the individual to input one or more values that are associated with the particular credit item that is being presented by the purchaser. In the exemplary embodiments, the value may include the manual input of a dollar value. Alternatively such inputs may include reading or otherwise obtaining a value associated with the item. Such reading may be done by capturing information included on documents. Alternatively value information may include the reading through the wireless port 30 of the device, RFID tags or other indicia associated with the item which is indicative of its value. Of course these approaches are merely exemplary. The input of the credit item value is represented schematically by the step 238.

The individual operates the device 12 for purposes of reading credit item data in a step 240. The reading of credit item data may be done in a manner similar to that carried out by the device in connection with reading invoice data and reading check data. An exemplary credit memo 242 is represented in FIG. 10. The exemplary credit memo includes a transaction identifier 244. The exemplary credit memo also includes a vendor identifier 246 and a purchaser identifier 248. In addition, similar to the exemplary invoice, the purchaser identifier may include not only the identification for the purchaser entity but also the particular delivery location with which the credit item is associated. In addition, the exemplary credit memo also includes printed purchaser name and address data 250.

The exemplary credit memo further includes the credit item value 252. The credit item value corresponds to the amount with which the purchaser is to be credited in connection with the credit item. Of course it should be understood that numerous other types of values including machine readable indicia such as bar code or other items may be associated with credit items. Further, in exemplary arrangements the credit items may be preprinted and delivered to the purchaser prior to or at the time of delivery. Alternatively, in some arrangements, credit items may be established by the individual making the delivery at the time thereof. In such cases the device may be operated to establish the necessary information to be associated with the credit item and store such information in the appropriate data stores associated with the central system 60 for purposes of processing the credit items. Of course these approaches are exemplary and in other arrangements, other approaches may be used.

In the exemplary logic flow, once all the payment items have been received, the processing of the payments is carried out generally in a manner like that previously discussed in connection with the central server 60. Such processing is represented schematically by a step 254. Of course in the case of check payments, checks are electronically presented for payment to the check presentation network in a manner like that previously discussed. In this exemplary arrangement in the case of cash payments, the account of the vendor is provisionally credited with the value of cash indicated as received. The provisional credit is then utilized for purposes of verifying that the cash is retrieved from the depository in the amount indicated to the device at the time of receipt. The retrieved cash is then deposited into the account of the vendor through operation of the central server.

In the case of a card transaction, if the card transaction related data is sent through operation of the central server to the appropriate credit card network 78, debit card network 82, stored value network or other appropriate network, the card transaction network then verifies the card and payment data and, if the funds are available, operates to cause the card payment amount to be assessed against the financial account of the purchaser. A central server operates to cause the amount assessed against the payment account of the purchaser to be credited to the account of the vendor. Of course if the transaction is not accomplished due to insufficient funds or the like, the central server 60 operates in accordance with its programming to indicate this so that other appropriate steps can be taken.

If credit items have been received, the processing thereof generally involves resolving data from the different required data fields thereon. Such data fields may be represented in the case of the exemplary credit memo 242 by the items included in dashed lines. Such data in exemplary arrangements will be that required to process the credit for the benefit of the particular purchaser. The types of data items which are resolved will vary depending on the particular type of credit item. Further, as can be appreciated, the credit item data that is read may need to be manipulated, processed and analyzed in a manner similar to that discussed in connection with invoice data and check data in order to resolve the necessary values with a sufficient degree of confidence. Once the values are resolved, the system can then verify that the credit item is one that is genuinely associated with an appropriate purchaser and vendor and is otherwise suitable to be processed. If the credit item passes the applicable tests, the credit amount associated therewith is credited to the purchaser's account.

Once the different payment type items have been processed, the crediting and debiting of the accounts have been carried out, the storage of the data associated therewith is carried out in a step 256. The activities associated with step 256 may generally correspond to those discussed in connection with step 140 of the previously described embodiment. Of course in the step the different payment types and information associated therewith is accommodated through the storage of the associated data. Further in some exemplary arrangements, receipts are sent or printed in connection with the transaction as represented in a step 258. Activities carried out in connection with this step may correspond to those previously discussed in connection with step 142. Alternatively or in addition, additional receipts may be provided for example, in connection with card transactions that are carried out, or for credit items received, or to document other information associated with the particular payment type. Of course these approaches are exemplary and in other embodiments, other approaches may be used.

Further exemplary devices and systems may operate in a manner that enables the individual who delivers the goods at a plurality of different locations and who accept payments from purchasers, to act on behalf of several different vendors who participate in a shared system for the processing of delivery and the receipt of payments. Systems of this type may be particularly useful in situations where the individual deals with purchasers in a particular industry who need to acquire numerous different types of goods (and/or perhaps services) which originate from different vendor sources. In other arrangements such systems may enable the operation of the functionality provided by the central server 60 to be carried out on an outsourced basis for multiple different types of vendors and other entities for purposes of handling their financial transactions. Of course these systems are exemplary of those that may be operated in a manner like that discussed herein.

Figure 19:
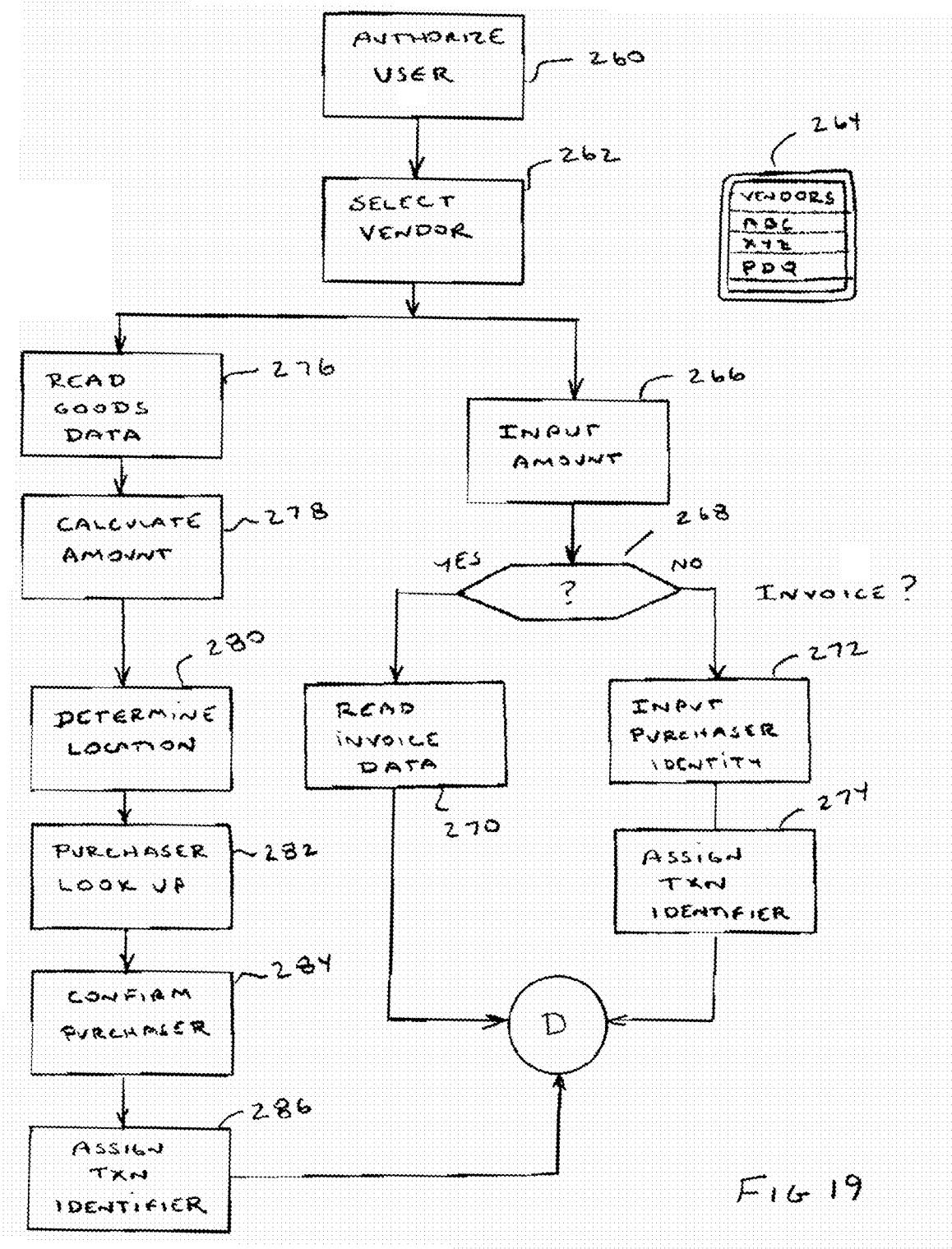
FIG. 19 is a schematic view of alternative logic flow carried out by an exemplary system in which multiple vendors serviced through operation of the system have different requirements associated with goods delivery.

FIG. 19 is a schematic representation of the operation of an exemplary device 12 which is utilized by the individual to carry out delivery and purchase transactions, for a plurality of different vendors. In this exemplary arrangement, the individual desiring to use the device must first be verified as an authorized user as represented in a step 260. The verification that the individual is authorized to use the device may be accomplished in the ways described in connection with the prior embodiments.

Once the individual operating the device has been verified as an authorized operator, the device may be operated in accordance with its programming to present the individual with one or more screen displays that enable the user to select one of a plurality of vendors that is associated with the particular goods delivery and/or transaction that the individual is then currently carrying out. The presentation of vendor selection options and the provision of an input by the individual to select a vendor is represented in connection with step 262. In some exemplary arrangements, the device operates in accordance with its programming to present the individual with a visual listing that includes a plurality of different vendors that can be selected by the individual in connection with the particular transaction. The individual may select the particular appropriate vendor by providing at least one input such as by contacting the screen of the display in the area where the particular vendor identifying indicia is presented. This is represented by the graphic representation of screen 264. Of course as can be appreciated, numerous different vendor selection prompts and inputs may be accommodated in different systems and arrangements.

In an exemplary embodiment the particular vendor selection is operative to cause the processor circuit to present screens and carry out the particular logic flow as may be appropriate for the goods and/or services of that particular vendor. Further, as can be appreciated, alternative types of screens and logic flows may be utilized in connection with a single vendor depending on the particular transaction or the circumstances of the goods or services delivery which is being made. Some exemplary logic flows for different vendors are hereinafter described. However, it should be appreciated that these particular logic flows are merely representative of numerous different alternatives that may be utilized.

For a particular selected vendor, the processor circuitry may operate in accordance with its programming to present a transaction logic flow which then requires the individual to provide one or more inputs which correspond to the amount associated with the particular transaction. This is represented by a step 266. This input amount may be provided through the input of a transaction amount through an input device in a manner like that previously discussed.

For some vendors and deliveries, there may be preprinted invoices that have been generated through operation of the central server 60 in a manner like that previously discussed or through another process. However, for other transactions there may be no prepared invoice. In the exemplary transaction flow, the individual is prompted to indicate through one or more inputs to the device whether the particular transaction is associated with an existing invoice. This is represented in the step 268. In response to providing an indication that there is an existing invoice, the device then operates in accordance with its programming to read the invoice data in a manner like that discussed in connection with the previously discussed embodiments. This is represented in a step 270. Once the invoice data is read, the device may then operate in a manner like that discussed in connection with the logic flow in FIG. 18 to perform the steps associated with payment.

Alternatively if in step 268 there is no pre-existing invoice associated with the particular transaction, the device may operate in accordance with its programming associated with the particular selected vendor entity to prompt the individual operating the device to input purchaser identity data. This is represented in a step 272. In some exemplary arrangements, the input of the purchaser identity data may include accepting from the individual operating the device, an input from an existing list of purchaser entities. Such purchaser entities may have indicia corresponding thereto stored in the device or in the central server 60, which is presented to the individual through the device. The individual may then select a purchaser from a displayed list or by an input of other indicia. In still other arrangements, the programming of the device and/or the central server may be operative to enable the individual to establish the information associated with a new purchaser entity through inputs to the device 12. For example, in such circumstances the device may prompt the individual to provide inputs of the data necessary for the central server to accommodate the processing of transactions associated with the new purchaser entity. Of course these approaches are exemplary.

In response to the individual selecting or establishing identity information associated with the particular purchaser, the device is then operative in a step 274 to assign to the transaction a transaction identifier. In some exemplary arrangements, the transaction identifier may be assigned through operation of the central server through communication with the device 12. Alternatively, the device 12 may operate independently to assign the transaction identifier and to communicate the information to the central server. Of course other approaches may be used. After the assignment of the transaction identifier, for purposes of accomplishing the transaction, the device 12 operates in the manner previously described to carry out the steps associated with the payment options. In addition, in connection with transactions where a purchaser entity is newly established, it should be appreciated that in steps 256 and/or 258, additional functions may be carried out such as for example to print for the customer invoice data or documents or other data associated with the transaction. Alternatively or in addition, transaction data including invoice records may be provided to the customer electronically such as by being transmitted to the purchaser's system address so as to further help to document the purchase transaction. Of course these approaches are exemplary and in other arrangements, other approaches may be used.

In connection with a selection of a different vendor by the individual operating the device in step 262, an alternative transaction flow associated with establishing the transaction amount and purchaser may be carried out. For example, for some transactions the type and/or quantity of goods to be delivered to the purchaser may not be determined until the individual making the delivery is on site at the particular purchaser location. In such transaction situations, the exemplary device 12 may be operative to read through operation of one or more readers and/or through the wireless port to read identifying data associated with goods that are going to be delivered. This is represented in a step 276. This step may include the device operating to read data from bar codes, RFID tags or other indicia connected or otherwise applied to the goods or their packaging which identifies the goods to be taken by the purchaser and/or their associated pricing. In response to inputs to the device by the individual indicating that the purchaser is acquiring the particular type of goods, the exemplary device 12 operates in accordance with its programming to calculate the cost amount of the purchase transaction that is being carried out. This is represented in a step 278.

In this exemplary arrangement, the device 12 through its independent operation or in connection with other systems, is also operative to determine the purchaser identifying data by determining the location of the device during the transaction. This may be done, for example, through operation of the GPS receiver 40 and the calculation of the device position by the processor circuit 54. Alternatively or in addition, the location of the device during the transaction may be determined from data available from the cellular network in which the device is being operated. Such localization techniques based on the strength of the signal as received by different receiving points, may be utilized to provide an indication as to the current location of the device. One or more of such techniques may be carried out as represented in a step 280.

In this exemplary arrangement, a purchaser identity is then determined responsive to the location data. This may be done, for example, by comparing the location data resolved in step 280 to data corresponding to different purchaser locations that are stored in the data store 58 of the device or in one or more data stores in connection with the central server 60. Alternatively or in addition, purchaser data may be resolved through operation of the device and/or central server by resort to external databases which indicate the business establishments located in particular locations or at particular addresses. Through such techniques which are carried out in a step 282, the exemplary device is operated to provide an indication to the individual of the purchaser identity associated with the transaction. In a step 284, the individual operating the device is prompted to confirm the identity of the purchaser that has been resolved through the functions conducted in connection with step 282. If the individual operating the device indicates that the resolved purchaser data is inaccurate, further attempts are made to identify the appropriate purchaser data. For example in some exemplary arrangements, localization from the cellular network may be more accurate than the available GPS data and vice versa. Further, in some arrangements, stored data associated with the central server may be out of date and data available from public sources may be more up to date and/or vice versa. Additional attempts may be made through operation of the device 12 and/or the central server to resolve alternative purchaser data as appropriate when the first choice is not confirmed by the individual making the delivery.

Once the individual making the delivery confirms the purchaser identifying data, the device operates in accordance with its programming in a step 286 to assign a transaction identifier to the particular transaction. The assignment of a transaction identifier may be done in a manner similar to that discussed in connection with step 274. Of course alternative approaches may be used in other embodiments depending on the requirements of the particular vendor.

Once the transaction identifier has been assigned, the device 12 operates in accordance with its programming to carry out the payment functions in a manner previously discussed. Of course it should be appreciated that not all selected vendors may accept the types of payments and/or credits that may be accepted by other vendors, and that the payment and credit options that are available in connection with particular vendor selections may be limited to specific payment selections. Alternatively some vendors may accept additional alternative payment methods or credits for which appropriate instructions are carried out through operation of the device.

As can be appreciated, numerous different types of data bearing records for goods and services deliveries and fulfillment, payment types and other features can be carried out through operation of systems employing the principles that have been described herein. For purposes of operating a flexible central server system or other system for carrying out transactions in response to different types of data bearing records, certain types of functions may be utilized. FIG. 20 represents a graphic representation of different functional areas or elements that are addressed in connection with numerous different types of systems. Of course these functional elements are exemplary and other systems may include requirements for addressing additional functions. The graphic representation displayed may correspond to software objects, subsystems, modules or other related functional capabilities that are carried out by hardware, software or networks in systems of exemplary embodiments.

For example, in the exemplary arrangements for processing payments associated with data bearing records in connection with the delivery of goods, an exemplary system acquires and resolves check data as represented by element 288, and invoice data as represented by element 290. The exemplary systems also acquire and resolve cash data as represented by element 292 and credit item data as represented by element 294. Of course as can be appreciated, not all this data needs to be acquired and determined in connection with certain systems. However, in other systems depending on the capabilities required, additional types of data may need to be acquired and resolved in order to accomplish the necessary processing of transactions.

Figure 21:
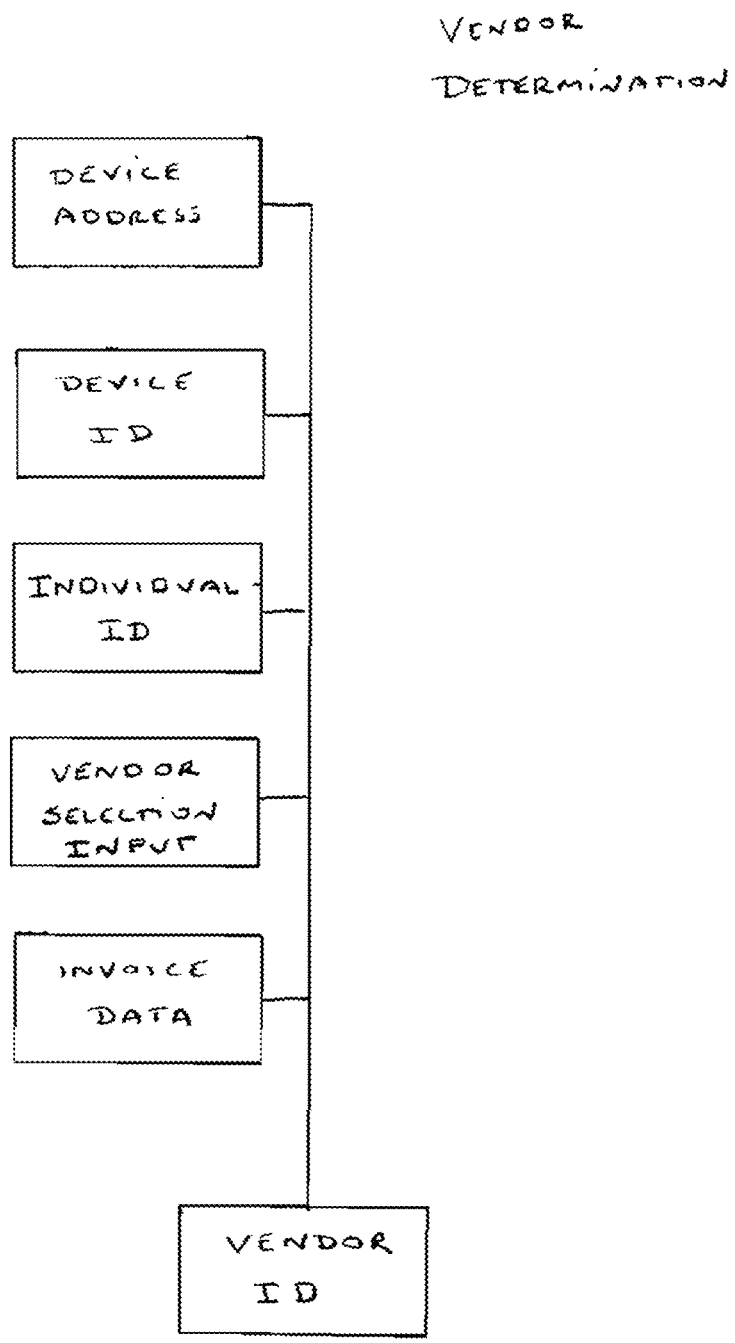
FIG. 21 is a schematic view showing different items of information that may be considered in exemplary systems for determining a vendor entity associated with a transaction.

Other functional elements of the exemplary systems include determining the vendor associated with the particular transaction when multiple vendors are accommodated by the system. This is represented by element 296. FIG. 21 represents factors that are utilized in connection with an exemplary functional element 296 to determine a vendor identifier. Of course not all these data elements may be available in connection with certain systems or transactions. Further as can be appreciated, the analysis carried out in connection with element 296 may require one or more of the data elements to correspond to appropriately make a suitable selection of the vendor identification. For example as represented in FIG. 21, data including the network address of the particular device 12 may be indicative of the particular vendor associated with a particular transaction. As can be appreciated, particular devices may be associated with particular vendors or a set of vendors. Alternatively device identifiers associated with a particular device may also be correlated with a particular vendor or set of vendors.

Factors such as the identity of the particular individual who accomplishes the deliveries may be indicative of a particular vendor or a subset of vendors. Alternatively and/or in addition, certain transaction flows require the input of a particular vendor selection input through the device. Further, data included in invoice data or in credit item data may indicate an identifier for the particular vendor. This may include a vendor identification value, vendor logos, vendor addresses or other information that can be used to directly identify the vendor. Alternatively, invoice or other data may be utilized in connection with data stored in connection with the central server to resolve the particular vendor. For example, a transaction ID may be correlated with a particular transaction that has vendor data stored in association therewith. Of course these factors are exemplary and in other arrangements, other factors and approaches may be used.

Figure 22:
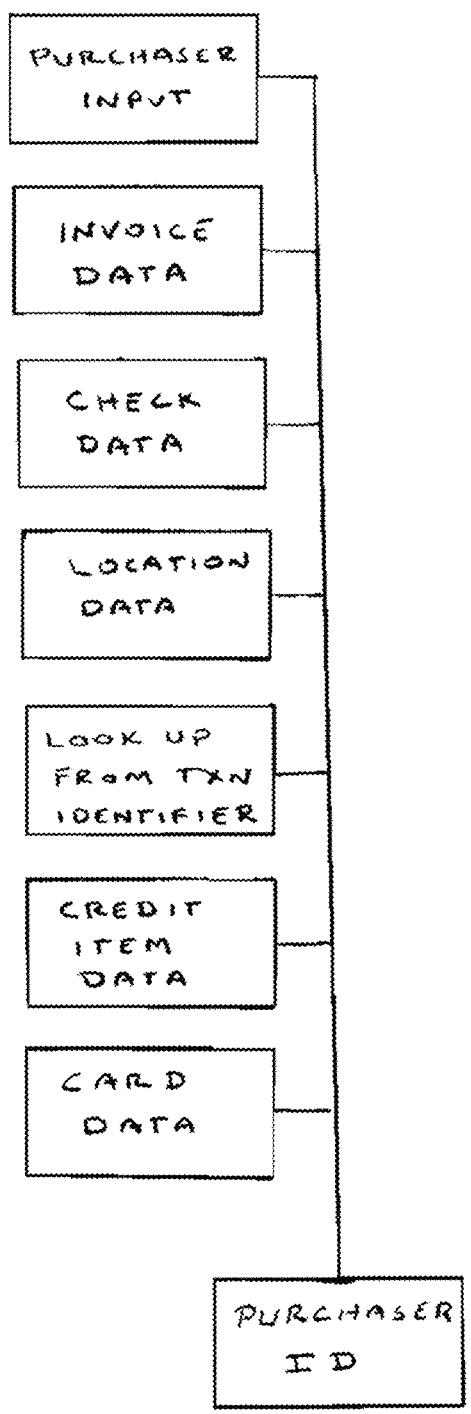
FIG. 22 is a schematic view showing different items of information that may be considered in determining a purchaser associated with an exemplary transaction.

Functional element 298 corresponds to determining a particular purchaser associated with a given transaction. In exemplary embodiments the identification of the purchaser by the element 298 may include evaluation of the factors shown in FIG. 22. Factors included in the determination may include purchaser identifying data input into the device, or information included in invoice data or credit item data. Other data used for identifying the purchaser may include check data such as the payee data, card data associated with a card transaction, and/or the holder of the particular card account may also be used in some arrangements to identify the purchaser. The purchaser identification data may also be resolved from location data based on the location of the device during the transaction. The purchaser identifying data may also be resolved from data stored in connection with the central server in connection with the transaction identifier or other read or input data. Of course other items of data or combinations of these elements may be utilized in connection with the operations of function element 298 to determine the purchaser associated with the transaction.

Figure 23:
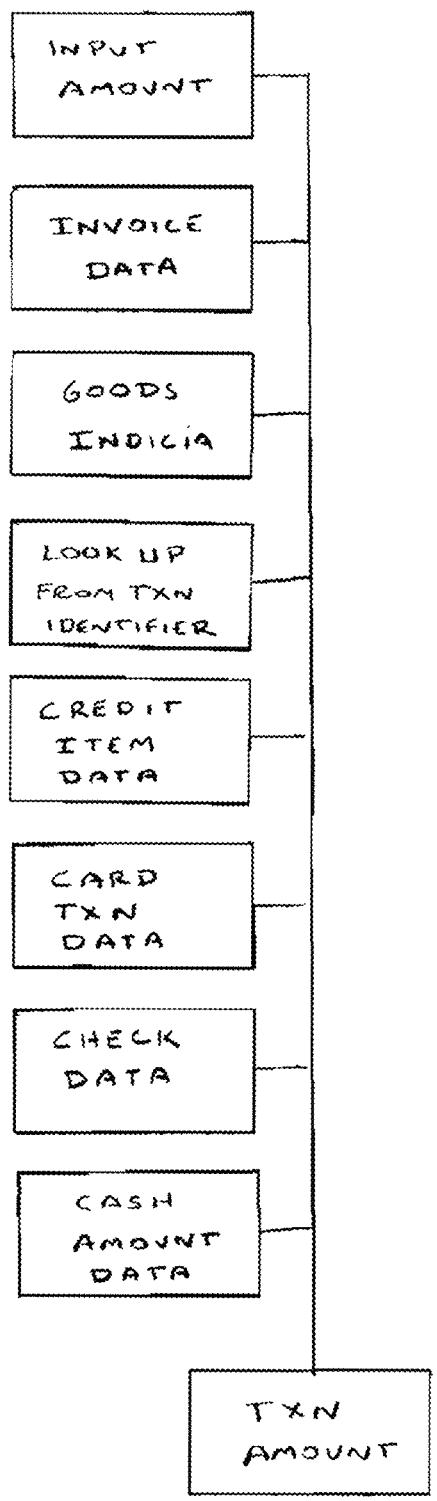
FIG. 23 is a schematic view showing different items of information that may be considered in determining an amount associated with a transaction in an exemplary system.

Element 300 is operative to determine the monetary amount associated with a particular transaction. The determination achieved by element 300 may be accomplished using the data represented in FIG. 23 in exemplary arrangements. Such data may include depending on the nature of the transaction may include amount data that may be resolved from inputs to the device or invoice data read from an invoice through operation of the device. Alternatively for some transactions amount data may be determined by reading data from bar codes, RFID tags or other goods identifying data through operation of the device. Amount data may also be indicated by amount data associated with received checks, cash amounts and/or card transactions. Of course it should be understood that in some situations amounts paid by purchasers do not correspond to the amount invoiced for a current delivery of goods or services. However, such payment data is often at least an indicative factor which identifies the transaction amount. Further as represented in FIG. 23, transaction amounts may be resolved from data correlated with other values such as the transaction identifier which is stored in data stores associated with the central server.

Figure 24:
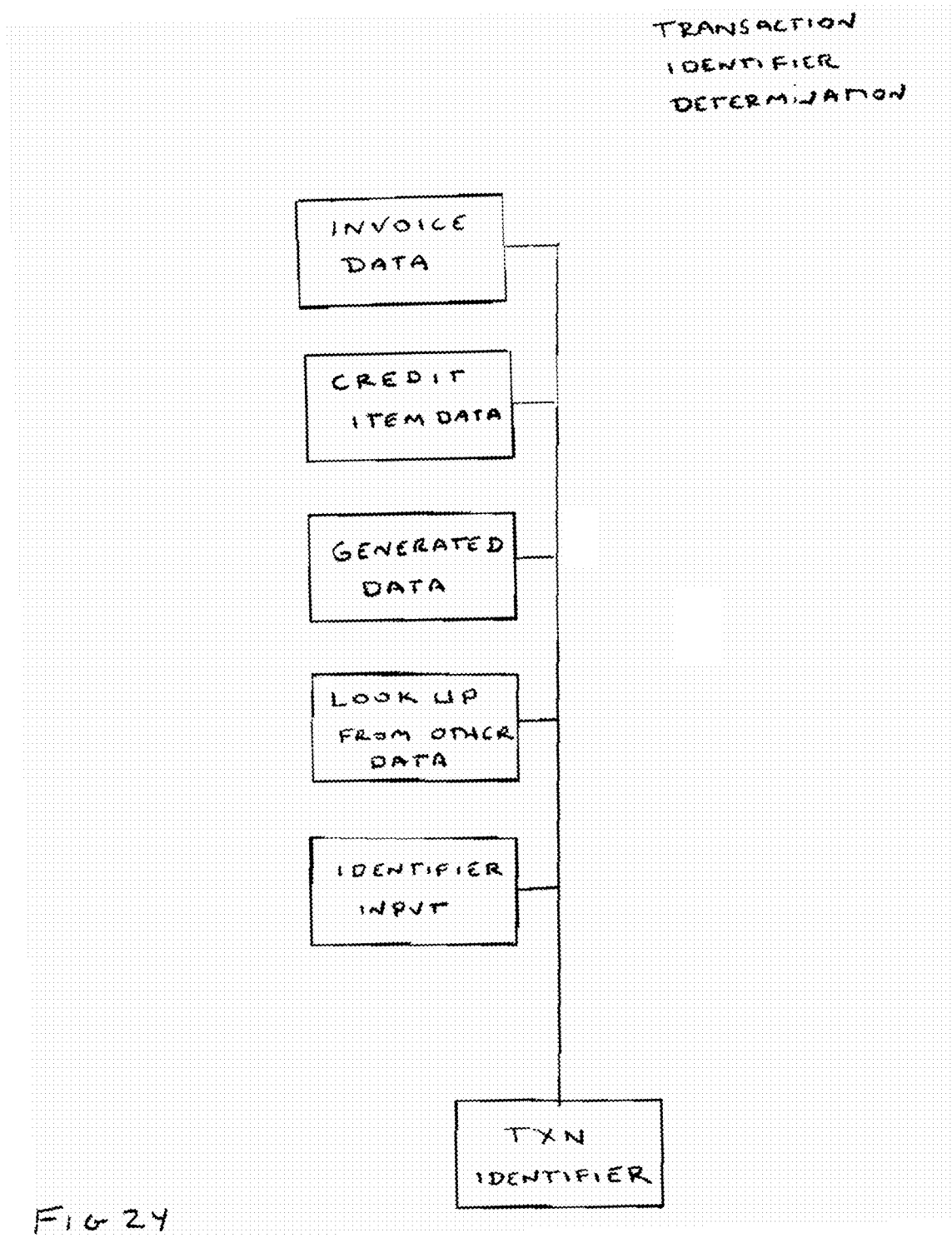
FIG. 24 is a schematic view showing different items of information that may be considered in determining a transaction identifier associated with a transaction in an exemplary system.

Functional element 302 of the exemplary system is operative to carry out the determination of the transaction identifier associated with the particular transaction. The determination made by the functional element is accomplished through processing of data elements like those represented in FIG. 24. Such data elements may include a transaction identifier included in invoice data or in credit item data. The transaction identifier may also be the generated value stored in data stores associated with the device and/or the central server when the transaction identifier is generated proximate to the time of the transaction in situations like those previously discussed.

Alternatively or in addition, in some exemplary arrangements the individual operating the device may provide transaction identifying inputs through input devices at the time of carrying out the transaction. Further, in some exemplary arrangements, the transaction identifier can be resolved from other data associated with the transaction. This may be, for example, information such as the type and amount of goods delivered, the vendor and purchaser information associated with the transaction, or other data that can be correlated with stored data to identify a particular transaction with which the data is associated and whereby the particular transaction identifier which relates thereto. Of course it should be understood that these factors that are utilized in exemplary processing by the functional element 302 are merely examples and in other arrangements, other approaches may be used.

Figure 25:
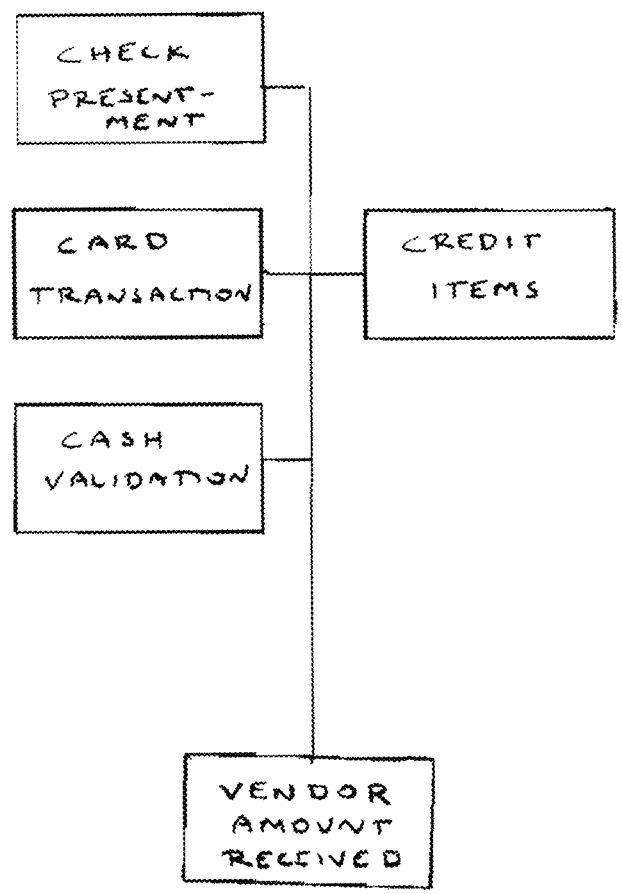
FIG. 25 is a schematic view representing funds processing activities associated with an exemplary system.

Functional element 304 corresponds to the functions carried out through operation of the central server, by the device and/or by other systems in connection with processing financial transfers. Such processing may include in exemplary embodiments the check presentment of received financial checks, the processing of payments received from card transactions and the deposit of cash received from purchasers in connection with cash payments as previously discussed. In addition, functional element 304 also includes in exemplary environments, the processing of credit items which may provide credits for purchasers against amounts that are owed to vendors. The processing of such different types of transactions is represented schematically in FIG. 25 and generally produces the data which corresponds to the amount that the vendor receives in connection with a particular transaction. Of course it should be appreciated that the functions, steps and operations that are carried out in connection with element 304 will vary depending on the nature of the transactions that are accomplished in connection with the particular system.

As represented in FIG. 20, the exemplary system includes a validation functional element 306. Functional element 306 of the validation element includes those features, processes and steps that are carried out to properly correlate payments received from purchasers to accounts payable for each particular vendor. This includes the features carried out by systems described in the incorporated disclosure as well as other steps that may be taken to properly apply and collect payments for transactions carried out through the system.

Functional element 308 includes the audit functions that are carried out to assure that the data which is processed and the transactions and financial transfers that are made through the exemplary system are carried out correctly. Such audit processes may include, for example, assuring that cash received in the course of delivery transactions corresponds to the cash indicated as received through operation of the devices 12. Such other functions may include prompting through appropriate systems and devices, individuals who retrieve items from depositories to provide information about the contents thereof so as to identify any discrepancies. Likewise, the validation functionality may include assuring that check data is accurate, has not been modified, forged or otherwise manipulated in ways that are improper. The steps executed in connection with the audit functional element 308 generally help to assure the integrity of the system and that all transactions are carried out and accounted for in a proper manner.

Functional element 309 includes the posting functions carried out through operation of the system. The functions carried out through operation of the posting functional element include making the payments to the appropriate vendor accounts and showing the appropriate credits to purchaser accounts for payments made to vendors in connection with deliveries. The posting functions also may include activities such as invoicing customers for amounts owed, crediting customers for refunds or other credits, and otherwise adjusting accounts and producing the records as appropriate to reflect the transactions carried out through operation of the system.

Of course it should be understood that these functional elements are merely representative of functions carried out through exemplary systems of the types that have been described herein. Numerous different variations of such elements, devices, processes and steps may be implemented in accordance with approaches that have been described.

Figure 26:
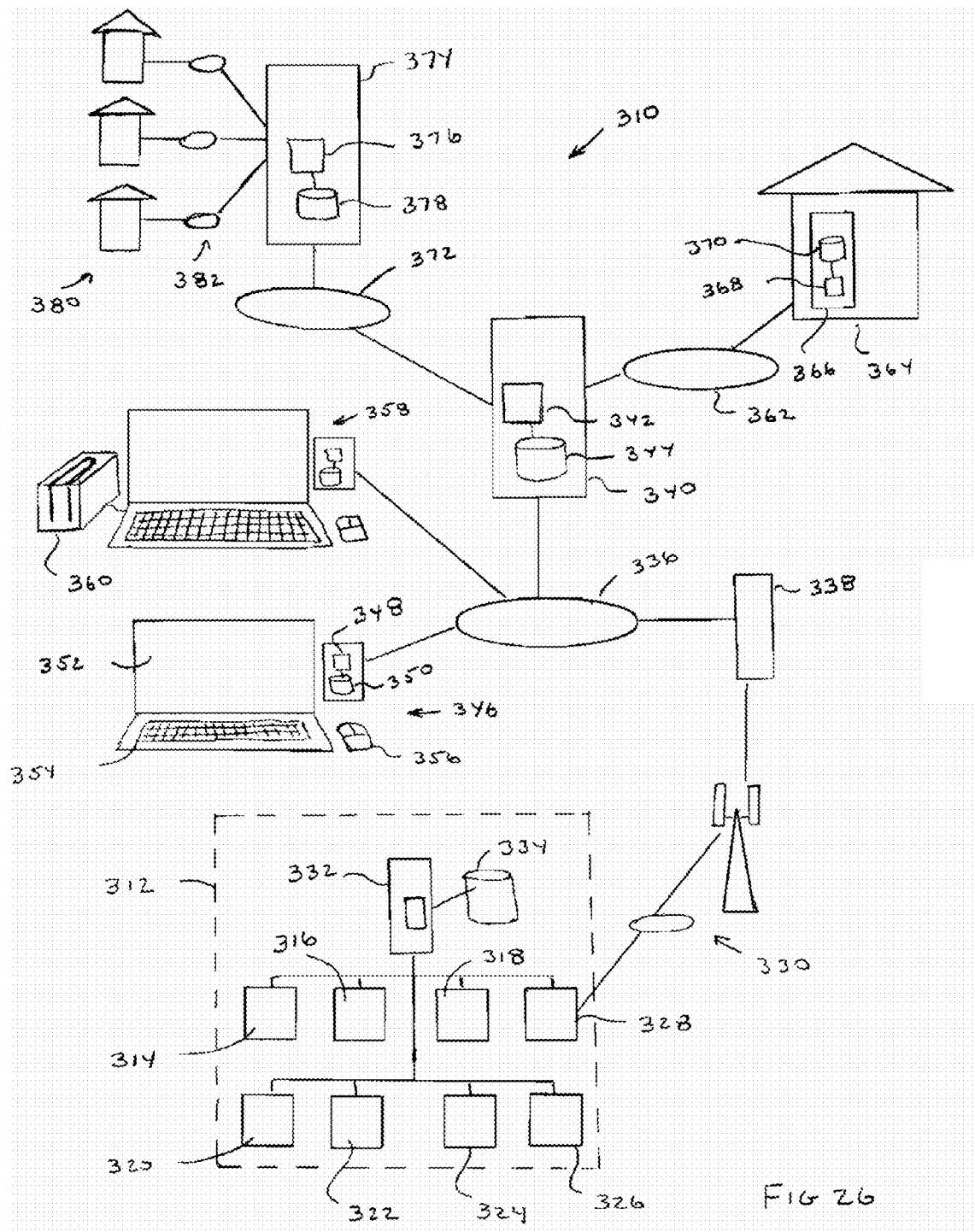
FIG. 26 is a schematic view of an alternative exemplary system that accomplishes financial transfers responsive to data included on data bearing records.

FIG. 26 shows schematically an alternative embodiment of a system 310 that operates responsive to data read from data bearing records. The exemplary system 310 operates to enable payees of financial checks to deposit such checks in their selected financial account. In some exemplary arrangements, the system 310 may be a part of or operated in conjunction with features such as those previously described in connection with system 10. Alternatively in other arrangements, system 310 may be operated as part of a separate system. System 310 includes a mobile device 312 which is shown schematically. In some embodiments, the mobile device 312 may be a portable device that is substantially the same as device 12 of the previously described embodiment. The exemplary device 312 includes a digital camera 314. Camera 314 serves as part of a reader which operates as an image capture device. Device 312 further includes a display 316. Display 316 of the exemplary embodiment is a visual touch screen display. The visual touch screen display is integrated with at least one manual input device schematically represented 318. Input device 318 of exemplary embodiments may correspond to a capacitance or inductance type touch screen detection circuit that can detect points of contact with the touch screen display so as to provide input selections to the device 312 based on outputs through the display 316. However, in other embodiments, other types of input devices may also be used such as switches, buttons, wireless input devices, etc.

The exemplary device 312 further includes an audio interface 320. The audio interface 320 may include speakers, a microphone or other devices that enable communication to and from the device 312 via audible inputs and outputs. A biometric reader 322 is included in exemplary device 312. Exemplary biometric readers may include a fingerprint reader, iris scanner, retina scanner or other device that can receive biometric inputs. It should be understood that the digital camera 314 and/or the audio interface 320 may also serve as biometric input devices in some embodiments.

The exemplary device 312 further includes a GPS receiver 324. GPS receiver 324 may be of the type previously described and enables determining the positioning of the device as well as the location of the device relative to other devices and structures. The exemplary device further includes a wireless port 326. Wireless port 326 may be in operative connection with circuitry that enables communication of the device 312 with other devices via RF communications. Such communications may be local communications such as via Bluetooth or NFC.

The exemplary device 312 further includes a wireless communication interface 328. The exemplary wireless communication interface includes circuitry which is usable to enable the device to communication with cellular telephone systems or similar networks via RF. Such communications are represented schematically by cellular network 330.

The exemplary device 312 further includes at least one processor circuit 332. The processor circuit 332 may be one of the types previously discussed. The processor circuit 332 may include or be in operative connection with one or more data stores 334. Data store 334 may be of one of the types previously discussed and is operative to hold processor circuit executable instructions and data. Of course it should be understood that the device 312 is exemplary and other devices including other or different components, features and capabilities may be utilized in other exemplary systems which perform the functions described herein.

System 310 further includes a network 336. In some exemplary arrangements, network 336 may be a public network such as the Internet. In other arrangements, network 336 may be a private network. Further in other arrangements, network 336 may be made up of a combination of multiple networks including public and private networks.

Cellular network 330 is operatively connected to network 336 through one or more suitable interface servers schematically represented 338. Interface server 338 includes one or more processor circuits and data stores of the type previously described. The interface servers include suitable program instructions to enable messages through the cellular network to be communicated with network 336.

At least one computer 340 is in operative connection with network 336. Computer 340 includes at least one processor circuit schematically represented 342 and one or more data stores schematically represented 344. It should be understood that in exemplary arrangements, computer 340 may be made up of a plurality of interconnected computers such as server computers or other devices that are capable of carrying out the functions that are described herein in connection with computer 340.

Also in operative connection with network 336 is a payee terminal 346. In the exemplary embodiment the payee terminal 346 may include a desktop PC or a laptop computer that is configured to be used as a terminal operated in an establishment of an entity such as a vendor that receives checks in payment for goods, services or other obligations. For purposes of brevity herein all forms of goods, services, obligations or other things for which payments are received may be referred to as "goods" and an entity that receives payment for any of such things may be referred to as a "vendor." However, it should be understood that in other arrangements, the payee terminal 346 may include a portable terminal such as a tablet computer, a smart phone or another type of mobile computing device.

The exemplary payee terminal 346 includes at least one processor circuit 348 and at least one data store 350. Processor circuit 348 may be in operative connection with a network interface circuit that enables communication with the network 336. In some arrangements, the network interface may be a wired connection, and in other arrangements the network interface may be a wireless interface such as a WWAN connection or a cellular connection.

The exemplary payee terminal further includes a display 352 and one or more input devices. Such input devices may include, for example, a keyboard 354 and a mouse 356. The payee terminal may also include other or different input and output devices. Such output devices may include speakers, Braille keypads, a printer, or other devices from which outputs may be perceived. Other input devices may include, for example, a touch screen, a microphone, a digital camera, a biometric reader, speech recognition circuitry, etc. Of course it should be understood that these components are exemplary. Further, the payee terminal 346 may include other circuitry, devices, peripheral components, interface circuits or other devices, features, processor circuit executable instructions or other items to carry out the functions described herein.

Another payee terminal 358 is in operative connection with network 336. Payee terminal 358 may be generally similar to payee terminal 356. However, payee terminal 358 further includes a desktop check scanner 360. The exemplary desktop check scanner 360 is usable in connection with payee terminal 358 to scan and capture digital image data from financial checks. The desktop check scanner in combination with payee terminal 358 is also capable of reading indicia included on checks. Such indicia may include visible indicia as well as magnetic indicia such as magnetic printing in a micr line on the check which identifies the check payor/makers bank and account information. Such a desktop check scanner may also be used to read data from other documents such as invoices, deposit tickets, bank checks or other items. Of course it should be understood that the configuration of payee terminal 358 is exemplary and in other arrangements other components, features and capabilities may be used.

In the exemplary system 310, computer 340 is in operative connection through a network 362 with a financial institution 364. The financial institution includes one or more computers such as servers represented by a computer 366. Computer 366 includes at least one processor circuit 368 and at least one data store 370 which may be of the types previously described. In the exemplary arrangement, the one or more computers 366 of the financial institution 364 is operative to maintain financial data corresponding to accounts of payees who operate the payee terminals and who utilize the system to conduct transactions on such accounts including the making of deposits corresponding to financial checks received by the payee.

It should be understood that in some exemplary arrangements, the computer 340 may be operated by or as part of the computers of the financial institution 364. In such arrangements the functions described herein in connection with computer 340 may be combined with the functions described in connection with the one or more financial institution computers 366. It should be understood that in various embodiments, different system environments and entities may be involved in carrying out the functions described.

Computer 340 is further in operative connection with a check presentment network 372. Check presentment network 372 may be similar to check presentment network 66 described in connection with the previous embodiment. The check presentment network 372 includes servers such as server 374. Each of servers 374 include one or more processor circuits 376 and data stores 378 which may have structures like those previously described.

The check presentment network 372 and the server computers therein are operative to communicate with computers located at banks 380 through one or more networks 382. The server computers 374 are operative to cause electronic check images and check data to be presented for payment to the banks on which the checks are drawn by the payors of such checks. The computers of a banks on which a check is drawn are then operative to indicate whether the check is paid and to transfer the funds between the institution on which the check is are drawn and the institution of the payee who deposits the check in their account. Exemplary check presentment networks may include, for example, consortiums of banks, private check processing networks and/or the Federal Reserve. The check presentment networks also advise if a check presented for payment is dishonored due to insufficient funds in the payor's account or for other reasons. The check presentment network is operative to provide exception handling in such circumstances and to advise the entity presenting the check for payment of the fact that payment on the check has not been made. Of course it should be understood that these features and functions are exemplary and in other arrangements, different configurations, features and functions may be performed.

Exemplary embodiments provide for a payee entity of financial checks to be able to deposit such checks in their respective financial account held by the payee's financial institution. In exemplary arrangements, the payee of such checks is generally a vendor who is a merchant who provides goods or services and who receives payments in the form of financial checks. In some exemplary arrangements, the payee may be a merchant providing food items of the type described in connection with the previously described embodiment. For example payee terminals of the type described herein may be operated in establishments of such a merchant who receives financial checks in payment by mail or within business establishments in which goods or services are provided. In other arrangements, payees of checks may include vendors who are providers of other types of goods or services for which payments are received in the form of financial checks.

A useful aspect of some exemplary embodiments includes the capabilities for a merchant or other payee of financial checks to make the deposit into their account without having to have a desktop scanner such as scanner 360 in connection with their payee terminal. The ability to avoid the use of a desktop scanner reduces cost for the check payee and/or the financial institution of the payee who must pay the cost to acquire the scanner and also maintain such a scanner in operation including fixing any malfunctions or replacing the scanner when it becomes worn out.

FIGS. 27-40 and 63-65 schematically show exemplary arrangements that enable a payee terminal to be operated to deposit checks using a mobile device such as mobile device 312 in lieu of a desktop scanner. FIGS. 41-47 represent schematically logic flow carried out by the computer 340 and the mobile device 312 in accomplishing such capabilities.

Figure 41:
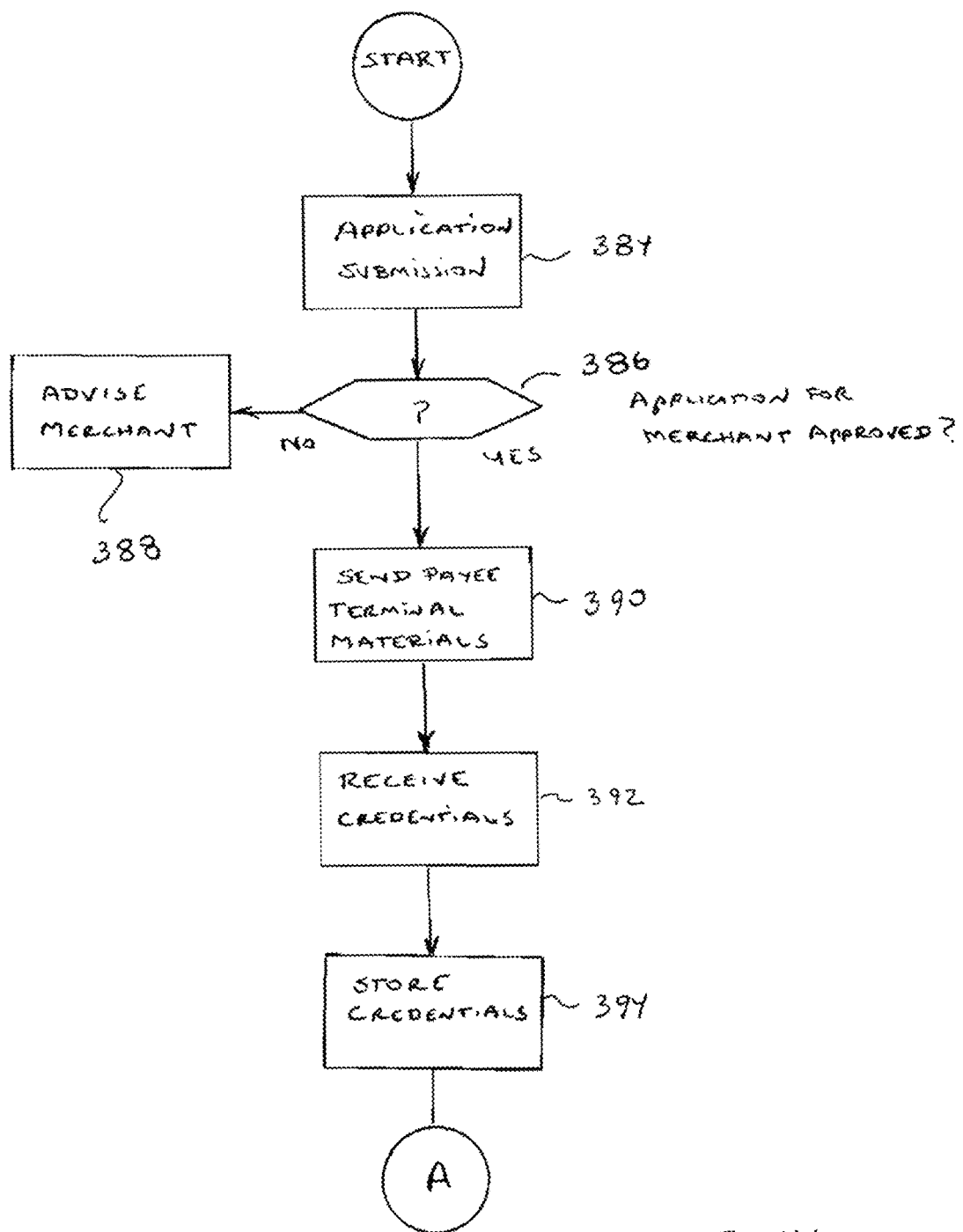
FIGS. 41-45 are a schematic representation of an exemplary logic flow carried out through operation of a central computer or other related computers in connection with processing check transactions.
Figure 42:
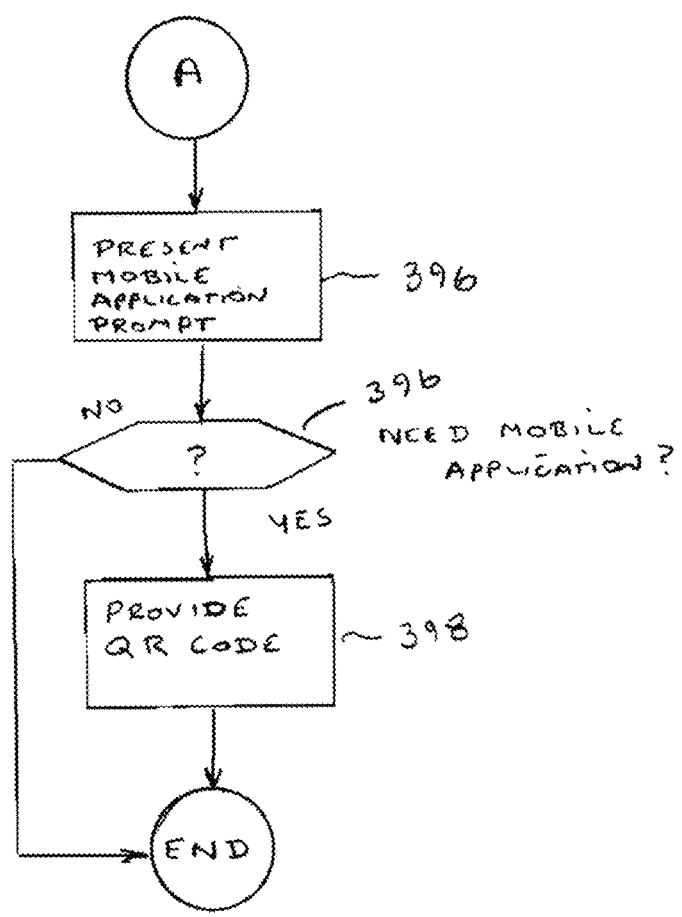

As schematically represented in FIG. 41, in an exemplary process the merchant payee who will receive checks and electronically deposit them in their financial account with a financial institution, will generally first need to apply to the financial institution or an operator of the system associated with computer 340 in order to obtain this capability. This is represented by the application submission step 384 shown in FIG. 41. In some arrangements the application process may be part of the financial institution's procedures to enable a merchant to engage in electronic banking functions. Such functions may include not only remotely depositing amounts related to checks into their account but also other transactions functions. Such other transaction functions that may be carried out remotely may include the capability to transfer funds between accounts that the merchant payee may have with the institution. Such capabilities may also include electronic bill payment or other financial transaction capabilities. In the case of an independent operator of the service not associated with a financial institution, the transactions may include managing the customer payments to the merchant payee and depositing the payee received checks into the payee's financial accounts with a financial institution.

As represented in FIG. 41, the financial institution or other system operator will make a determination as to whether the merchant payee is authorized to use the remote deposit capabilities. This is represented in a step 386. If the financial institution or other operator decides that the merchant payee does not qualify for the electronic check deposit function or otherwise is to be turned down, the merchant payee is notified as represented by a step 388. The financial institution or other system operator may work with the merchant in order to help the merchant to qualify or set up the necessary account or satisfy other requirements as required by the institution to obtain the capability.

Figure 27:
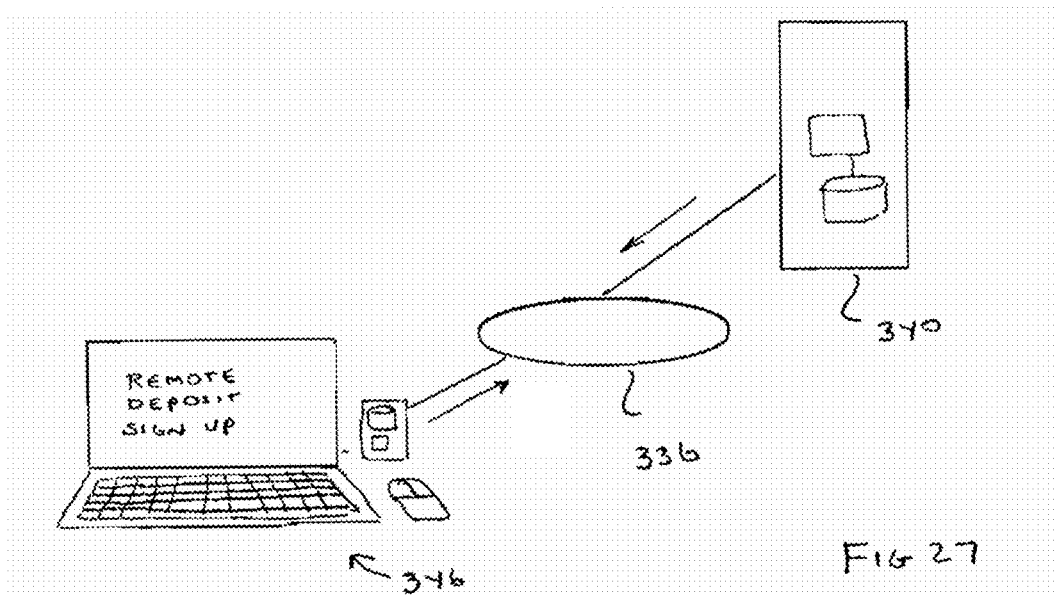
FIGS. 27-40 are schematic views representing communications by a payee terminal and a central computer in connection with processing exemplary transactions involving checks.

If the merchant payee is qualified for the electronic check presentment, the payee is provided with certain materials. This is represented in a step 390. In some exemplary arrangements, the sending of payee materials may be sent to the payee terminal 346 as represented in FIG. 27. In some exemplary arrangements the payee materials may be sent in a encrypted digital certificate which corresponds to a pair of asymmetric public and private keys. The certificate may be encrypted in a manner that assures that the certificate data is not intercepted in transit between the computer 340 and the payee terminal 346. In some exemplary arrangements, the certificate may be encrypted using one or more keys that are sent to an operator of the payee terminal via a separate message or a different communication channel. This may enable the merchant payee who operates the payee terminal 346 to decrypt and install the certificate in a secure manner on the payee terminal. Of course this approach is exemplary and in other arrangements, other approaches may be used.

Alternatively or in addition, the computer 340 may communicate with the payee terminal 346 to have the merchant payee input other identifying information that is used to authorize access to the remote computer and the merchant's account information. This may include, for example, prompting the merchant to provide authentication factors such as passwords, biometric inputs or other kinds of inputs that can be used for authenticating the payee terminal operator who is authorized to access the account data. Alternatively or in addition, payee terminal identifying data such as serial number data associated with certain components of the payee terminal, network address data or other data may also be utilized as factors that can be used for authenticating the authority of the payee terminal and/or the operator thereof to operate the system.

In the exemplary arrangement, the computer 340 securely receives communications from the payee terminal such as for example messages that are encrypted using the private key corresponding to the certificate, to send credentials that identify the authorized user and/or payee terminal. The receipt of such credentials is represented by a step 392 in FIG. 41. It should be understood that for purposes of this disclosure, a plurality of items of information that are used to authenticate a payee user and/or payee terminal are referred to as a credential. Upon receiving the credentials that will enable accessing of account data at the computer 340, the computer operates in accordance with its programming to store the credential information and to also associate the credential information with the payee's financial account. This is represented in a step 394.

In the exemplary embodiment the computer 340 operates in accordance with its programming to enable the merchant payee to obtain a mobile application to operate in the mobile device 312. The mobile device application enables the mobile device 312 of the exemplary embodiment to be used to capture digital check image data corresponding to the visual appearance of one or both sides of financial checks that the merchant payee receives in payment for its goods and/or services. In some embodiments the application may also be used to capture invoice or other transaction record related data. As represented by a step 396 in FIG. 42, the computer 340 sends messages to cause outputs on the display of the payee terminal to present the merchant payee with the option to obtain the mobile application for their device 312. In response to the merchant payee providing an input through at least one input device of the payee terminal indicating that they do wish to acquire the mobile app as represented in a step 398, the computer 340 operates in accordance with its programming to send messages to the payee terminal 346 which causes the payee terminal to output a QR code and other information that can be used for the acquisition of the mobile application. This is represented by a step 398 as well as in FIG. 28. Alternatively if the merchant payee provides an input to the payee terminal that they do not need to acquire the mobile application, the information regarding the acquisition of the mobile app is not presented.

Figure 28:
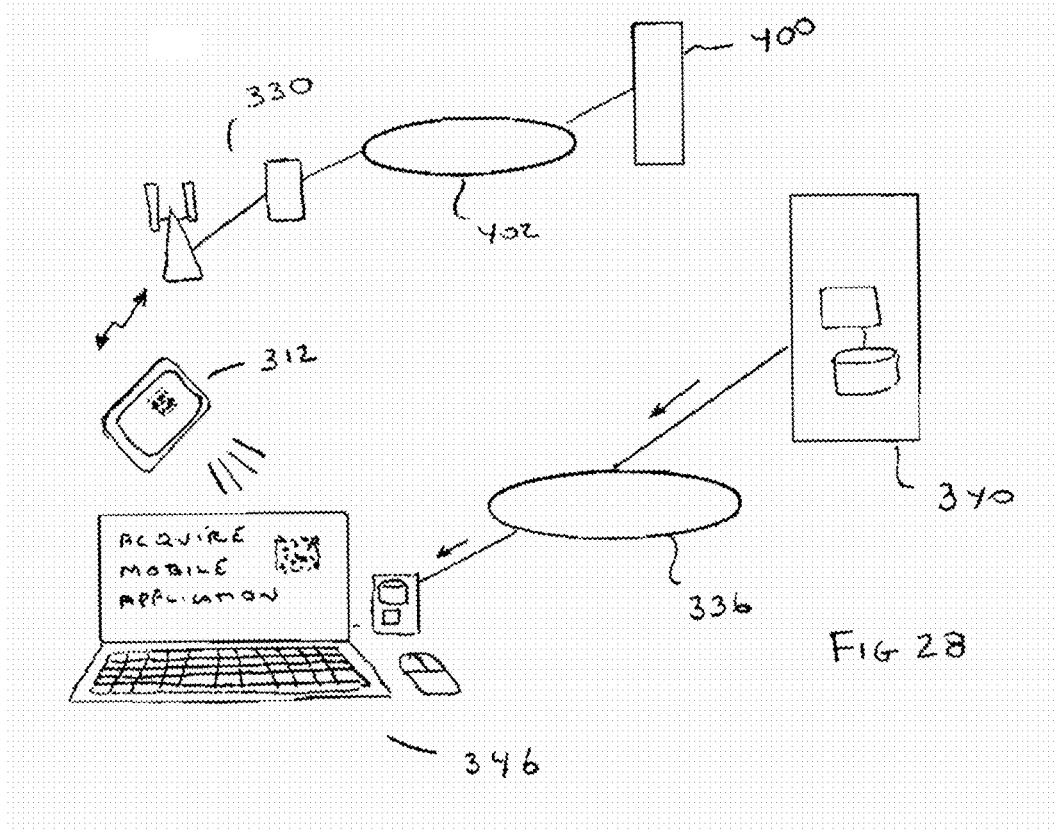

As represented in FIG. 28, if the computer 340 operates to provide the information concerning acquisition of the mobile application to the payee terminal, the exemplary payee terminal is operative to output a bar code. The exemplary bar code is output in the form of a two-dimensional bar code and specifically a QR code. The exemplary QR code includes instructions which can be utilized by the exemplary mobile device 312 to obtain the desired circuit executable instructions which are included in the mobile application. In the exemplary arrangement the mobile device 312 is operated responsive to user inputs to the user input device to use the digital camera to capture the bar code image data output on the display of the payee terminal, and to resolve the instructions and data included in the bar code to wirelessly contact through the cellular network 330 an appropriate network address of a server 400 from which the circuit executable instructions of the mobile device application can be acquired. In some exemplary arrangements the mobile device may acquire the mobile application from a site located on a public network such as the Internet 402. For example in some arrangements the mobile device application may be acquired from a site which provides numerous different applications that can be utilized by mobile devices. Alternatively in other arrangements, the mobile device application may be acquired from the web site of the financial institution which holds the merchant payee's accounts. Alternatively in other arrangements, other sources for the mobile device application can be provided such as sites made available on either public or private networks by the operator of the system which includes computer 340. Of course these approaches are exemplary.

Responsive to accessing the mobile device application, the device 312 operates the at least one mobile processor circuit therein to cause mobile processor circuit executable instructions corresponding to the mobile application to be stored in the at least one data store 334 of the mobile device. In the exemplary arrangement, these mobile processor circuit executable instructions associated with the application enables the device 312 to accomplish functions that are described herein.

Figure 29:
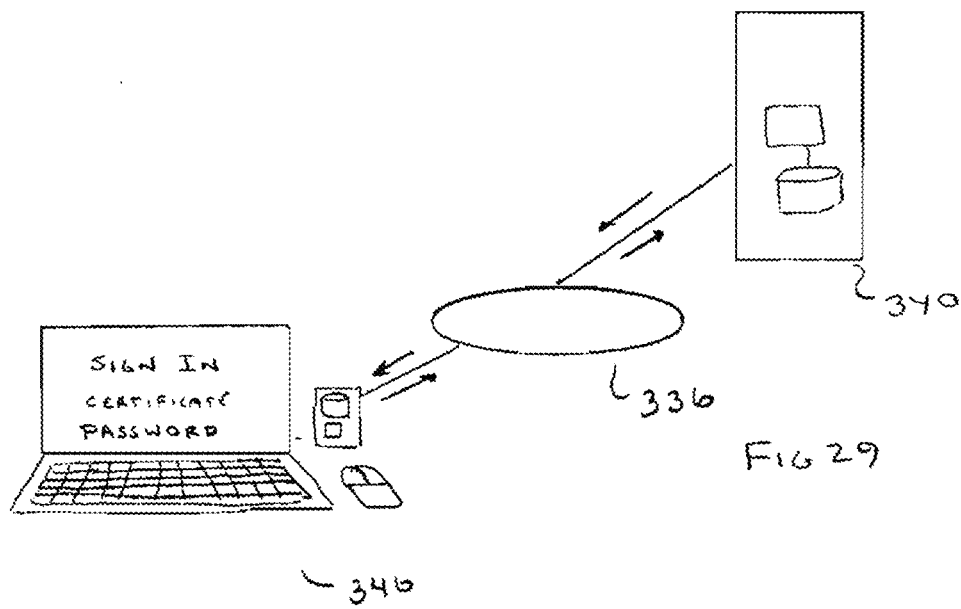
Figure 30:
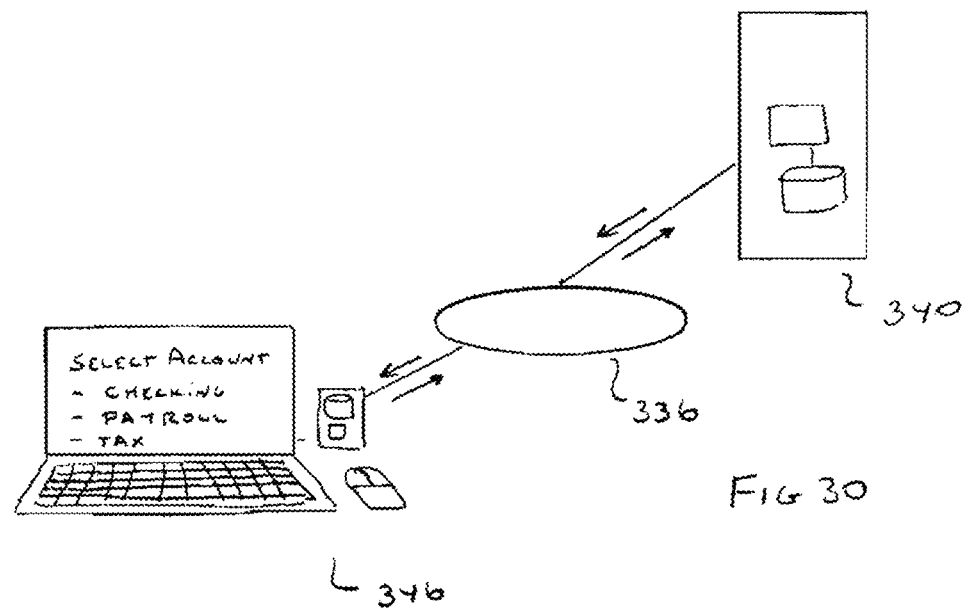
Figure 43:
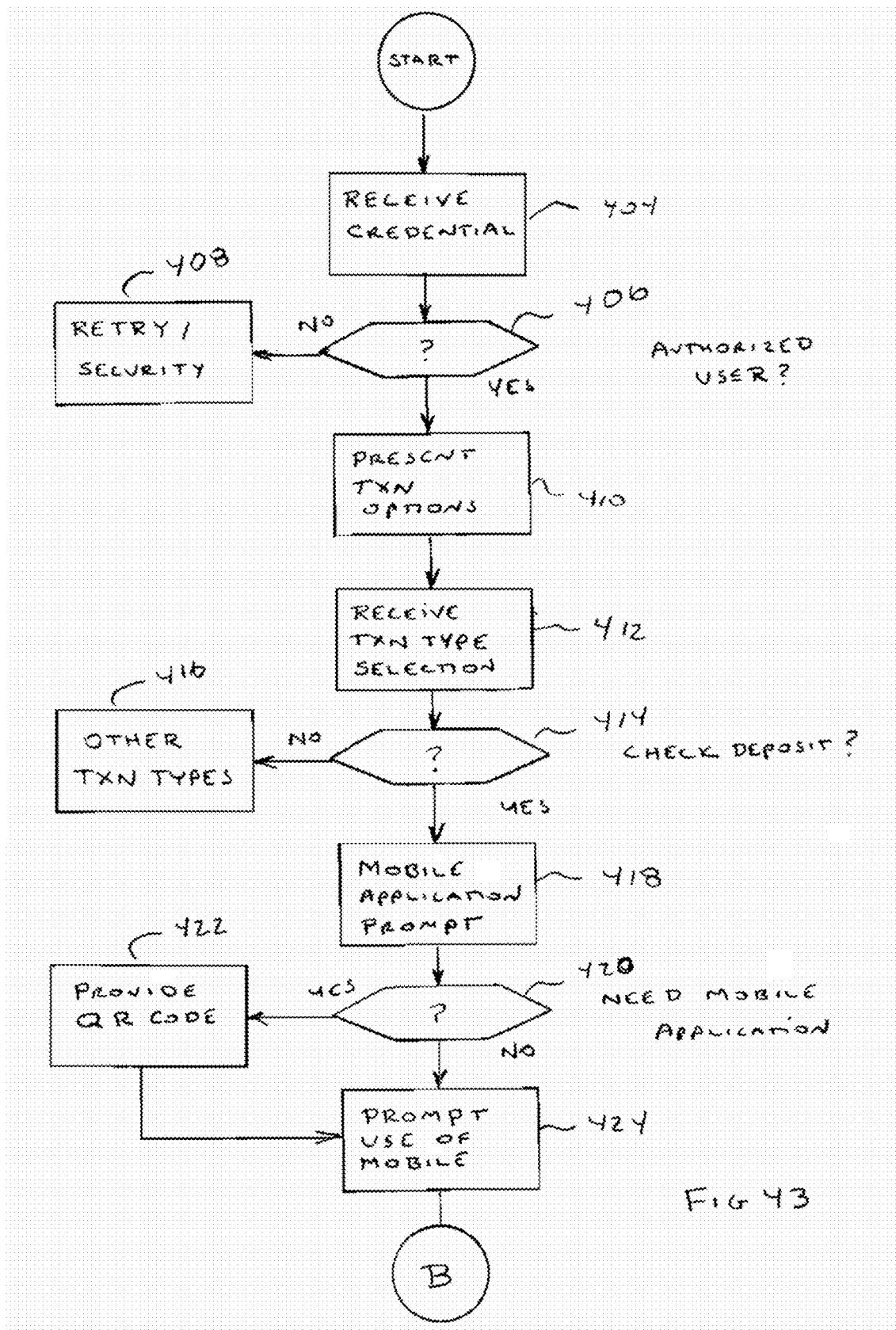

The exemplary system 310 can be operated by a merchant payee in order to make deposits of checks into the payee's account. In the exemplary arrangement this is carried out by the operator of the payee terminal 346 providing inputs to the computer 340 so as to establish that the user and/or terminal is authorized to access the system. This is represented in FIG. 29 and by a step 404 in the logic flow carried out by the computer 340 as represented in FIG. 43. As represented by step 404, the user provides their credential via the payee terminal 346. As previously mentioned, the credential may include a password, digital signature, biometric input, terminal identifier or other suitable credential or a combination thereof which corresponds to data stored in the data store of the computer 340 and which is associated with the merchant payee account. The computer then operates in accordance with its programming in a step 406 to determine if the credential corresponds to an authorized user or account. If it does not, the user may be given another opportunity to input an authorized credential or be given other opportunities to establish that they are authorized to use the system as represented in a step 408.

Figure 31:
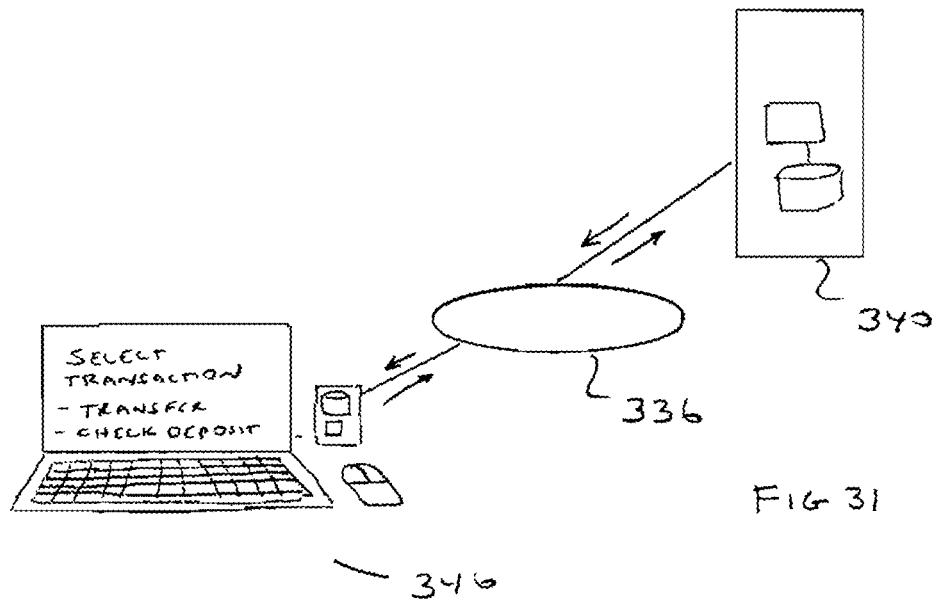

If the credential corresponds to that of an authorized user and/or authorized payee terminal, the computer 340 then operates to cause the payee terminal to present transaction options. This is represented in a step 410 as well as in FIG. 30. The computer 340 may cause the transaction selections to first cause the payee terminal to give the user options as to select via input the particular payee account that will be involved in receiving the deposit transactions. The user may select one of output indicia that correspond to a plurality of available accounts by providing inputs to one of the input devices of the payee terminal 346. Once the user has selected the account to receive the deposit, the computer 340 operates to cause the payee terminal to display indicia corresponding to a plurality of possible transactions that the payee user can conduct. This is represented in FIG. 31 in which various transaction selections are shown on the display of the payee terminal. The operator of the payee terminal is then enabled to select the desired transaction option by providing one or more inputs to an input device of the payee terminal 346. The receipt of the transaction selection input is received by the computer 340 and is represented by a step 412 in FIG. 43.

Once the transaction type selection is received by the computer 340 in the step 412, a determination is then made as represented at a step 414 as to whether the selected transaction is a check deposit. As schematically represented in FIG. 43, if the selected transaction is other than a check deposit, the logic flow for the selected transaction is carried out as represented in step 460.

Figure 32:
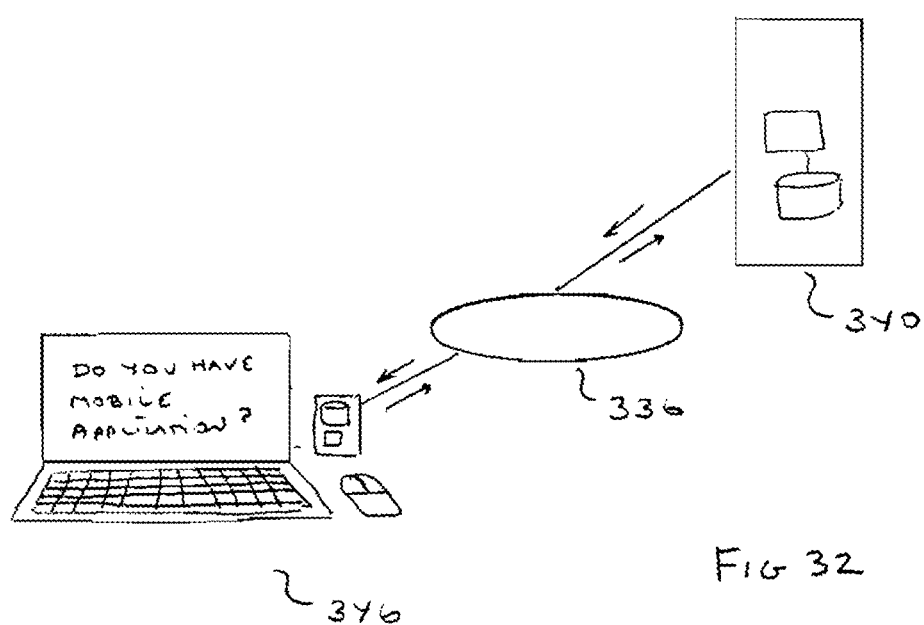

As represented in FIG. 32, if a check deposit transaction has been selected, the computer 340 then operates to cause an output from the display of the payee terminal 346 which prompts the user to indicate whether they need to acquire the mobile application for their mobile device. This is represented in FIG. 43 by step 418. In response to the prompt, the user at the payee terminal provides one or more inputs through the input devices thereof to indicate whether the mobile application is needed. The receipt of the input indicating whether there is a need for the mobile application is represented by a step 420. If the input received in step 420 indicates that the mobile application is needed, the computer 340 operates to communicate with the payee terminal to cause the QR code to be output from the display of the payee terminal in a manner like that previously discussed. This is represented by a step 422. The output of the code which enables obtaining the mobile application can be captured through operation of the device 312 and utilized to obtain the mobile application in a manner like that previously discussed. Alternatively, if in step 420 the input indicates that the mobile application is not needed, the computer 340 proceeds to a step 424 in which it advises the operator of the payee terminal 346 to utilize their mobile device and to prepare to take pictures of the checks to be deposited so as to capture images thereof. This is accomplished in an exemplary embodiment by the computer 340 causing output instructions to be provided on the display of the payee terminal 346.

Figure 33:
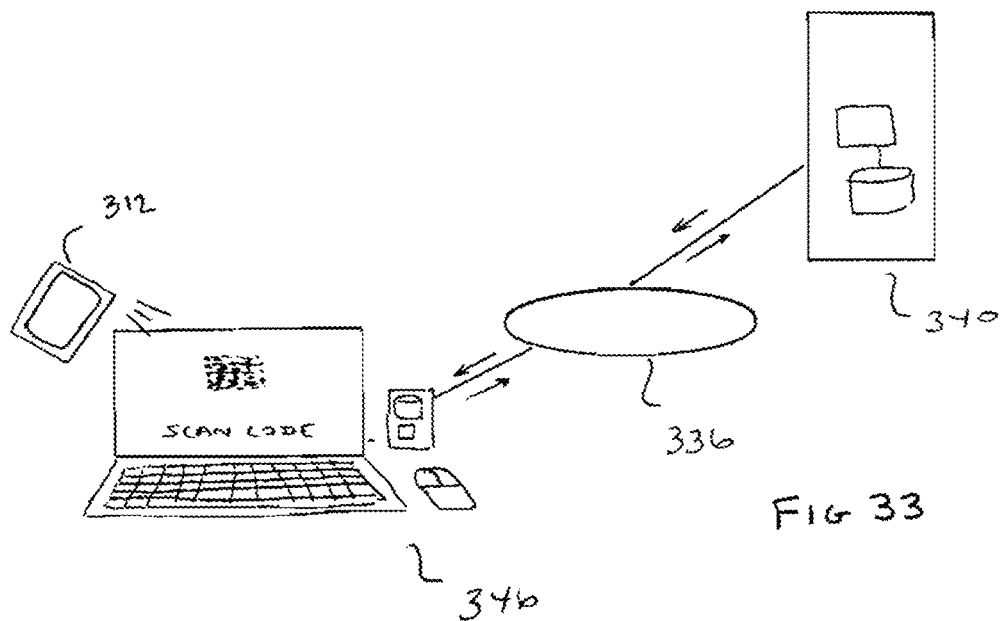

As represented in FIG. 33 and FIGS. 63-65, the computer 340 then operates in accordance with its programming to cause a one-time use QR code to be output through the display of the payee terminal. This is represented by a step 426 in FIG. 44. As represented in FIG. 33, the mobile device 312 is operated in accordance with the circuit executable instructions associated with the mobile application to capture the visible bar code image data from the display of the payee terminal by taking a picture thereof with the digital camera on the mobile device. In the exemplary embodiment the QR code which is caused to be output from the display of the payee terminal includes data that corresponds to one or more encryption keys as well as one or more identifiers. In some exemplary arrangements, the one or more encryption keys may include a public and private (secret) key pair that can be utilized by the mobile device for purposes of providing secure communication with the computer 340. Further the exemplary QR code may also include data corresponding to a public key that is associated with a private key that is stored in the remote computer 340. The corresponding secret or private key to the public key included in the QR code that is displayed, may be maintained by the computer 340 so as to decrypt data in the computer that is encrypted using the corresponding public key. Similarly the computer 340 may maintain the public key of the public and private key pair which is sent to the mobile device included in the one-time use QR code. This public key may likewise be used to secure communications for this transaction session between computer 340 and the mobile device.

Further in the exemplary embodiment the one-time QR code includes data corresponding to one or more identifiers. The one or more identifiers are usable by the computer 340 to enable check images and data that are captured by the mobile device, to be associated with the particular transaction or account of the payee who is to deposit the checks. For example in some exemplary arrangements the identifiers may correspond to one or more of a session identifier, the payee, the payee account, the payee terminal, the payee terminal network address, the network address of computer 340 or a memory location at the computer 340 to which the check image data is to be sent. Alternatively in other embodiments the one or more identifiers that are included in the one-time QR code that is output through the display of the payee terminal, may include other identifiers that are usable to assure that the check data that is captured through the mobile device is properly processed for use in connection with the transaction. Alternatively in other embodiments the QR code, other bar code or message that is used by the mobile device to acquire the circuit executable instructions of the mobile application may include one or more of the identifiers. In some such embodiments the one time use QR code may not be needed as all the identifiers and other data required by the mobile device is included in the initial QR code and the downloaded instructions.

Figure 34:
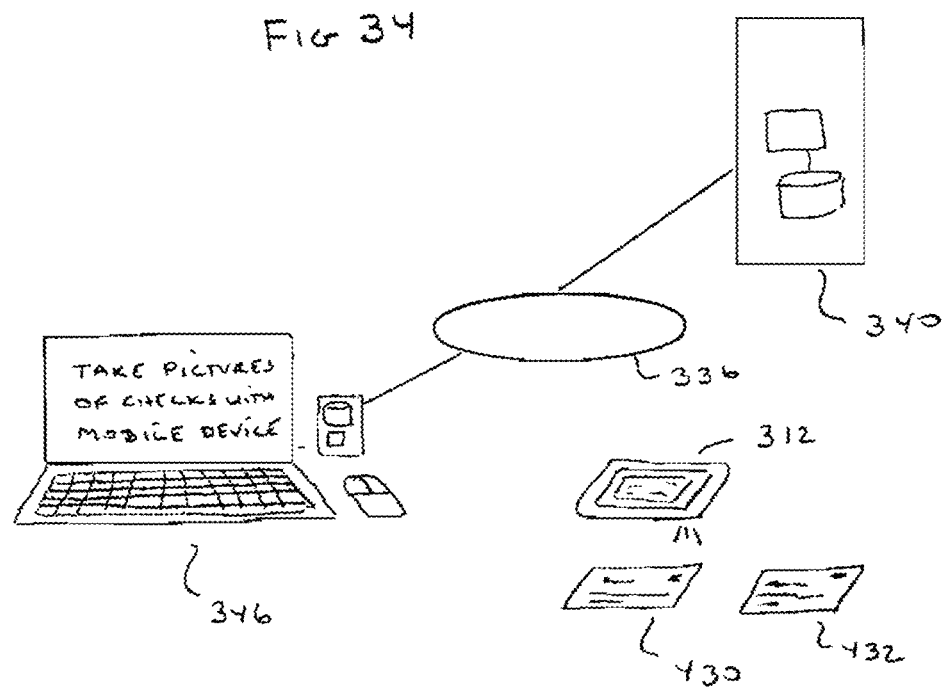
Figure 35:
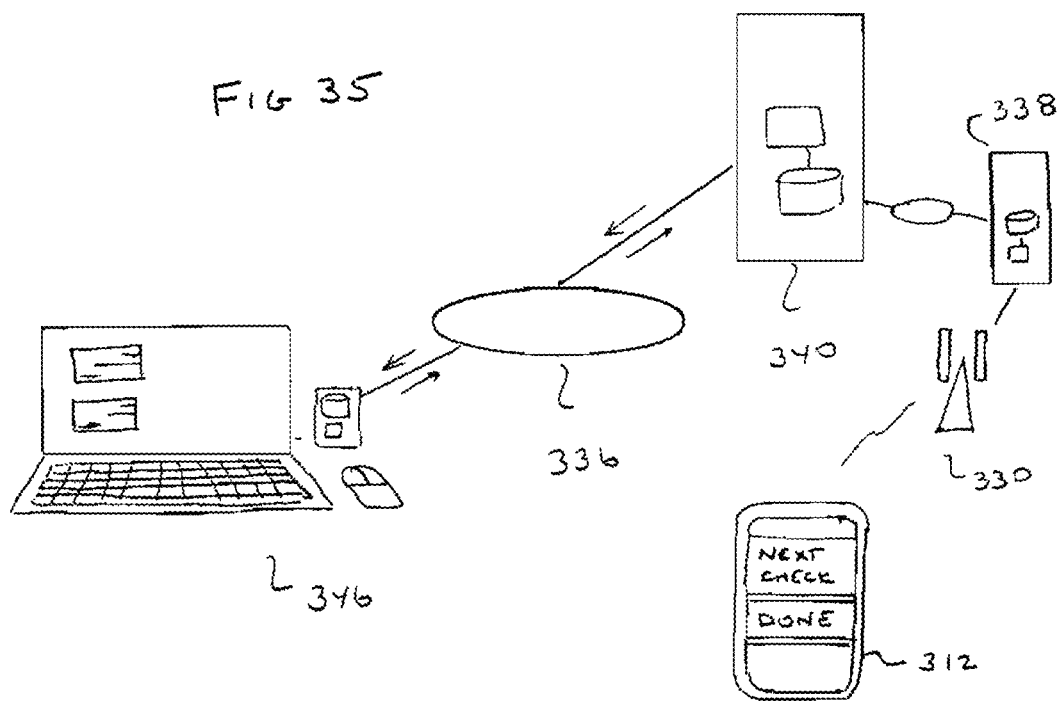
Figure 36:
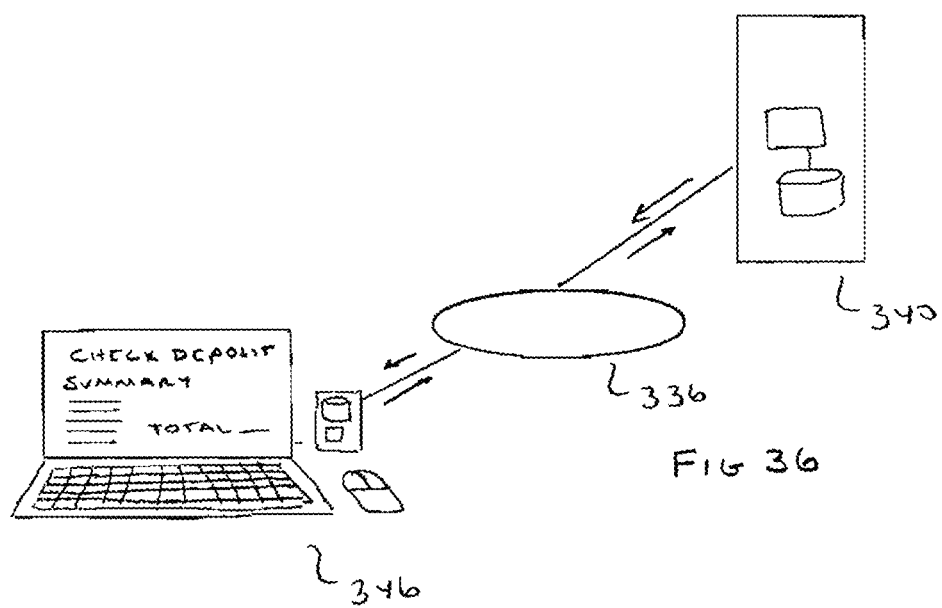

As represented in FIG. 34 and in a step 428, the computer 340 next operates in accordance with its programming to cause one or more outputs through the display of the payee terminal so as to prompt the user to use their mobile device 312 to take pictures of the checks that the payee wishes to deposit. This is represented schematically in FIG. 34 by the mobile device using its digital camera to capture images of one or both sides of checks 430 and 432.

Figure 46:
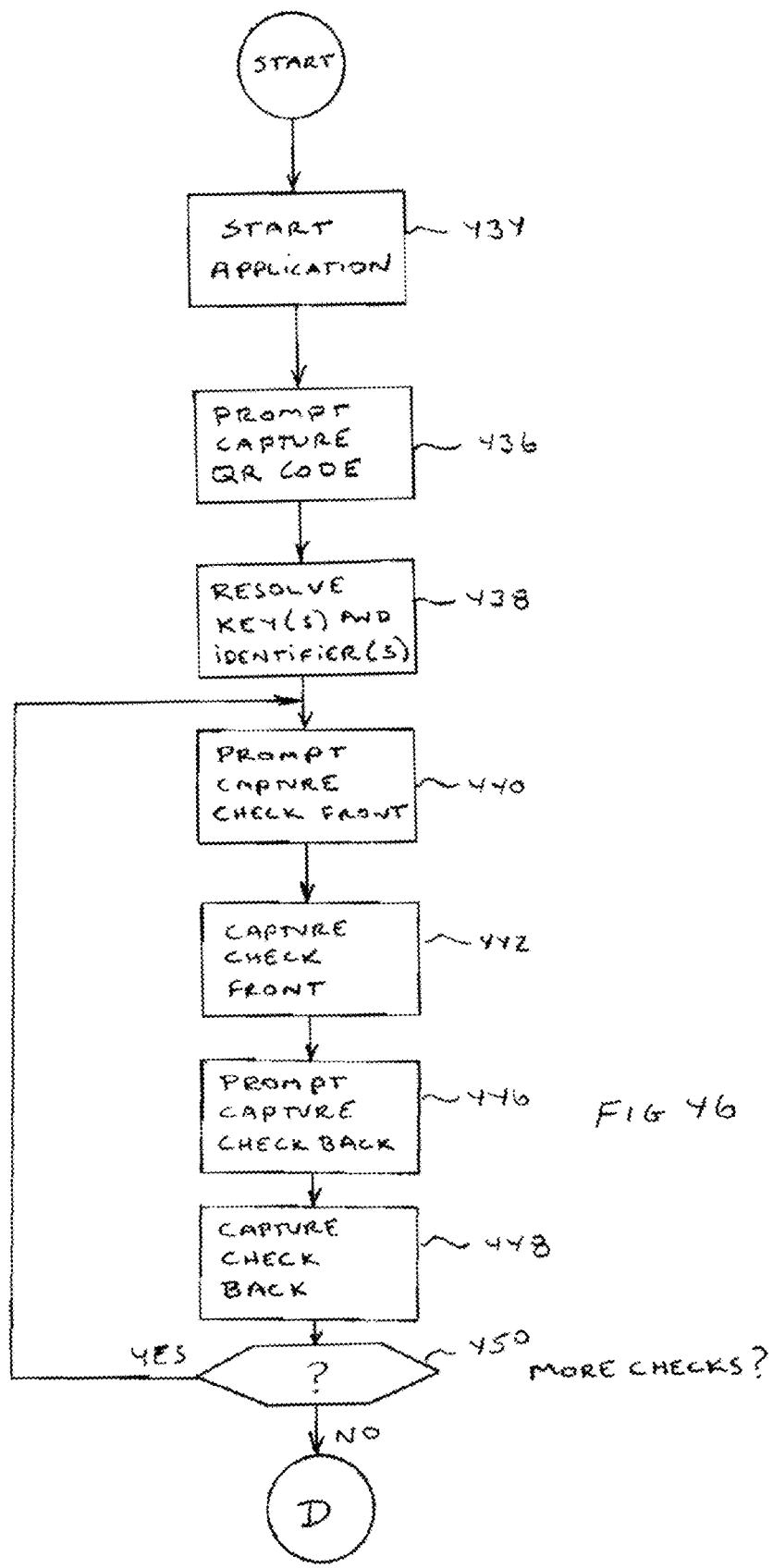
FIGS. 46 and 47 are a schematic representation of an exemplary logic flow carried out through operation of a mobile device in connection with transactions involving checks.
Figure 47:
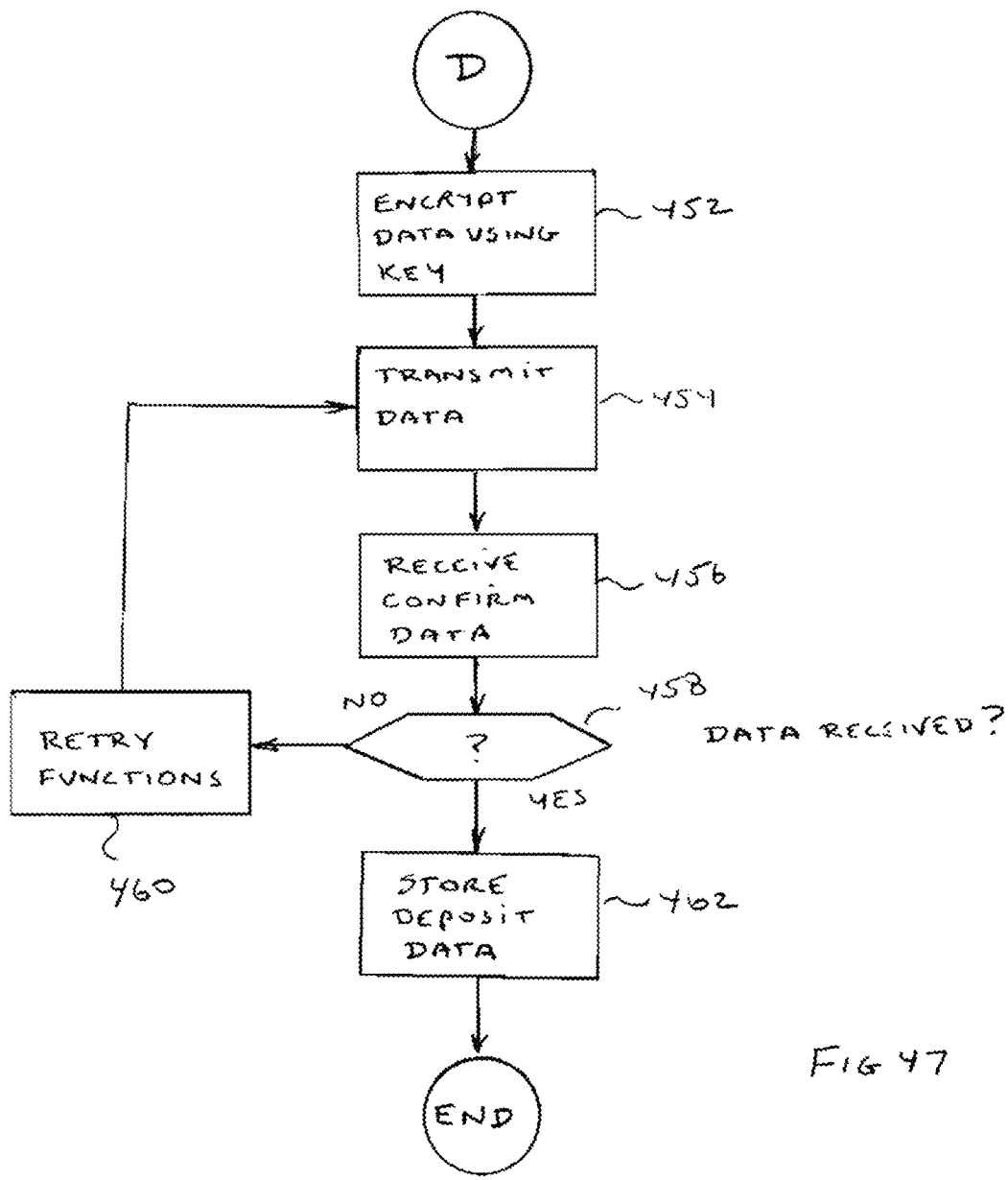

FIGS. 46 and 47 schematically represent the logic flow carried out through operation of the at least one mobile processor of the mobile device, in connection with a check deposit transaction. After providing inputs to start the transaction at a step 434, the mobile processor executable instructions of the mobile application provide outputs through the mobile display to prompt the user to capture the one-time QR code output through the display of the payee terminal by taking a picture thereof. This is represented by a step 436.

Figure 54:
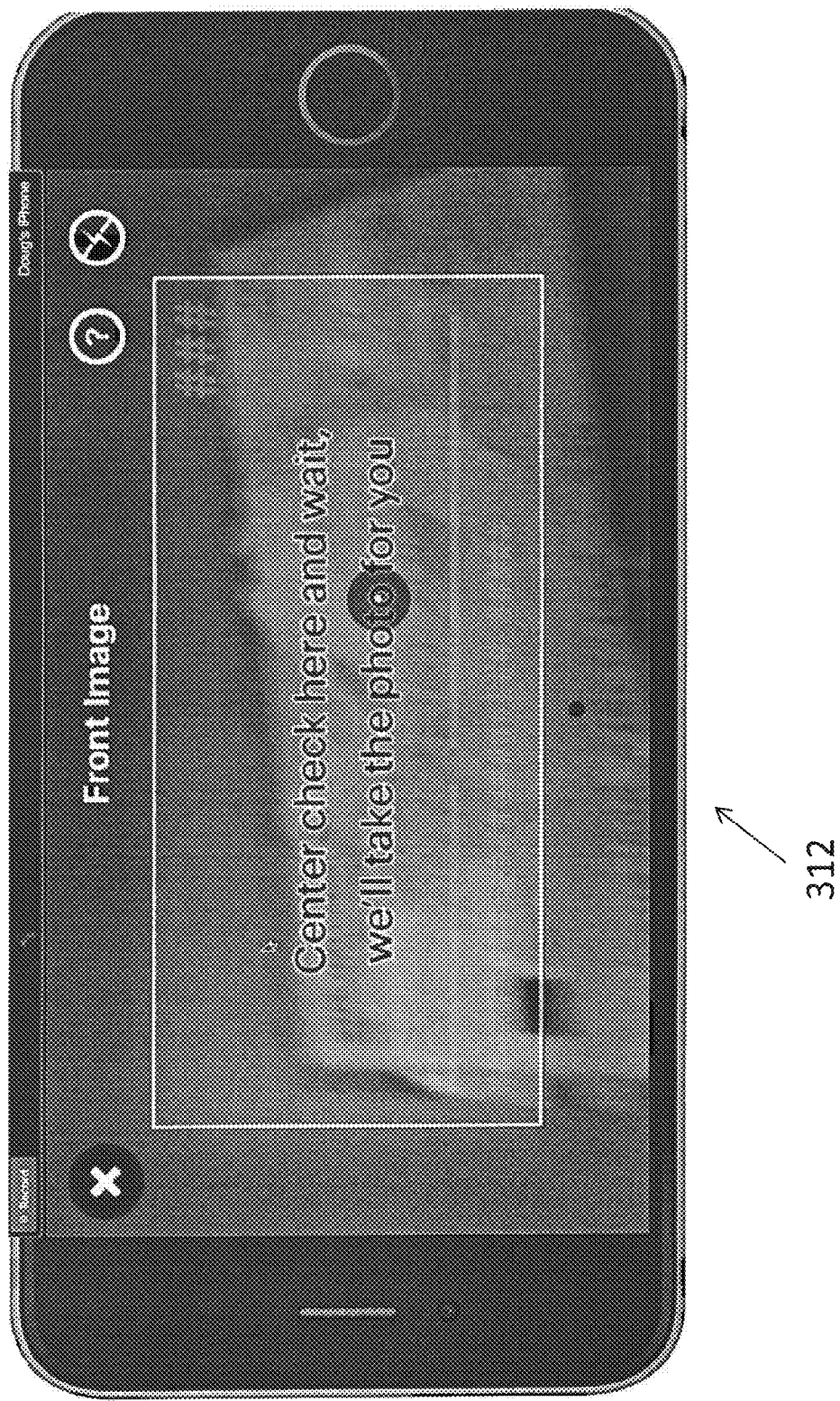
FIGS. 54-58 are views of a portable device and the user interface thereof in connection with reading check data.
Figure 55:
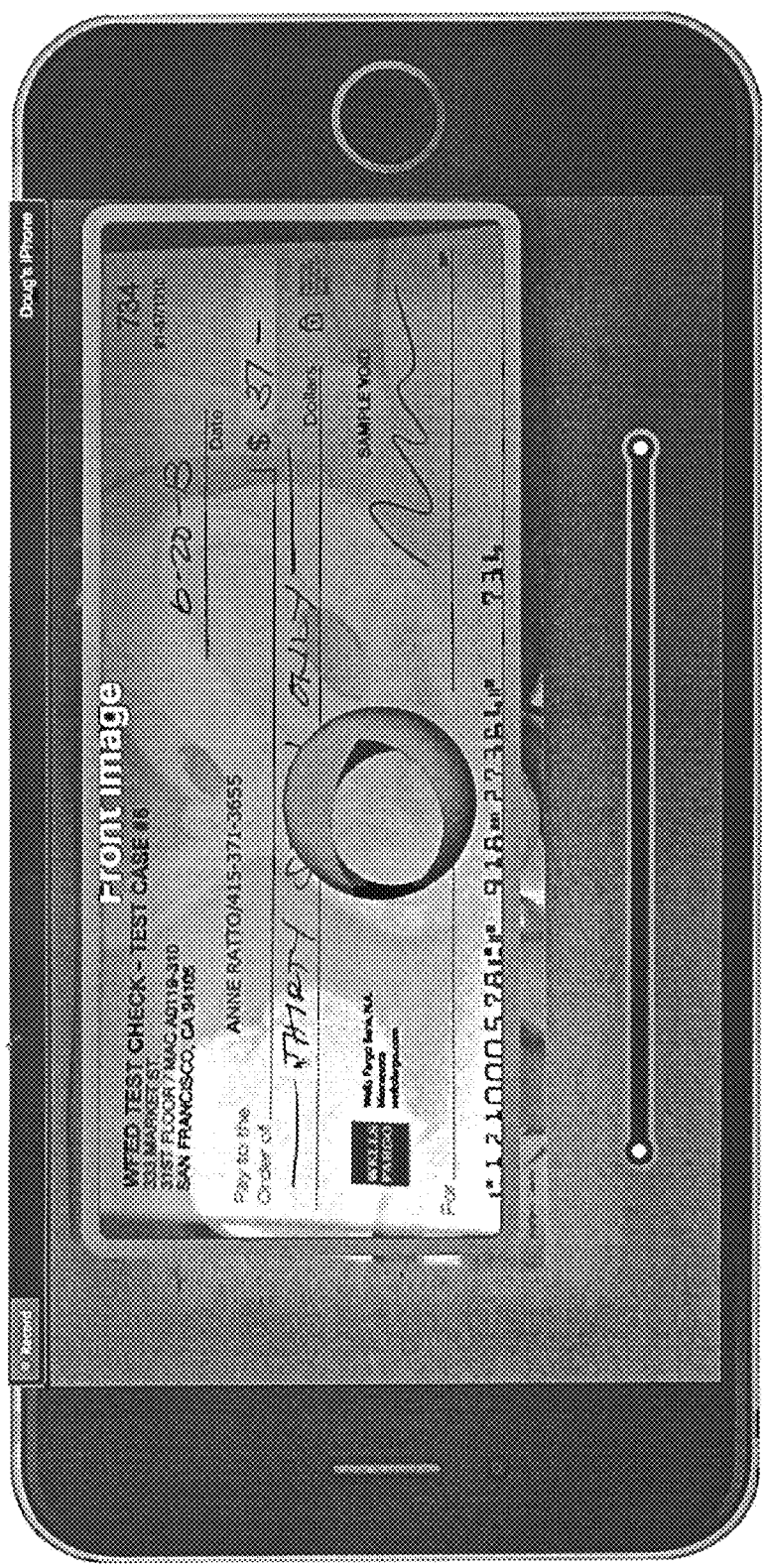

As represented in step 438, the mobile device then operates in accordance with the processor executable instructions of the mobile application to resolve the key data and identifier data that is included in the output one-time QR code. Thereafter in the exemplary arrangement, the mobile device operates in accordance with the application instructions to prompt the user of the mobile device through the mobile display to take a picture of the front side of the first check to be deposited. This is represented by a step 440 and in FIG. 54. The user then operates the mobile device to capture the front side of the check as represented by a step 442 and in FIGS. 55 and 56. In the exemplary embodiment, the circuit executable instructions operate the mobile device 312 such that the user is prompted through the display to position the check relative to the digital camera of the device so that the output visual representation on the mobile device display is within a marked rectangular area on the display.

Figure 56:
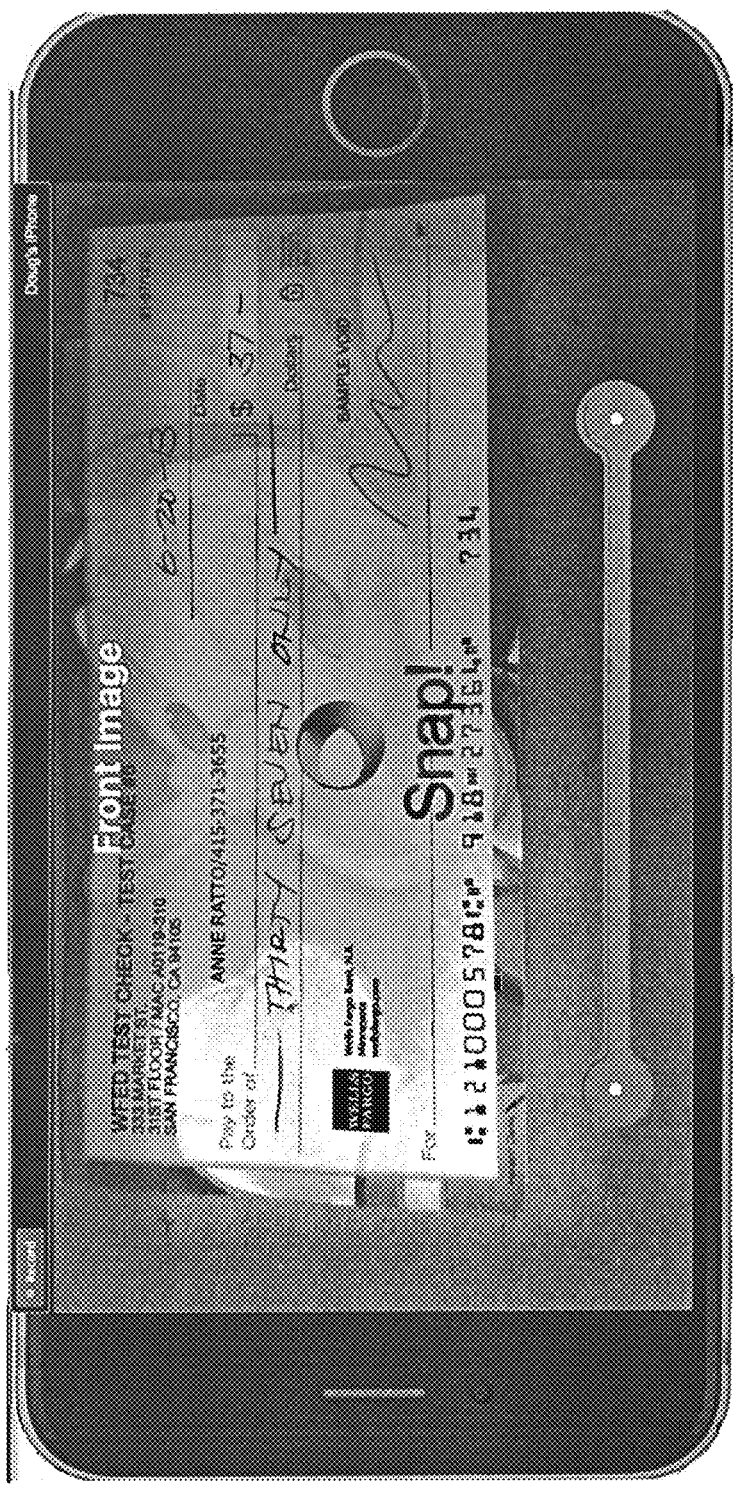

The instructions operate to analyze the image data being captured and to determine when the image is suitable for capture. This includes the image of the side of the check being generally within the bounds of the display. This may also include other parameters including that the image is not moving relative to the display, the image is in focus, the image is sufficiently illuminated and/or other parameters defined in the instructions so as to indicate that the image is suitable for capture. In the exemplary arrangement, the instructions operate to cause the device to automatically capture the image when the image is determined to meet the acceptability criteria. The exemplary application provides a visual representation to the user of a shutter eye as represented in FIG. 56 and an audible output which corresponds to the noise made by a mechanical shutter to indicate that the picture of the check has been "snapped" and the image has been captured by the mobile device. Of course this approach is exemplary and in other embodiments, other approaches may be used.

Figure 57:
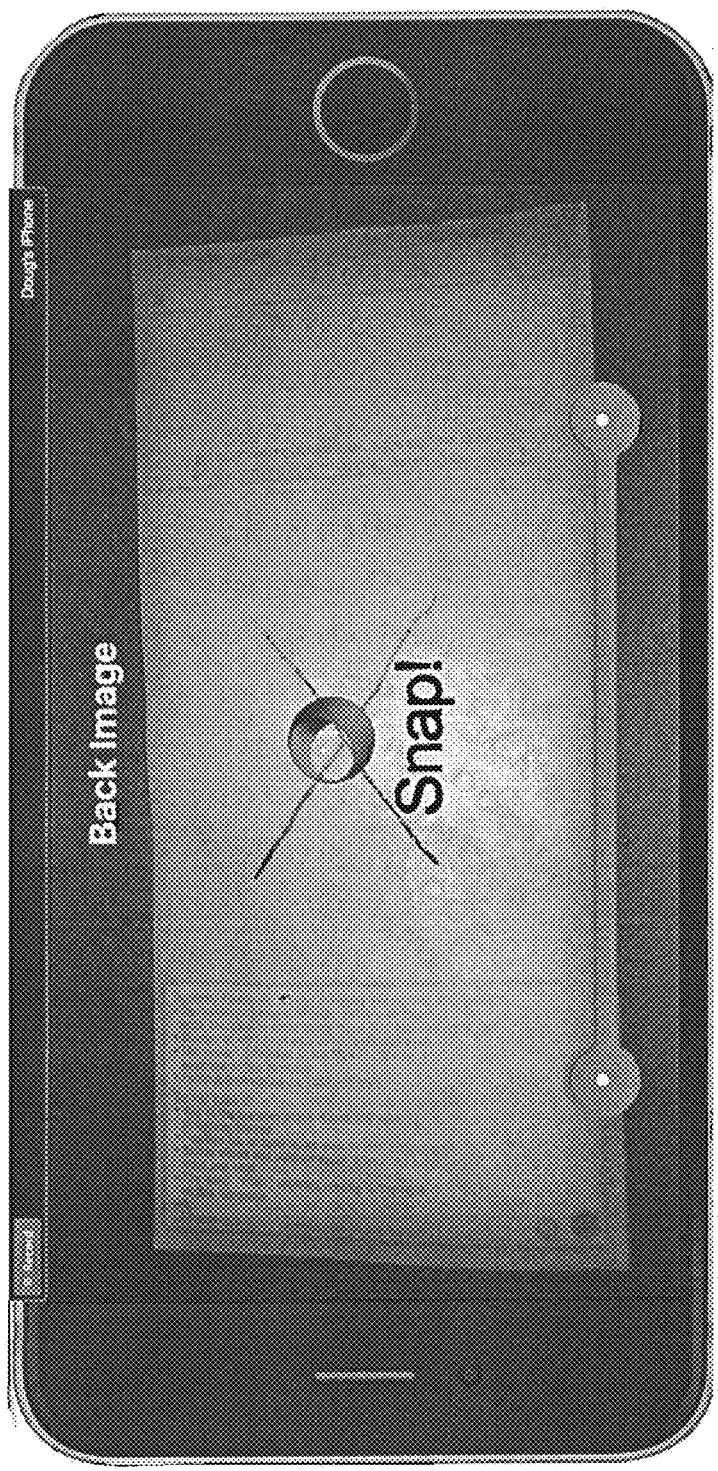

The mobile device then operates to provide one or more outputs that prompt the user to capture an image of the back side of the first check by taking a picture thereof. This is represented by a step 444. The mobile device is then operated through user input through the input device thereof to capture the image of the back side of the check. This is represented by a step 448 and in FIG. 57.

Figure 58:
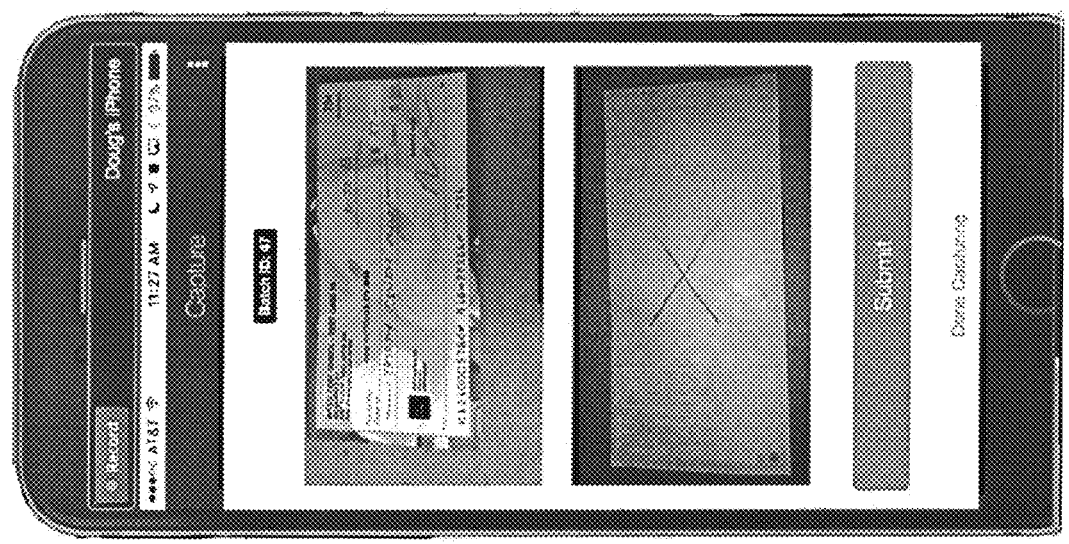

At a step 450, the mobile device operates to provide outputs which prompts the user to indicate if there is another check to be included in the particular deposit transaction. This is also represented by the exemplary device display outputs shown in FIG. 58. In response to the prompt, the user of the mobile device provides one or more inputs through the touch screen of the device. If the input indicates that more checks are to be included in the transaction, steps 440 through 450 are repeated in connection with the second and subsequent checks, until a user indicates through an input in response to the output prompt that there are no more checks associated with the particular deposit transaction.

In some exemplary arrangements the application logic may prompt a user of device 312 to input other information. This may include the user inputting an amount of each check. It may also include inputting other data on the check, or other data such as an electronic endorsement. Various approaches may be taken in systems of various embodiments.

After the images of all the checks have been captured, the mobile device operates in accordance with the mobile processor circuit executable instructions to encrypt the captured check image data using the one or more keys that have been resolved from the QR code. This is represented in a step 452. This may include for example the mobile device operating to encrypt the check image data using a public key included with the QR code that corresponds to a secret or private key that is held by the computer 340. Alternatively other encryption techniques may be utilized including the use of different or additional keys. In some arrangements the mobile device may operate to encrypt the identifiers and other data as well as the check data.

Once the check data has been encrypted at the step 352, the mobile device operates to transmit the encrypted data and the identifier data as represented in a step 454. The exemplary mobile device operates to transmit the encrypted data to the computer 340 through the cellular network 330 and the interface servers 338. In response to receiving the encrypted data, the exemplary computer 340 operates to return a confirmation message and confirmation data to the mobile device as is represented in step 456. The confirmation data in exemplary embodiments may include a digital signature, a message authentication value or other suitable value and/or data that can be utilized by the mobile device to determine if the data that was sent, was received by the computer 340 in an uncorrupted manner. Alternatively or in addition, the return message may be signed or otherwise be provided with authentication data which enables the mobile device to determine that the message has been received by the authorized computer. Numerous different approaches may be taken to accomplishing these functions in various embodiments.

In a step 458, a determination is made by the mobile device in accordance with its programmed instructions, concerning whether the message from the computer 340 indicates that the data was properly received. If there has been a malfunction and the data has not been properly received, the mobile device executes selected functions as represented in step 460 to again send the data in a manner which can be received by the computer 340. Once the data that has been sent by the mobile device is confirmed as having been properly received, the mobile device operates to store the check data that has been sent in an encrypted manner in its data store in the event that it is necessary to recover this data for archive or other purposes. This is represented by a step 462. Alternatively in other arrangements such data may not be stored in device 312. Of course it should be understood that this description of the mobile device logic flow is schematic and merely exemplary, and additional or different steps, functions and capabilities may be included in other embodiments.

Figure 44:
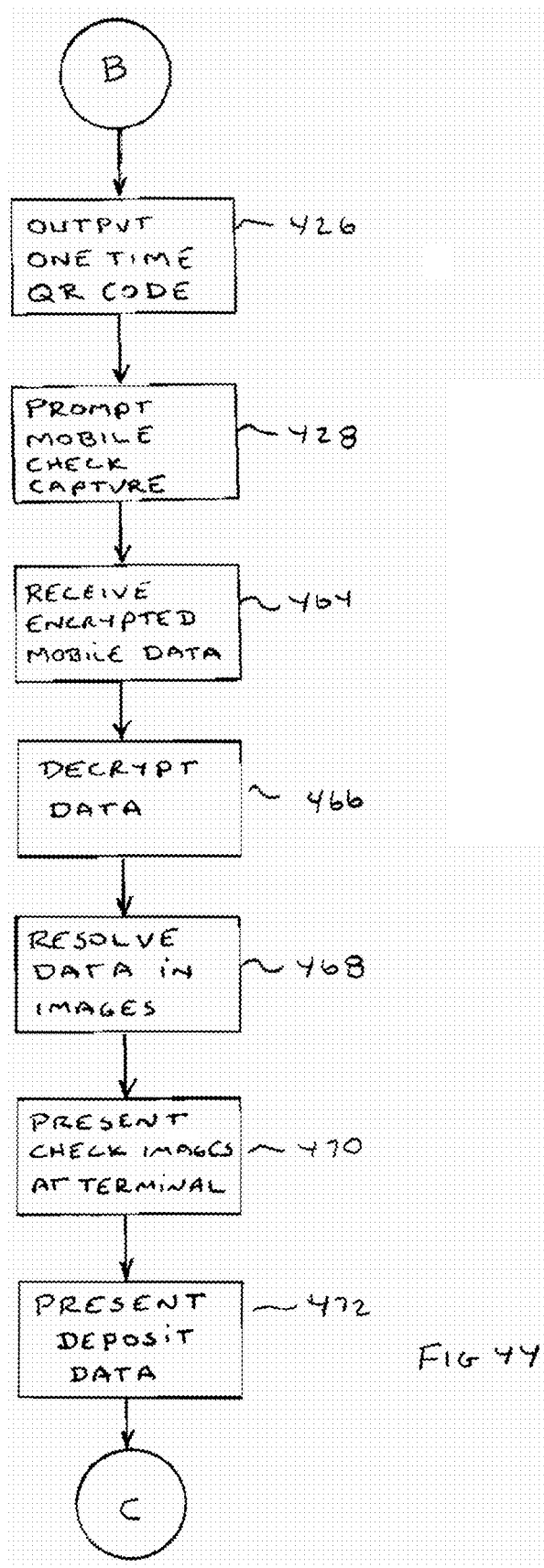
Figure 45:
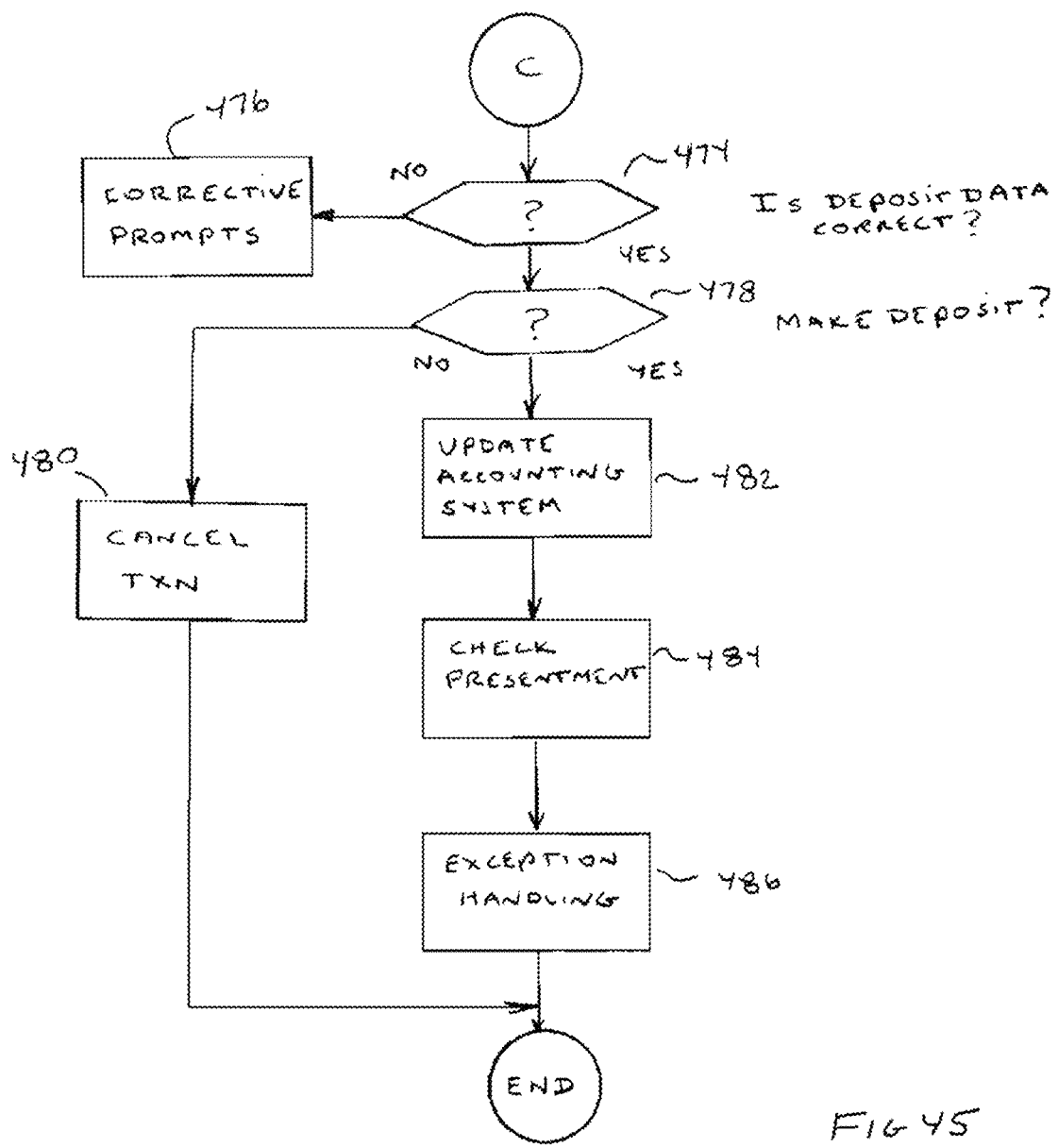

Returning to the logic flow carried out through operation of the exemplary computer 340, step 464 in FIG. 44 corresponds to the receipt of the encrypted data from the mobile device. Step 464 further corresponds to the functions previously discussed of the computer returning to the mobile device, data which enables the mobile device to determine that the messages were properly received. The computer 340 then operates to decrypt the data that it has received as represented in step 466. The computer 340 then utilizes character recognition computer executable instructions stored in one or more data stores thereof to resolve the data included in the check images. This is represented in a step 468. The data resolved from the check images will include data included on each check. This will include, for example, the check amount (legal and/or courtesy amounts), the payor account number and payor bank from the micr line data. Other data that may be resolved includes check payee data, check payee endorsement data, the check payor endorsement data, check number, date and other information included on the check. Of course it should be understood that in some embodiments, not all of the various items of data represented by the indicia included on one or both sides of the check will need to be resolved in order to accomplish the functions described herein.

After the computer 340 has received the check image data and has decrypted it, the computer operates in accordance with its programming to present the check images on the display of the payee terminal as represented in FIGS. 35 and 63-65 and as represented by a step 470 in FIG. 44. This enables the operator of the payee terminal to review the checks and verify the amounts thereof and the total amount to be included in the deposit.

Thereafter as represented in FIGS. 36 and 63-65, the exemplary computer 340 causes the output from the display of the payee terminal, deposit data that corresponds to the checks. This step is represented by a step 472. The deposit data output may correspond to data of the type that may be included on a deposit ticket, such as the amount of each check to be deposited and the total amount of the deposit. Of course other data may be included as well such as the check number, the check payor name, the date of the check, the payor account number or other data that may be useful in connection with establishing the amount and makeup of the deposit.

Figure 37:
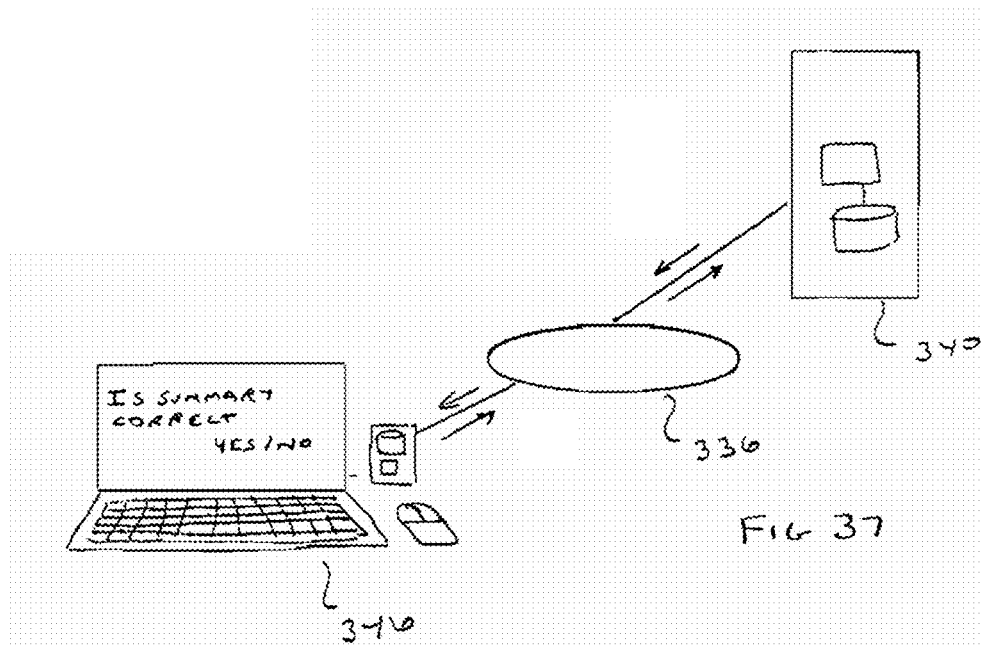
Figure 38:
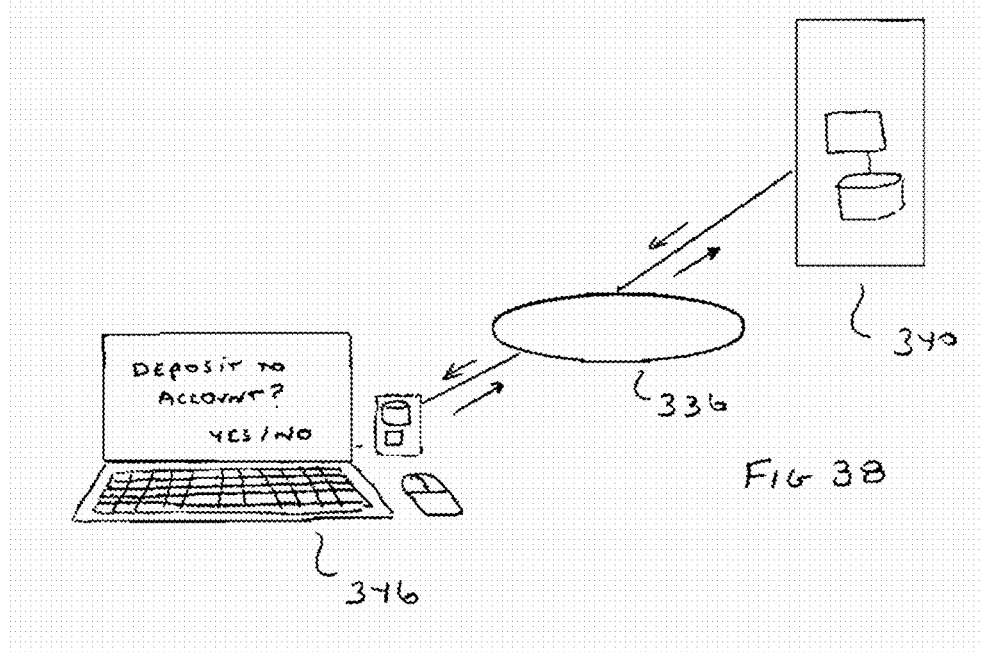

As represented in FIG. 37, the exemplary system then operates to cause the computer 340 to output to the user of the payee terminal a prompt to indicate whether they agree that the deposit data that has been presented is correct. This is represented by a step 474. In response to receiving this prompt, the user provides one or more inputs through input devices of the payee terminal. If the user indicates that there is a discrepancy, the computer 340 operates to execute corrective routines so as to attempt to resolve the discrepancy. This is represented by a step 476.

If the user provides an input that indicates that the deposit data is correct, the computer 340 then operates to cause the payee terminal to prompt the user to indicate whether they wish to proceed with the deposit. This is represented by the payee terminal display output shown in FIG. 65. In response to this prompt, the user of the payee terminal provides one or more inputs through the input devices to indicate whether they wish the deposit to proceed. This is represented by a step 478 as well as FIG. 38. If the user provides an input indicating that they do not wish to make the deposit, the deposit transaction is cancelled as represented in a step 480.

Figure 39:
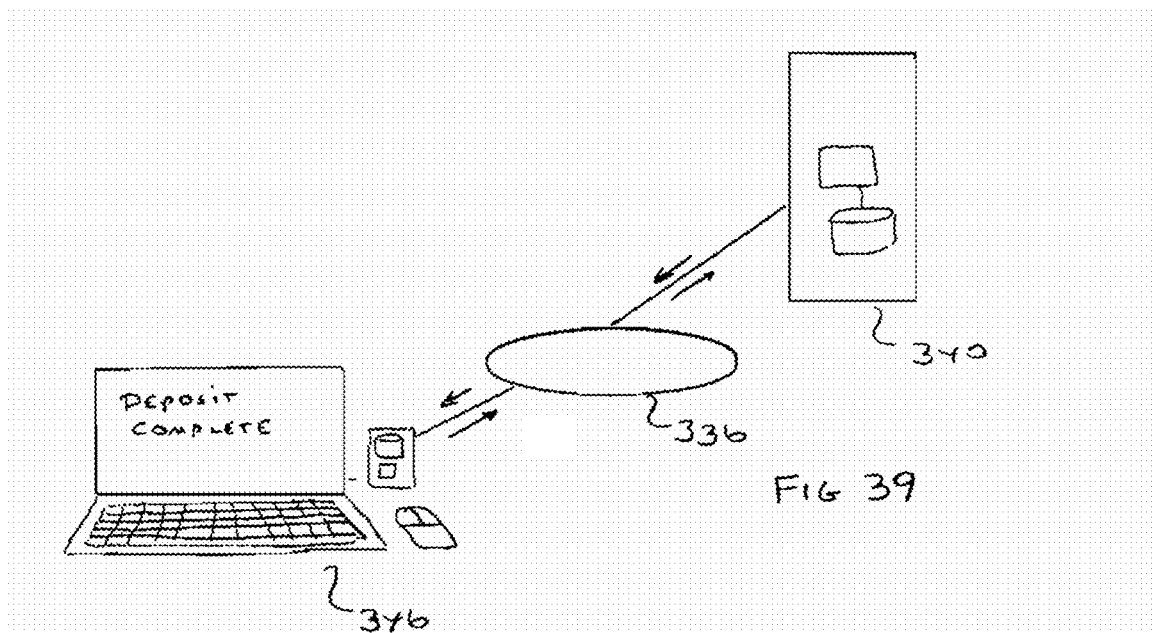
Figure 40:
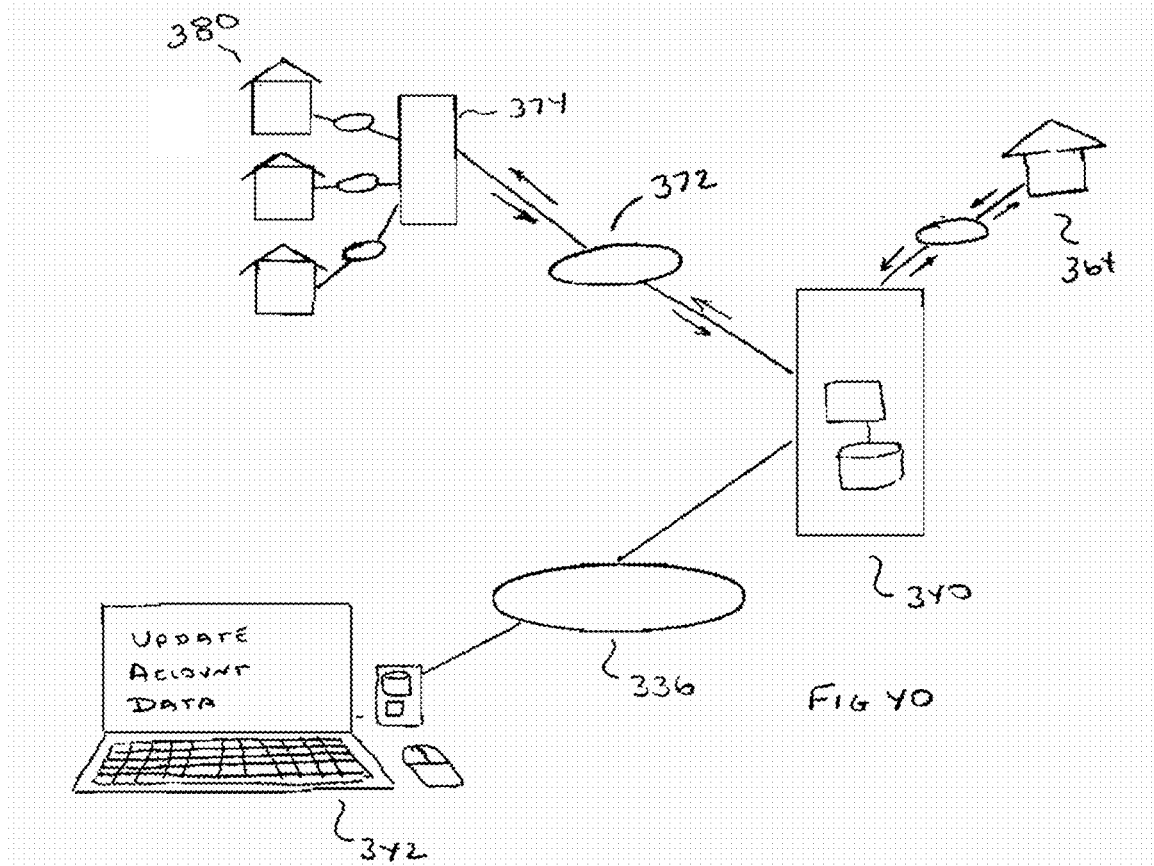

If the user indicates that the transaction is to proceed, the data corresponding to the user input indicating that the deposit should be completed is transmitted from the payee terminal 346 to the computer 340. The payee terminal then provides an output as represented in FIG. 39 to advise the user the deposit is complete. The computer 340 then updates its records concerning the corresponding account to indicate that the amount of the deposit should be credited thereto.

After the remote computer 340 has adjusted the data in its one or more data stores to indicate that the amount of the deposit has been credited to the account of the merchant payee, the computer 340 then operates in accordance with its programming to accomplish the updating of the payee's account with the financial institution 364. This is represented by a step 482 in FIG. 45. The computer 340 communicates with the computers 366 of the financial institution to indicate information concerning the deposit so that the records of the financial institution conform with the records of the computer 340 and so that the amount of the deposit is provisionally credited to the user's account. Generally in exemplary arrangements a provisional credit will be issued initially in the event that any of the checks, when presented to the bank on which the check is drawn, are not paid.

The exemplary computer 340 then operates in accordance with its programming to send the check data related to each of the checks in the deposit to one or more of the check presentment networks 372. As previously described, information concerning the check, the bank and account on which the check is drawn, the check image and the financial institution which should be credited for the payment of the check, is sent through one or more servers 374 of the check presentment system such that each check is routed to the respective bank 380 on which the check is drawn. When the presented check is paid from the account of the check payor, the check presentment system operates to credit the account of the institution to which the deposit has been made. This check presentment process is represented by step 484 in FIG. 45.

Further in the exemplary arrangement when checks that are presented to the check presentment system are not paid due to insufficient funds in the account or for other reasons, the computer 340 operates in conjunction with the check presentment network to handle those exceptions. This exception handling is represented by a step 486. Such exception handling includes documenting that the check is unpaid and revoking the provisional credit that has been granted to the merchant payee for the deposited check. Processes may also include automatically re-presenting the check at a later time for payment through the check presentment system. Exception handling may also include assessing fees or giving notifications to the merchant payee, the financial institution which has the merchant payee's account or other entities of the nonpayment of the check. Of course it should be understood that these steps are exemplary and in other arrangements, other approaches may be used.

Further in some exemplary embodiments, the payee terminal 346 may be operated in accordance with its processor circuit executable instructions to update the account data related to the purchasers of goods, services or other items for which the payments are represented by the checks received. In exemplary arrangements, the payee terminal is operable to identify the accounts of the purchasers submitting the checks to the merchant. The operator of the payee terminal is enabled to review the check data and the amount thereof as output through the payee terminal display. In exemplary embodiments, the operator of the payee terminal is enabled to review the status of the purchaser's account with the merchant. This includes the status of any outstanding invoices or other amounts owing to the merchant by the payor of the check. The operator of the payee terminal is then enabled to provide inputs so as to credit the account of the check payor with the merchant payee with the amount of the payor's check. This enables the merchant to keep updated accounts for all of its customers or other check payors. Further in exemplary embodiments, the circuit executable instructions of the payee terminal are enabled to accommodate updating customer records to include the revocation of credits in the event that a check is dishonored, to assess charges for late payments and to carry out other activities as is appropriate for the keeping of accurate account data for the merchant or other vendor associated with the payee terminal. Of course these features are merely exemplary and other payee terminals and systems may include different, additional or other features and functions so as to carry out the desired activities of the particular vendor.

In other exemplary embodiments in which the computer 340 is operated by a service provider other than the financial institution of the merchant payee, additional functionality may be provided. For example, the merchant mobile device may include an application that enables capturing images of and/or analyzing invoices and/or other record documents associated with deliveries of goods to and/or payments by merchant customers. For example, in exemplary embodiments the mobile application may prompt the merchant user to capture one or more images of an invoice, such as for example, a remittance advice, in conjunction with the checks for which images are captured. In exemplary arrangements the computer 340 may operate to analyze the indicia and determine information included on the captured invoices. The computer 340 may then operate in accordance with its programming to resolve and maintain records which represent the status of the accounts of the purchaser payors of the merchant. In exemplary arrangements the computer 340 may keep track of amounts charged by the payee to customers and the amounts paid by the customers. The exemplary system including computer 340 may be used to identify for the merchant amounts due, underpayments, overpayments, dishonored checks and other conditions. The conditions may be notified to the merchant who can use the capabilities of the computer 340 to manage customer accounts as well as the merchant's financial accounts. Such information may be available to the merchant user via the mobile device and/or via one or more payee terminals.

Thus the exemplary systems provide the capabilities for enabling an operator of a payee terminal to deposit checks that the payee has received without the need for having a desktop scanner or similar device in connection with the payee terminal. It should be appreciated, however, that the exemplary system may operate to receive check images both from payee terminals that include desktop scanners as well as from systems that utilize mobile devices for delivering captured check image data for purposes of processing checks. Further in exemplary arrangements, a terminal which includes a desktop scanner may also be operated at the election of the payee terminal operator to utilize a mobile device in lieu of the desktop scanner. This option might be available if the desktop scanner is broken. Further it should be appreciated that in some exemplary systems, the mobile device is utilized in connection with the making of check deposits to payee accounts may also be used for purposes of carrying out the transactions described in the other embodiments herein.

Figure 48:
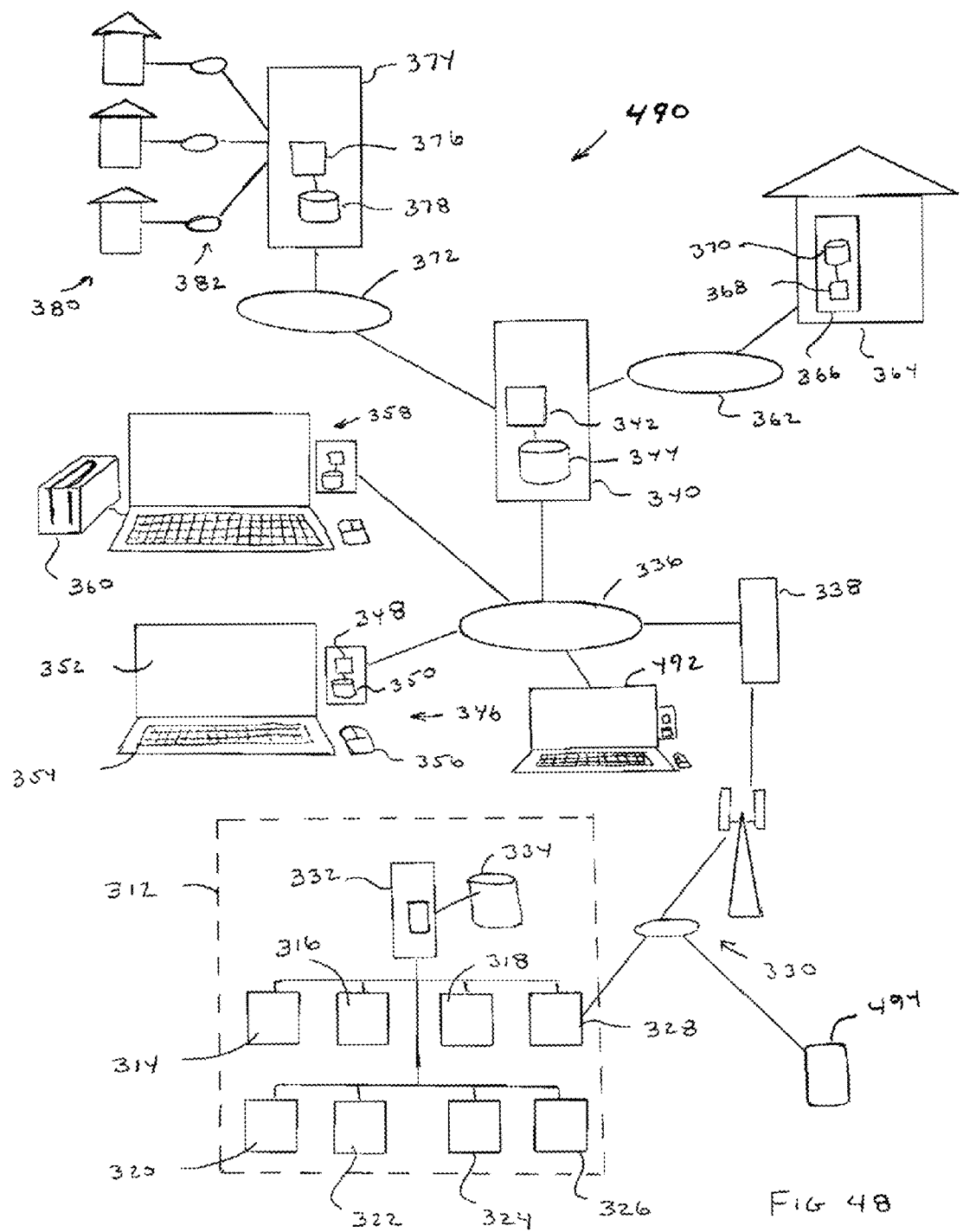
FIG. 48 is a schematic view of an alternative arrangement of a system, including features of exemplary embodiments.

FIG. 48 schematically shows an alternative system 490. System 490 is generally similar to system 310 previously described and includes many of the same components and features. System 490 further includes a purchaser terminal 492. The purchaser terminal 492 may be a desktop computer, laptop computer, or other terminal device generally similar to the payee terminal 346 previously discussed. However, the purchaser terminal 492 of the exemplary embodiment is a terminal operated by a purchaser of goods from the vendor who operates the payee terminal 346. In the exemplary embodiment, the purchaser terminal 492 which may also alternatively be referred to herein as a payor terminal, is operatively connected to the network 336. As previously discussed, this network may include a public network, a private network or combinations thereof suitable for communication between the devices in the manner previously and hereafter discussed.

Exemplary system 490 further includes one or more portable devices schematically indicated 494. Portable device 494 of the exemplary embodiment is similar to mobile device 312 previously described and may include the same or similar components. The exemplary portable device 494 includes a wireless communication interface similar to device 312 that is capable of communication in wireless networks such as the cellular network 330 previously described. Of course the portable device 494 may communicate in different networks as necessary to carry out the functions and capabilities that are hereinafter described.

In this alternative embodiment, the system 490 enables the payors of checks which are received by the vendor in payment for goods, services or other obligations (all of which are referred to herein as "goods") to present their checks directly through a portable device 494 that is operated by the purchaser. In the exemplary arrangement, the portable device 494 is enabled to capture image data and other data associated with checks that are written by the purchaser of the goods, and to transmit such check image data to the vendor who can review the check images and other data at a payee terminal such as payee terminal 346. The vendor may then deposit the checks into the vendor's financial account, present the checks for payment and credit the account of the purchaser therefor in a manner like that previously discussed.

Figure 49:
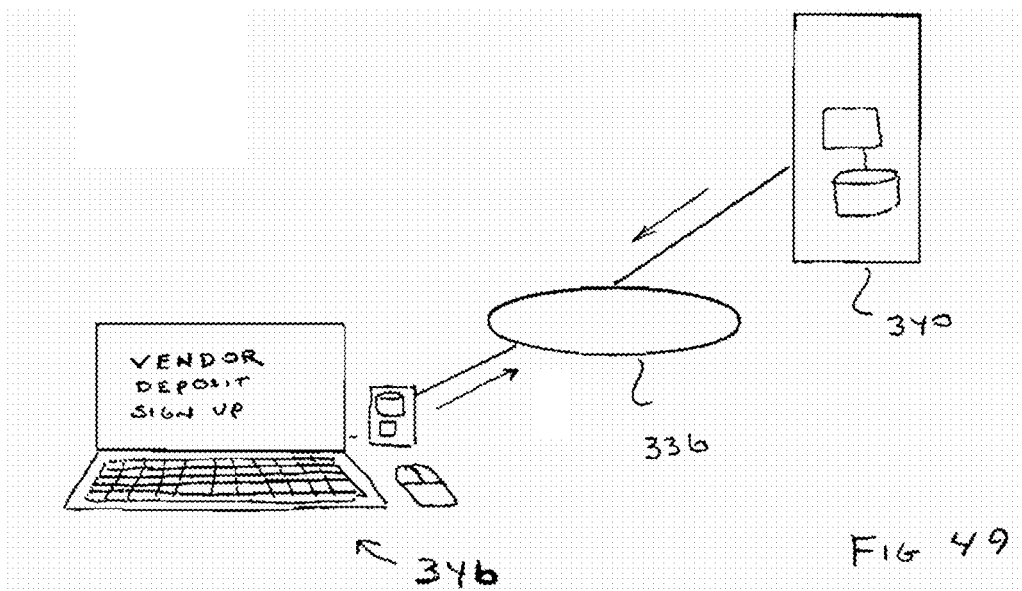
FIGS. 49 and 50 are schematic views of the operation of portions of the system for purposes of enabling the operation of a portable device in connection with reading data from checks and record documents.

In an exemplary arrangement as represented schematically in FIG. 49, the payee terminal 346 or other similar terminal is operable to offer to the purchaser of goods from the vendor, the capability to make payments by checks to the vendor through use of the purchaser's portable device. As represented schematically in FIG. 49, the payee terminal 346 operates to send messages to computer 340 which sends messages to a purchaser of goods from the vendor.

In exemplary embodiments the computer 340 is operated by a service provider that is not a financial institution. However, in other embodiments a financial institution or an affiliate or contractor thereof may provide the capabilities described.

In an exemplary arrangement one or more inputs by a vendor representative to the payee terminal 346 is operative to cause the computer 340 to operate in accordance with its programming to send a message to the purchaser terminal 492, which enables the purchaser to make such vendor payments. In one exemplary embodiment represented schematically in FIG. 50, the computer 340 is operative to send to the purchaser terminal 492 one or more messages that will enable the purchaser to install a mobile application on their portable device 494. In the exemplary arrangement, the mobile application includes circuit executable instructions of the type previously described that can be installed on the portable device 494 to capture check images and other data on checks that are payable to the vendor. In exemplary arrangements, such circuit executable instructions may also provide for the capability of a mobile device to capture data from record documents such as invoices that are associated with the goods that have been provided by the vendor to the purchaser. The exemplary processor instructions are also usable by the purchaser's portable device to enable the portable device to send the data corresponding to the check data, record data and/or other information to the computer 340 or other network address from which such data may be accessed by the payee terminal 346.

Figure 50:
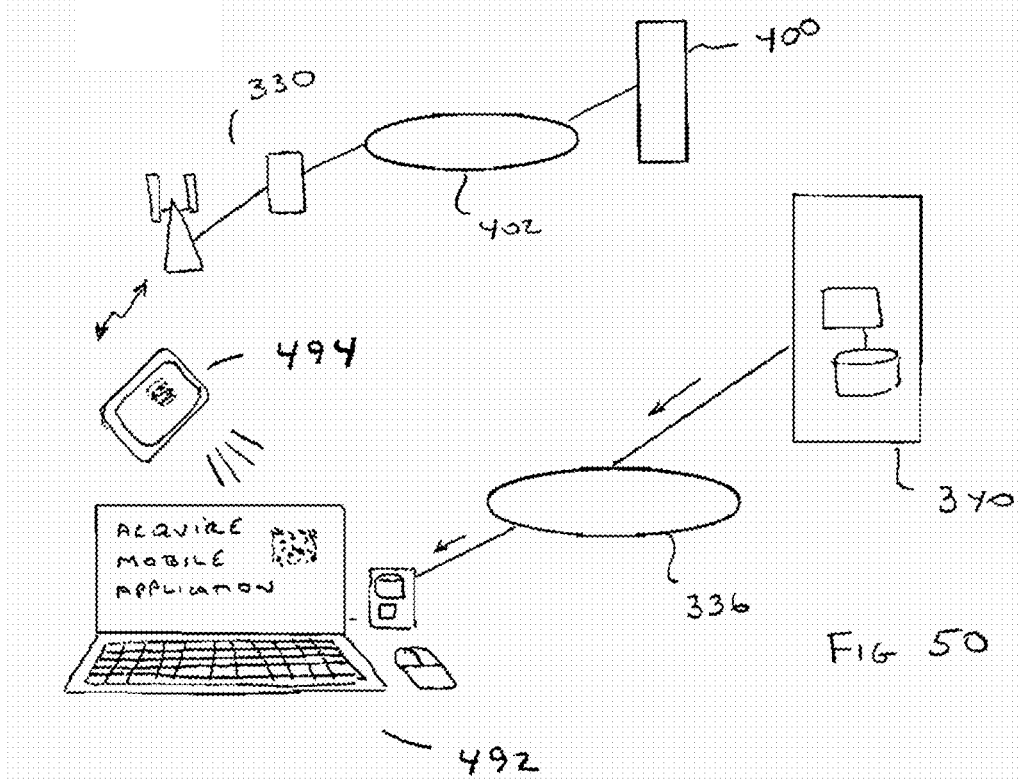

As represented in FIG. 50, in an exemplary arrangement the messages sent by the vendor from the payee terminal 346 indicating that the purchaser is to be offered the capability, is operative to cause the computer 340 to communicate with the purchaser terminal 492. The purchaser terminal 492 is operative in response to the communications to present through a display of the purchaser terminal a bar code, such as a QR code as represented in FIG. 50.

If the purchaser wishes to install the mobile application on their portable device 494, the purchaser can operate the mobile device to use the reader thereon, which in the exemplary embodiment comprises a digital camera, to capture an image of the QR code that is displayed on the display of the purchaser terminal 492.

Figure 51:
FIG. 51 is a schematic view of an exemplary portable device operating in conjunction with a payor terminal.

FIG. 51 is a representation of portable device 494 capturing a wireless message output by the purchaser terminal 492 in the form of a QR code. The wireless message in the form of the image of the QR code is captured by a reader device which includes the digital camera on the exemplary portable device 494.

In the exemplary embodiment, data represented by the QR code that is captured by the portable device 494 includes one or more network addresses from which the portable device may acquire the circuit executable instructions which comprise the mobile application associated with the vendor. As represented in FIG. 50, the portable device 494 may acquire the instructions which make up the application from a cellular or other wireless network 330 which is connected to the Internet 402 or other suitable public or private network. The instructions may then be acquired by the portable device from a server 400. As is the case with the previously described embodiments, a server 400 may be associated with a public or private accessible server that is operated by the vendor or a third party to enable the delivery of the circuit executable instructions which will enable the portable device of the purchaser to operate in a manner hereinafter discussed.

While in some arrangements the portable device 494 that is operated by the vendor obtains the executable instructions of the mobile application in response to data included in a QR code or other visible bar code, in other arrangements the portable device may obtain necessary instructions and data through other methods. For example in some exemplary embodiments, the operation of the payee terminal or other device associated with the vendor, may operate to cause one or more messages to be sent directly to the purchaser's portable device 494. Such messages may include an SMS message or other suitable message which includes the data and instructions necessary for downloading the mobile application and other data necessary for the operation of the portable device. Alternatively in other embodiments, the messages sent to the portable device in response to the payee terminal or other terminal operated by the vendor may include the circuit executable instructions and other data for operation. This may enable the portable device to operate to send check image data and other data without the need to download application instructions from a different source. Of course these approaches are exemplary and in other embodiments, other approaches may be used.

Figure 52:
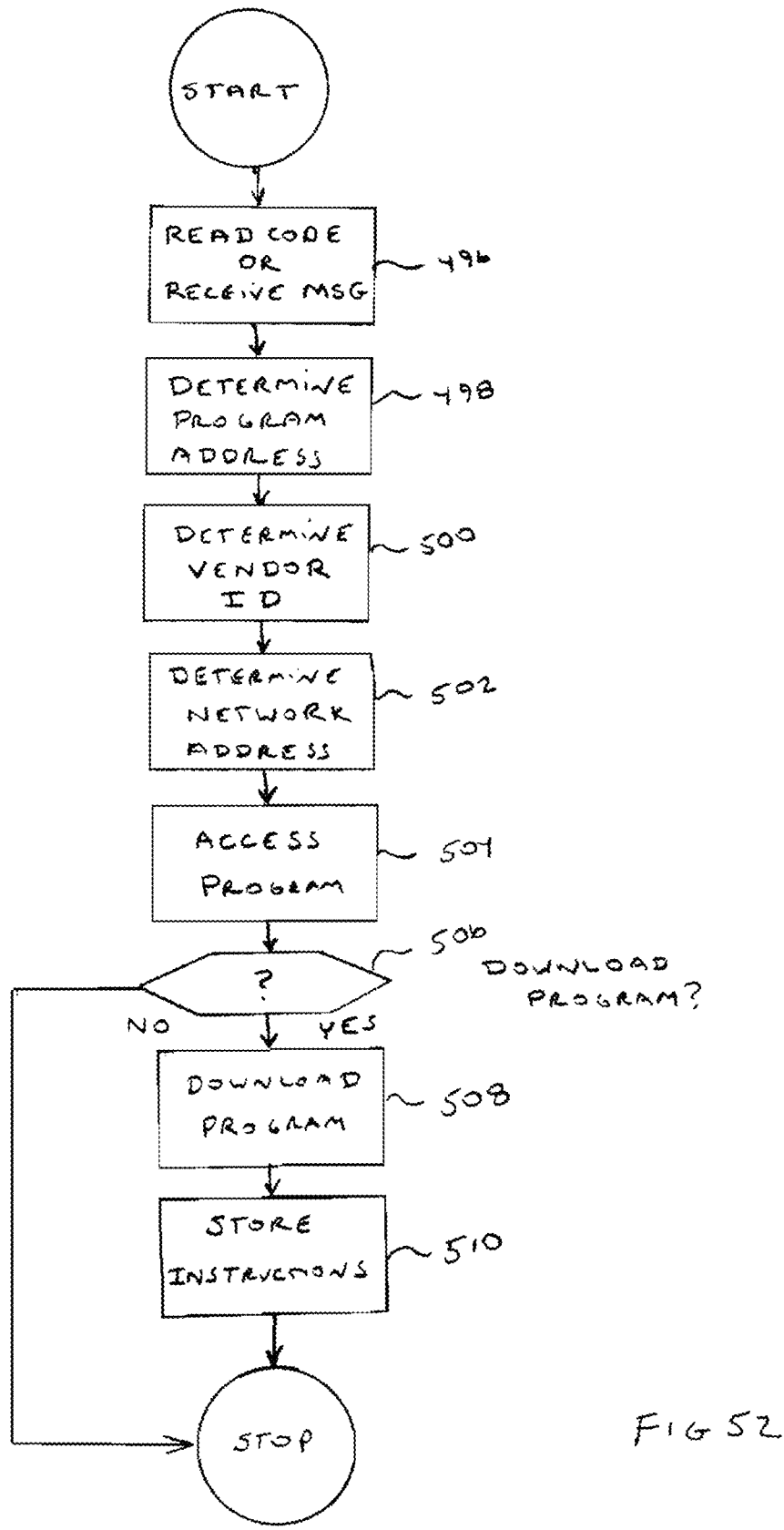
FIG. 52 is a schematic view representing logic flow carried out during operation of an exemplary portable device.

FIG. 52 represents schematically the logic carried out through operation of the portable device 494 in connection with obtaining the circuit executable instructions and other data used for reading check data and record document data in exemplary embodiments, and to send the check data and record document data from the portable device so that it can be accessible to the vendor through the payee terminal. In the exemplary arrangement, the portable device operates in accordance with the circuit executable instructions and one or more manual inputs to read the QR code presented on the purchaser terminal or to receive the one or more messages such as the SMS message sent by the vendor. This is represented b a step 496. The portable device then operates in accordance with its executable instructions to determine the network address from which the circuit executable instructions which make up the mobile application can be obtained. This is represented by a step 498. Of course it should be understood that in embodiments where the QR code or received messages includes the circuit executable instructions necessary to carry out the functions of the portable device without the requirements for remotely downloading an application, step 498 is not carried out.

In the exemplary embodiment, the wireless message in the form of the QR code or SMS message includes data such as the identifiers previously discussed which are used by the portable device in carrying out its operations. In the exemplary embodiment, the information includes identifiers such as the identifier of the particular vendor to whom checks are to be paid. The wireless message initially received further includes network address information or other identifier information like that previously mentioned that indicates the network address or information to be included in messages sent by the portable device so as to direct the messages from the device to the proper network location from which they can be accessed by the payee terminal or other vendor device. As represented in FIG. 52, the portable device 494 operates in a step 500 to resolve the vendor identifying data that is included in the QR code or SMS message that the device has received. Step 502 represents the operation of the device to determine the network address associated with the vendor to which check data and/or record document data is sent by the device and with which address the device communicates when delivering such check and document data to the vendor.

As represented in Step 504, the portable device 494 operates in response to the data it has received to access the network address from which the circuit executable instructions that make up the mobile application can be obtained. Once the portable device is in communication with the remote address from which the mobile application can be downloaded, the mobile device operates to prompt a user for an input concerning whether they wish to download the mobile application. This is represented by a step 506. If in step 506 the user provides one or more inputs indicating that they wish to download the mobile application, the device operates to communicate with the remote server to download the application. This is represented in a step 508. Of course if in response to step 506, the user provides an input indicating that they do not wish to download the application, the process is stopped and the download does not occur.

Once the circuit executable instructions have been downloaded in step 508, the portable device and the circuitry therein operates in accordance with its programming to store the instructions along with the other identifier data and other data that has been provided to the device in one or more data stores such as data stores 334 previously discussed. This is represented by step 510. Of course it should be understood that FIG. 52 is a highly schematic representation, and exemplary arrangements will include additional or different steps, outputs, prompts and other features or functions which have not been discussed herein.

Once the circuit executable instructions have been downloaded and stored on the portable device 494, the purchaser of goods from the vendor is enabled to make payments to the vendor by capturing the images of checks using the portable device. Further in some exemplary embodiments, the making of payments by check to the vendor may be accompanied by capturing images and data from record documents. In the exemplary embodiment, record documents may include an invoice or portion thereof such as a remittance advice or other document which includes indicia which shows the goods provided by the vendor to the purchaser for which the check payment is being made. This may include, for example, all or a portion of an invoice that is sent to the purchaser in connection with a request for payment for goods that have been delivered. Alternatively, it may include a stub, card or separate item included with the invoice for the goods that have been delivered. In still other arrangements, the record document may include a tear off portion of an invoice or similar document that, when a purchaser is paying by mail or by personal delivery for goods delivered, would be returned with the checks to indicate the goods for which the payment is being made. Alternatively such a record document may include indicia such as a bar code, QR code or other indicia included on a paper invoice document or in an electronic invoice document presented on a screen of the payor terminal on a mobile device of a person who delivers the goods, for example. Of course these forms of record documents are merely exemplary and in other embodiments, other approaches may be used.

Figure 53:
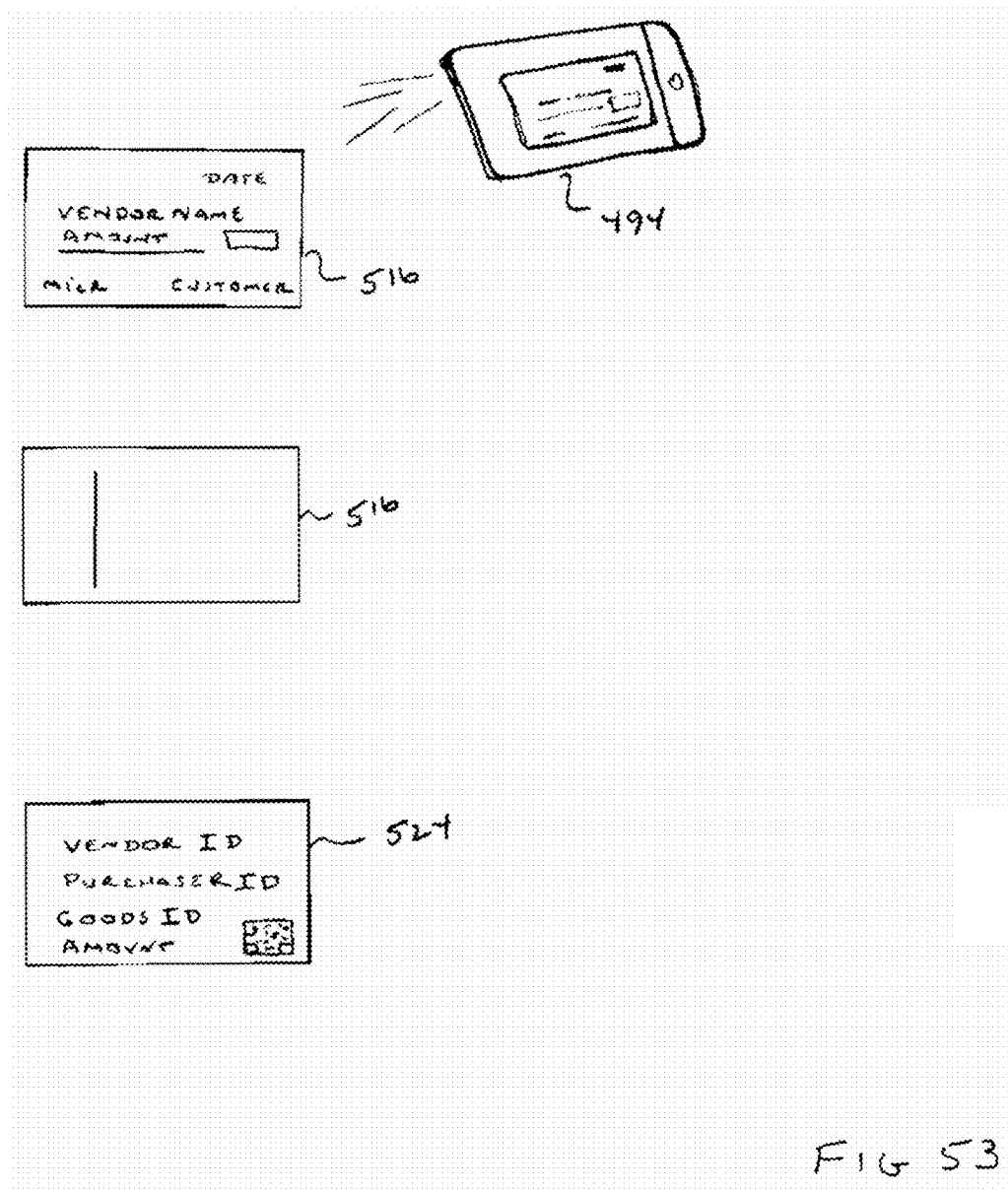
FIG. 53 is a schematic representation of a portable device being used to read data, image checks and record documents.
Figure 59:
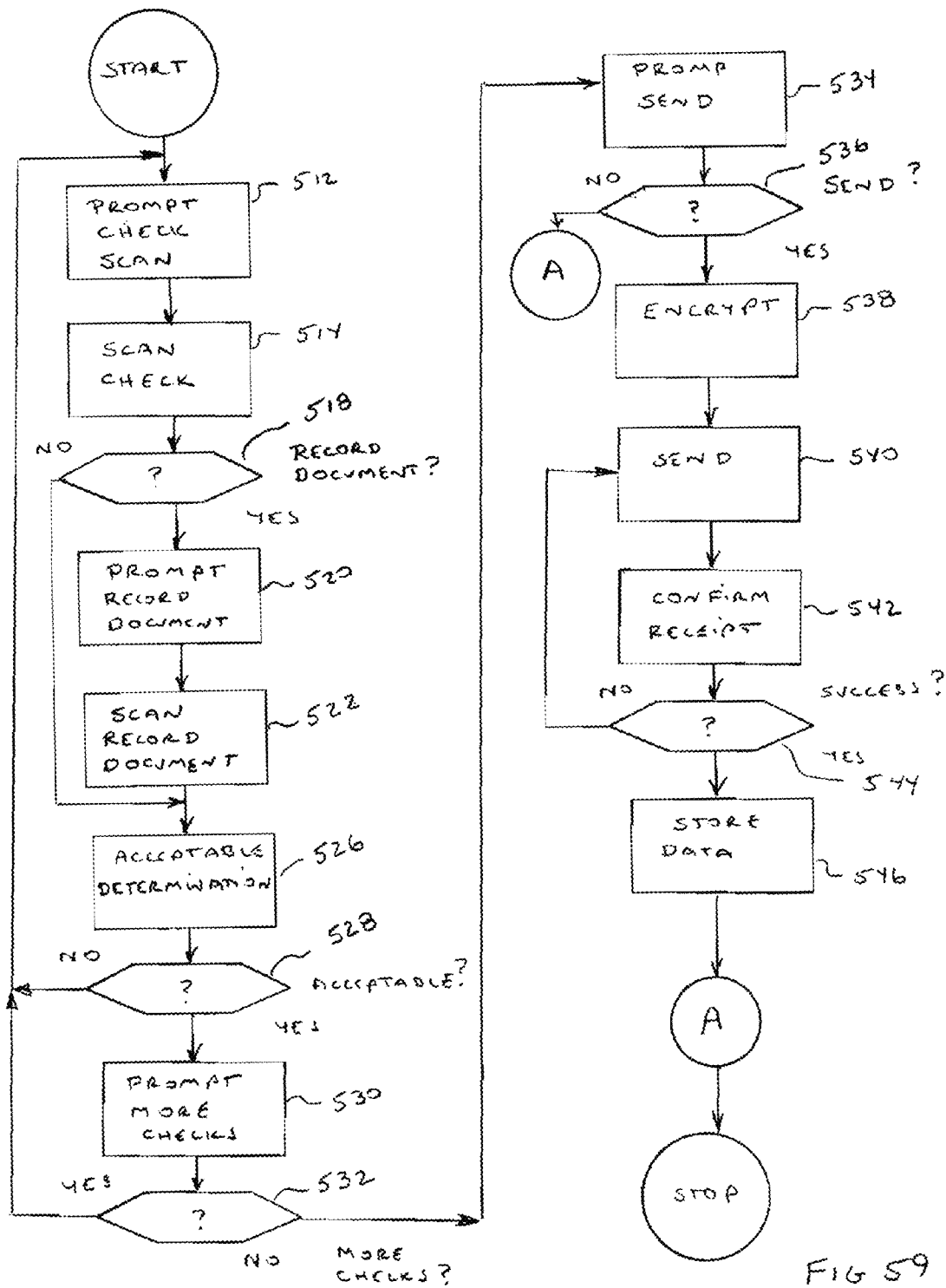
FIG. 59 is a schematic view of exemplary logic flow carried out during operation by a portable device in reading record data and check data which is provided to a vendor.
Figure 63:
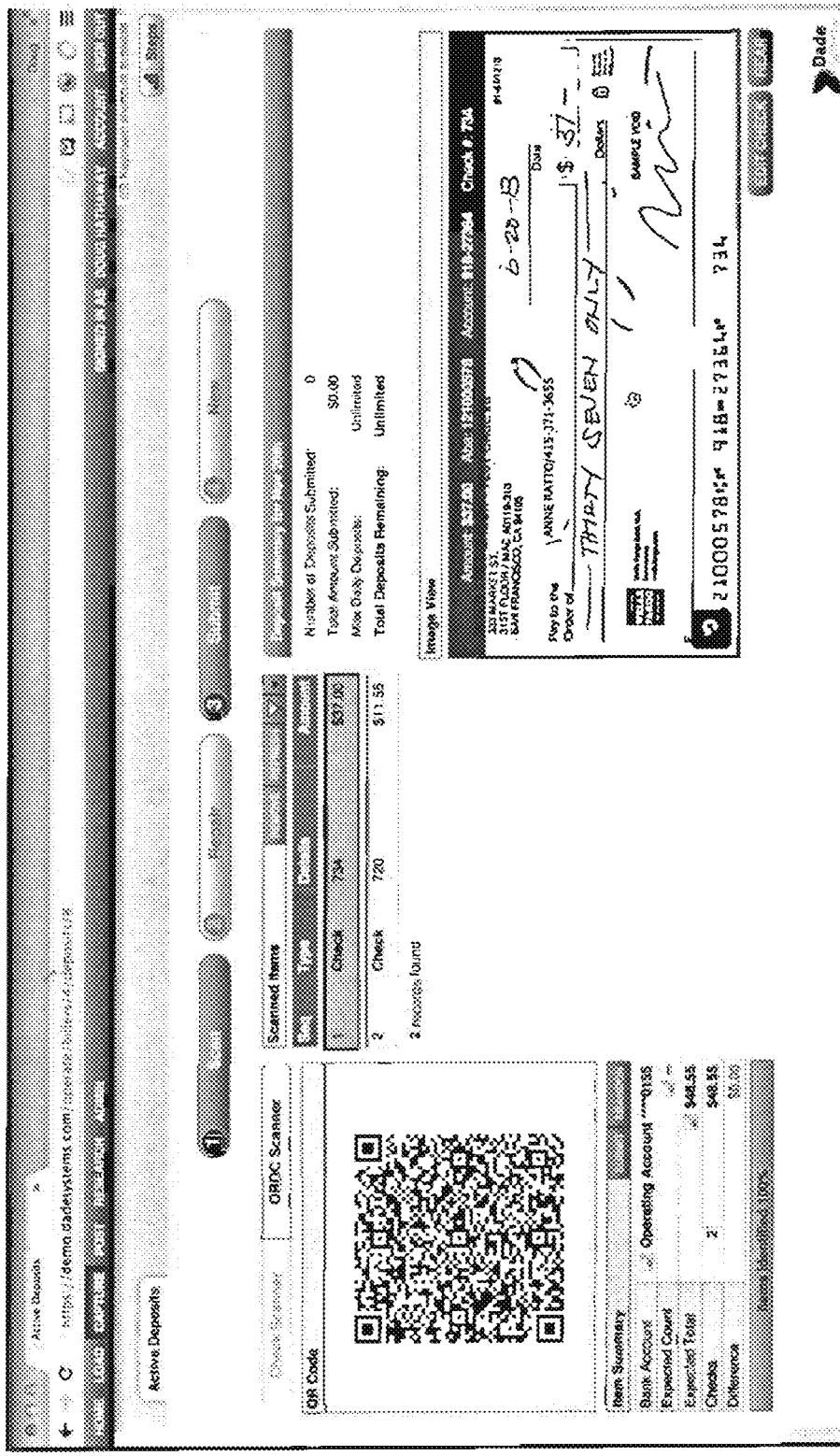
FIGS. 63-65 are exemplary outputs from a payee terminal in connection with the deposit and presentment of check data.
Figure 64:
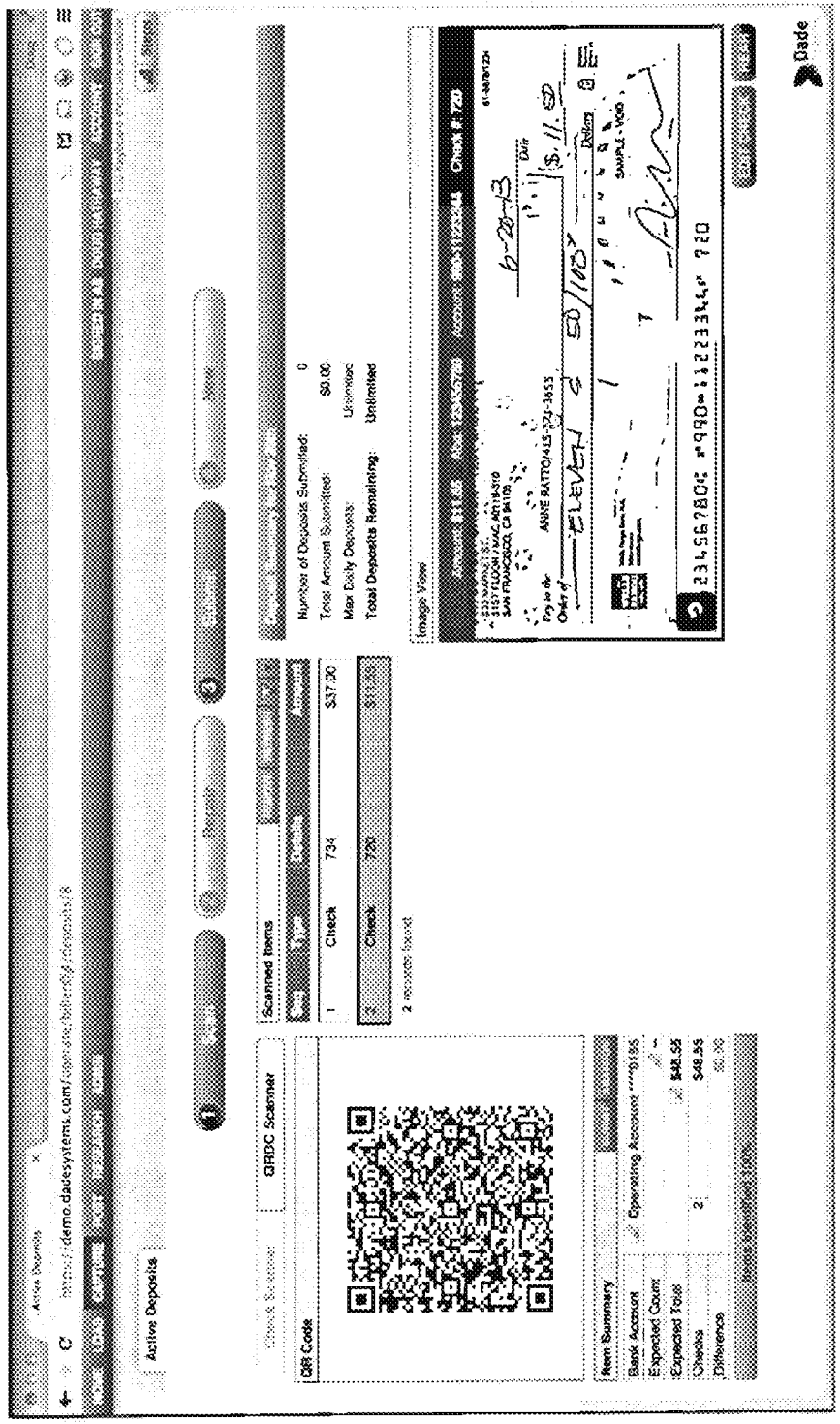
Figure 65:
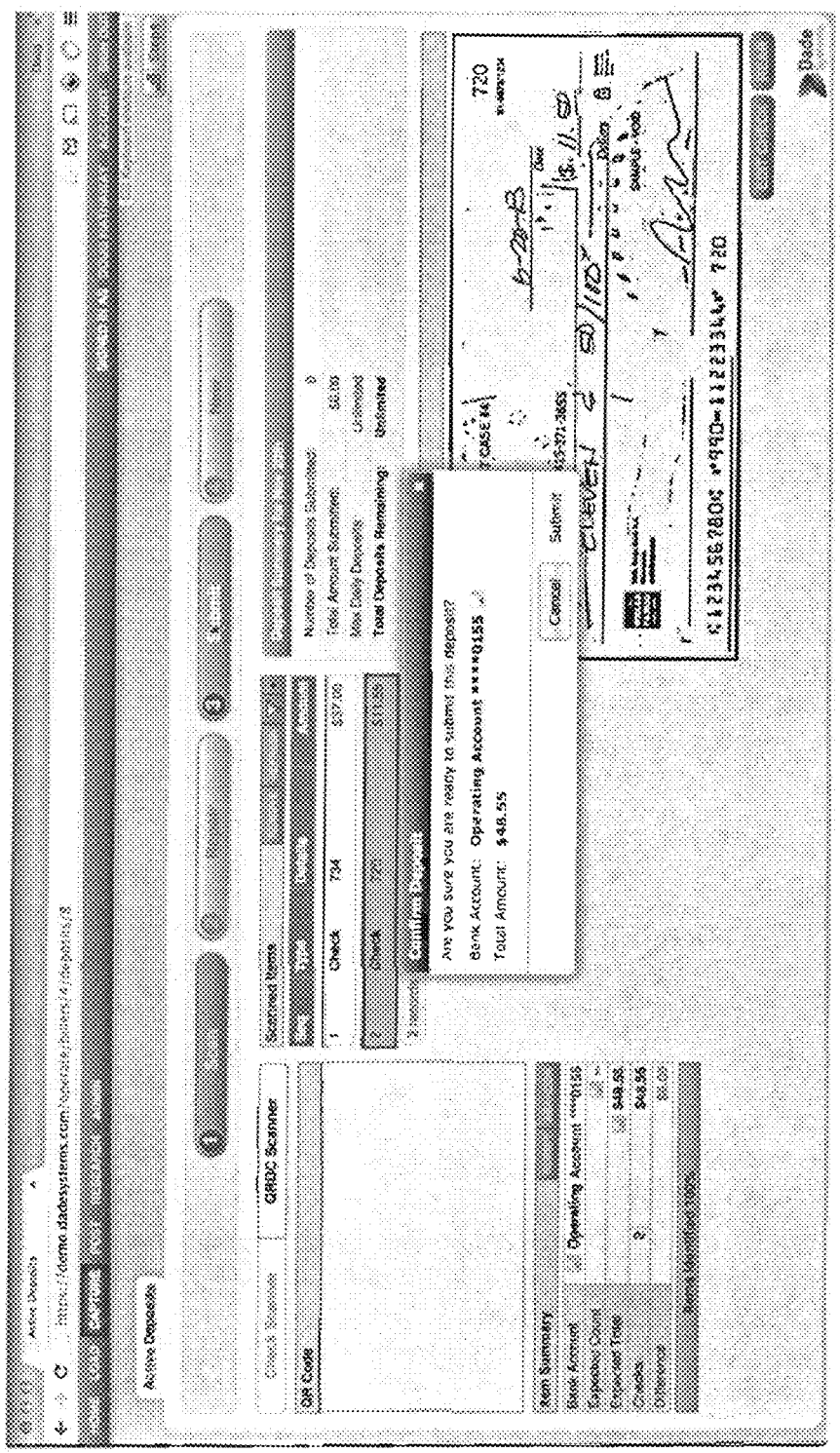

FIGS. 53 and 59 represent the use and operation of the portable device 494 in reading and capturing check data from checks and record document data in connection with making payments to a vendor by check. As represented in the logic flow carried out by the portable device as represented in FIG. 59, when a purchaser wishes to operate the portable device 494 in order make payment to the vendor, the purchaser starts by starting the app and providing inputs in response to presented selections on the display of the portable device to indicate that the purchaser wishes to present a payment to the vendor. The circuit executable instructions stored in the one or more data stores of the portable device cause the one or more processor circuits to provide outputs through the display of the portable device that prompt the individual acting on behalf of the purchaser to read or scan a check prepared by the purchaser to make a payment to the vendor. This is represented in FIG. 59 by a step 512. The portable device 494 then operates in a manner like that previously discussed to read the check data from a check prepared by the purchaser to make the payment to the vendor. This is represented in a step 514. This may be done in exemplary embodiments by the portable device 494 operating to read through operation of the digital camera at least the front side of the check that represents the payment to the vendor. This is represented by the portable device capturing an image of a check 516 which is shown schematically in FIG. 53. In the exemplary embodiment both the front and the back side of the check are read and the images thereof are captured by the portable device.

In some arrangements, the payment may have an associated record document which corresponds to the goods provided by the vendor to the purchaser for which payment is being made. As represented in FIG. 49, the processor executable instructions of the portable device in a step 518 prompts the user for an input to indicate whether the purchaser has a record document which is also to be read in conjunction with the payment. If the purchaser indicates that they have a record document, the portable device provides outputs that prompt a user to use the portable device to read the record document. This is represented in a step 520. The record document is read and an image thereof captured by the portable device in a manner similar to the capture of the check images. This is represented by a step 522. As represented by the exemplary record document 524 shown in FIG. 53, the record documents may include information that is usable to identify the goods that have been provided by the vendor to the purchaser and for which payment is being made. The exemplary record documents may include information such as a vendor identifier, a purchaser identifier, an identifier of the goods such as the particular shipment or lot, date of delivery, the goods type, quantity or other information which is usable to identify the goods for which payment is being made or other information. The record document may also include amount data associated with the particular goods for which payment is expected from the purchaser. Record documents may include other or different information which is useful in connection with identification of the particular transaction for which payment is being presented. Further as represented in FIG. 53, the record documents may include bar codes or other indicia which include data which may identify the particular goods or other parameters which is useful in identifying and processing the payment. For example in some arrangements the invoices may include a QR code in a portion thereof that can be read by the portable device 494 to obtain the various items of information that are associated with the goods provided by the vendor and for which the check is being presented in order to make payment. Of course this approach is exemplary and numerous other approaches may be used.

Alternatively if in step 518 the user provides an input that no record document is associated with the particular check, the functions associated with steps 520 and 522 are not carried out by the portable device. As can be appreciated, in some embodiments the payee terminal or other computer may include capabilities for identifying the particular goods with which a payment by a purchaser is associated without the need for any additional information beyond the information included on the check. This may include, for example, the amount of the check, the purchaser's account data as derived from the micr line, memo information that is read from the front of the check or other information that will enable the vendor and their associated payee terminal and other systems to identify the goods for which the payment is being made.

As represented in FIG. 59, after the check data including the image of the check and record document data, if applicable, have been read, the exemplary portable device makes the determination that the check data that has been captured corresponds to a vendor acceptable check from a purchaser for which payment by the vendor is properly received. This determination may be made by the processor circuit in the portable device reviewing the check data and causing the check data to be compared to data stored in the at least one data store. For example in some exemplary arrangements, the device may operate to determine if identification data stored in the at least one data store corresponds to data included on the check. This may include analyzing information such as the payee data on the check to determine if the characters therein correspond to the vendor to whom the check should be payable. Alternatively in some arrangements, such determination may include analysis of data included on the check corresponds to the payee, which data has been included in data downloaded to the portable terminal in the QR code or SMS message sent by the vendor. Alternatively the determination may include an evaluation of record document data to determine if such record document data includes vendor identifying data which corresponds to the vendor. Alternatively in some arrangements, the determination may include an evaluation of purchaser identifying data, goods identifying data, shipment identifying data or other values to verify that they correspond to values that correspond or are formatted or otherwise presented in a manner that corresponds to the necessary format or requirements for the processing of the check payment to the vendor. In some embodiments the compared data may be entirely at the portable device and in other embodiments some data may be remotely accessed by the device. Multiple different identifier values or other values may be compared to stored data for purposes of making the acceptability determination which is represented in a step 526.

Further in exemplary arrangements, step 526 may include evaluation of image data to verify that the image quality and the characters of the check (and if appropriate record documents) are sufficiently distinguishable so as to enable the processing thereof. Circuit executable instructions included in the at least one data store may operate to verify that there is sufficient contrast between the light and dark pixels which make up the read check data (and document data) in the areas of important values so as to make the check image (and record document information) suitable for processing by the vendor and the check presentment system through which the check must pass in order to be paid. Of course numerous or additional evaluation activities may be involved in making the acceptability determination represented by step 526 depending on the vendor, the check presentment system and/or the record documents involved.

As represented by the step 528, if the read documents are determined to be acceptable in step 526, the user of the portable device 494 is then prompted to provide an input indicating whether there are additional checks and/or record documents that need to be read in connection with the transaction. This is represented in a step 530. Alternatively if in step 528 the check and if appropriate, record document scanned are not acceptable, the portable device operates in accordance with its programmed instructions to prompt the user to retry reading the check and/or record documents involved. Further in exemplary arrangements the user has the option to discontinue the operation of the application and to end the reading of the documents. Assuming that the user proceeds to retry the reading of the check and record document, if applicable, the portable device repeats the steps previously discussed.

In step 530, if the user indicates that there are more checks or record documents associated with the transaction, the portable device operates to repeat the steps previously carried out for the prior check and record document with the additional checks and record documents. This is represented by a step 532. Alternatively if in step 532 there are no more checks or record documents to be read in connection with the transaction, the user of the portable device is provided with a prompt through the display of the device to indicate whether they are ready to send the read check and record document data to the vendor. This is represented in a step 534.

As represented by a step 536, if the user indicates that they do not wish to send the check and record data to the vendor, the circuit executable instructions operating in the portable device end the transaction. Alternatively if the user indicates that they are ready to send the check and applicable record documents, the circuitry operates to encrypt the check and record data using the private key that was provided or otherwise resolved from the QR code or SMS message received by the portable device. This is represented by a step 538.

Once the data has been encrypted in step 538, the portable device operates to send the check and associated record document data if applicable, to the computer 340. This is represented by a step 540 as well as FIG. 60. The portable device and the computer 340 operate to communicate in a manner like that previously discussed. The computer 340 if it has properly received the check data and record data if applicable, communicates with the portable device to indicate whether the messages were successfully received. The portable device operates to analyze the messages and make a determination which is reflected in step 542 concerning whether the data has been successfully communicated. If in a step 544 it is determined that the communication of the check and record data was not successful, another attempt is made by the portable device to communicate this data. Alternatively if in step 544 the determination is made that communication was successful, the communicated information and/or data corresponding to the communication is stored in at least one data store of the portable device. This is represented by the step 546. Operation of the mobile application on the portable device is then discontinued.

In the exemplary arrangement once the check and record data has been communicated to the computer 340, it is accessible by the payee terminal 346. This is represented in FIG. 60 which shows the display of the payee terminal presenting visual representations of the checks and the associated record documents that were captured through operation of the portable device. The operator of the payee terminal is then enabled to review the check data and the record document data to verify that it is consistent and corresponds to amounts owed to the vendor. Further in exemplary embodiments additional data which has been resolved from the check data and record document data may be presented and/or automatically processed to facilitate the review by the operator of the payee terminal. This may include tracking the status of customer accounts and managing deposits to the merchant's financial accounts like that carried out in the embodiments previously described.

As can be appreciated, the checks that are read through operation of the portable device are not endorsed by the vendor at the time that they are sent to the vendor by the customer. In order to facilitate the processing of the checks through the check presentment system, the exemplary payee terminal 346 is operable by a user to apply an endorsement to the images of checks on behalf of the vendor. In the exemplary embodiments, such endorsement may include the electronic application of a signature or stamp into the endorsement area of the image of the rear side of the check. This is represented by FIG. 41.

Once the received checks are determined by the operator of the payee terminal to be acceptable, the payee terminal may be operated to carry out functions like those previously described in causing the checks to be sent to a check presentment network 372 for payment. The check deposit information may also be sent to the vendor's financial institution such as institution 364 so that the amount of the check or checks can be deposited into the vendor's account. Further as previously discussed, exemplary embodiments may also enable the payee terminal to be operated to track and credit the accounts of the purchaser so as to accurately reflect the purchaser's payment status and other account status.

In alternative arrangements, the portable device may be operable by a person other than a representative of the purchaser. For example in some arrangements, a sales person, delivery person or other entity may have responsibility for collecting payments for the vendor or multiple vendors. In such arrangements, the person responsible for collecting the funds may operate the mobile device in the manner like that previously discussed to read check data and record document data provided by purchasers in making payment for goods that have been delivered by the vendor. In such arrangements, the individual who is responsible for the collection or the company for which they work may also be involved in the transactions such as by receiving revenue or other value in exchange for collecting the funds due the vendor. In such cases the systems may operate to include data concerning payments that have been obtained by the collection entity so that such payments or credits may be issued and paid as appropriate.

Of course it should be understood that the operations, functions and capabilities of the described systems are exemplary and in other embodiments, other features, functions, operations and capabilities may be provided.

Thus the exemplary systems and devices controlled responsive to data bearing records that have been described herein achieve desirable capabilities, eliminate difficulties encountered in the use of prior devices and systems and attain the useful results described herein.

In the foregoing description, certain terms have been used in connection with describing exemplary embodiments for purposes of brevity, clarity and understanding. However, no unnecessary limitations are to be implied therefrom because such terms are used for descriptive purposes and are intended to be broadly construed. Moreover the descriptions and illustrations herein are by way of examples and the inventions are not limited to the particular features shown and described.

Further it should be understood that elements, features, relationships, devices and other aspects described in connection with one exemplary embodiment may be utilized in connection with other exemplary embodiments such that numerous different arrangements, functions and capabilities may be carried out. Numerous different aspects of described embodiments may be used together or in different combinations to achieve useful results.

Having described the features, discoveries and principles of the exemplary embodiments, the manner in which they are constructed and operated, and the advantages and useful results attained, the new and useful structures, devices, elements, arrangements, parts, combinations, systems, equipment, operations, methods, processes and relationships are set forth in the appended claims.

The invention claimed is:

1. In a system including
  a portable device operative to cause financial transfers responsive at least in part to data read from data bearing records, wherein the device includes:
    at least one reader, wherein the at least one reader is configured to read at each of a plurality of places of delivery
      financial checks, wherein the financial checks correspond to payments by purchasers for goods delivered at places of delivery on behalf of at least one vendor by an individual associated with the device and who transports the device to the places of delivery, and
      invoices corresponding to charges for goods delivered to purchasers at such places of delivery on behalf of the at least one vendor,
    a display,
    at least one input device, wherein the at least one input device is operative to receive inputs from the individual,
    at least one wireless communication interface,
    at least one portable device processor circuit in operative connection with at least one data store,
    wherein the at least one portable device processor circuit is operative to cause,
      the at least one reader to read at a place of delivery invoice data included in an invoice associated with a delivery of goods on behalf of a vendor to a purchaser by the individual, and
      check data included on a financial check received by the individual from the purchaser in payment for the delivered goods,
      the invoice data and the check data to be wirelessly sent by the at least one wireless communication interface from the portable device,
  apparatus comprising:
    server circuitry remote from the portable device, wherein the server circuitry is operative to cause
      the server circuitry to receive the invoice data and the check data,
      a determination to be made that the invoice data corresponds with stored data associated with a purchaser to whom the delivery of goods is authorized to be made,
      a check amount corresponding to the check data to be credited to a vendor account associated with the vendor.

2. The apparatus according to claim 1
wherein the portable device further includes
- a card reader, wherein the card reader is configured to read card data from cards associated with purchasers, wherein the at least one portable device processor circuit is operative to cause
  - the card reader to read card data from a card associated with the purchaser,
- wherein the server circuitry is further operative to cause the server circuitry to receive the card data,
  - a further determination to be made that the card data corresponds to a purchaser financial account from which a payment can be received,
  - responsive at least in part to the further determination, the purchaser financial account to be charged and the at least one vendor account to be credited with a payment amount corresponding to the payment from the purchaser financial account.

3. The apparatus according to claim 1
wherein the invoice data includes an invoice amount,
wherein the at least one input device is operative to receive at least one invoice input corresponding to the invoice amount,
wherein the server circuitry is further operative responsive at least in part to the determination, to cause
- comparison of the at least one invoice input and the invoice amount,
- the invoice amount to be charged to a purchaser account associated with the purchaser.

4. The apparatus according to claim 1
wherein the check data includes purchaser financial account number data,
wherein the financial account number data corresponds to
- a purchaser financial account on which the check is drawn, and a check amount,
wherein the server circuitry is further operative responsive at least in part to the determination, to cause the check amount to be deducted from the purchaser financial account.

5. The apparatus according to claim 1
wherein the check data includes an electronic representation of a visual image of at least a portion of one side of the check and wherein the invoice data includes an electronic representation of a visual image of at least a portion of one side of the invoice.

6. The apparatus according to claim 1
wherein the check data includes an electronic representation of at least a portion of one side of the check.

7. The apparatus according to claim 1
wherein the invoice data includes a transaction identifier, wherein the transaction identifier corresponds to the delivery of goods,
and wherein the determination is made by the server circuitry responsive at least in part to the transaction identifier.

8. The apparatus according to claim 7
wherein the invoice includes at least one of a remittance advice, a payment stub or a delivery acknowledgment that includes the transaction identifier.

9. The apparatus according to claim 4
wherein the invoice data includes an invoice amount,
wherein the server circuitry is further operative to cause
- a comparison of the invoice amount and the check amount,
- responsive at least in part to the check amount exceeding the invoice amount, an excess amount by which the check amount exceeds the invoice amount, to be applied to another invoice payable by the purchaser to the vendor.

10. The apparatus according to claim 1
wherein the at least one reader is configured to read credit item data from at least one credit item, wherein the credit item data includes at least one credit item amount,
wherein the at least one portable device processor circuit is operative to cause the credit item data to be wirelessly sent by the at least one wireless communication interface from the portable device,
wherein the server circuitry is operative to cause
- the server circuitry to receive the credit item data,
- responsive at least in part to the determination, the at least one credit item amount to be credited to the purchaser account.

11. The apparatus according to claim 10
wherein the at least one credit item includes at least one of
- a rebate coupon,
- a credit memo,
- a returned goods acknowledgment,
- a promotional offer,
- a discount offer.

12. The apparatus according to claim 1
wherein the invoice data included on the invoice includes machine readable indicia including a bar code,
wherein the server circuitry is operative to resolve at least one of a purchaser, an invoice amount and goods associated with the delivery, responsive at least in part to the bar code.

13. The apparatus according to claim 1
wherein the at least one input device is configured to receive at least one vendor identifying input, and the at least one portable device processor circuit is operative to cause the at least one wireless communication interface to wirelessly transmit data corresponding to the at least one vendor identifying input,
wherein the server circuitry is operative to cause
- the server circuitry to receive the data corresponding to the at least one vendor identifying input,
- the determination to be made responsive at least in part to the data corresponding to the at least one vendor identifying input.

14. The apparatus according to claim 1
wherein the at least one input device is configured to receive at least one purchaser identifying input, and the at least one portable device processor circuit is operative to cause the at least one wireless communication interface to wirelessly transmit data corresponding to the at least one purchaser identifying input,
wherein the server circuitry is operative to cause
- the server circuitry to receive the data corresponding to the at least one purchaser identifying input,
- the determination to be made responsive at least in part to the at least one purchaser identifying input.

15. The apparatus according to claim 1
wherein the portable device further includes a global positioning system (GPS) receiver, wherein the GPS receiver is operative to receive GPS signals,
wherein the at least one portable device processor circuit is operative to cause
- a delivery location to be resolved for the delivery responsive at least in part to the operation of the GPS receiver, and the at least one wireless communication device to wirelessly transmit data corresponding to the delivery location,
wherein the server circuitry is operative to cause
the server circuitry to receive the data corresponding to the delivery location,
the determination to be made responsive at least in part to the data corresponding to the delivery location.

16. The apparatus according to claim 1
wherein the at least one reader is configured to read goods identifying indicia, wherein the goods identifying indicia is connected to at least one the delivered goods or packaging of delivered goods,
wherein the at least one portable device processor circuit is operative to cause the at least one wireless interface to wirelessly transmit data corresponding to the goods identifying indicia,
wherein the server circuitry is operative to cause
the data corresponding to the goods identifying indicia to be received by the server circuitry,
responsive at least in part to the data corresponding to the goods identifying indicia, a cost to be determined for delivered goods associated with the goods identifying indicia,
the cost to be charged to a purchaser account.

17. The apparatus according to claim 1
wherein the device is configured to be carried by the individual,
wherein the goods include food items,
wherein the purchaser includes a restaurant operator,
wherein the at least one wireless interface is operative to wirelessly transmit at least one electronic representation of at least one visual image of at least one of at least one side of the invoice or the check,
wherein the server circuitry is operative to cause the server circuitry to receive the at least one electronic representation.

18. In a system including:
a portable device operative to cause financial transfers responsive at least in part to data read from data bearing records, wherein the device includes:
at least one reader, wherein the at least one reader is configured to read at each of a plurality of places of delivery,
financial checks, wherein the financial checks correspond to payments by purchasers for goods delivered at places of delivery on behalf of at least one vendor by an individual associated with the device and who transports the device to the places of delivery, and
records corresponding to goods delivered to purchasers at such places of delivery on behalf of the at least one vendor,
at least one input device, wherein the at least one input device is operative to receive inputs from the individual,
at least one wireless communication interface,
at least one portable device processor circuit in operative connection with at least one data store,
wherein the at least one portable device processor circuit is operative to cause,
the at least one reader to read at a place of delivery, record data included in a record associated with a delivery of goods on behalf of a vendor to a purchaser by the individual, and
check data included on a financial check received by the individual from the purchaser in payment for the delivered goods,
the record data and the check data to be wirelessly sent by the at least one wireless communication interface from the portable device,
apparatus comprising:
server circuitry remote from the portable device,
wherein the server circuitry is operative to cause
the server circuitry to receive the record data and the check data,
a determination to be made that the record data has a corresponding relationship with stored data associated with a purchaser to whom the delivery of goods is authorized to be made,
responsive at least in part to the determination, a check amount corresponding to the check data to be credited to a vendor account associated with the vendor.

19. The apparatus according to claim 18
wherein the record data includes data included on an invoice associated with the delivery of goods.

20. In a system including
a portable device operative to cause financial transfers responsive at least in part to data read from data bearing records, wherein the device includes:
at least one reader, wherein the at least one reader is configured to read at each of a plurality of places of delivery
financial checks, wherein the financial checks correspond to payments by purchasers for goods delivered at places of delivery on behalf of at least one vendor by an individual associated with the device and who transports the device to the places of delivery, and
invoices corresponding to charges for goods delivered to purchasers at such places of delivery on behalf of the at least one vendor,
a display,
at least one input device, wherein the at least one input device is operative to receive inputs from the individual,
wherein the at least one input device is configured to receive at least one received cash amount input, wherein the received cash amount input corresponds to a received cash amount when received by the individual from the purchaser in connection with the delivery of goods,
at least one wireless communication interface,
at least one portable device processor circuit in operative connection with at least one data store,
wherein the at least one portable device processor circuit is operative to cause,
the at least one reader to read at a place of delivery invoice data included in an invoice associated with a delivery of goods on behalf of a vendor to a purchaser by the individual, and
check data included on a financial check when received by the individual from the purchaser in connection with the delivered goods,
the invoice data, and applicable check data and data corresponding to the received cash amount input to be wirelessly sent by the at least one wireless communication interface from the portable device,
apparatus comprising:

server circuitry remote from the portable device,
wherein the server circuitry is operative to cause
the server circuitry to receive the invoice data, and the applicable check data and data corresponding to the received cash amount input,
a determination to be made that the invoice data corresponds with stored data associated with a purchaser to whom the delivery of goods is authorized to be made,
responsive at least in part to the determination, the received cash amount to be credited to the vendor account.

21. In a system including
a portable device operative to cause financial transfers responsive at least in part to data read from data bearing records, wherein the device includes:
at least one reader, wherein the at least one reader is configured to read documents at each of a plurality of places of delivery, including
financial checks, wherein the financial checks correspond to payments by purchasers for goods delivered at places of delivery on behalf of at least one vendor by an individual associated with the device and who transports the device to the places of delivery, and
invoices corresponding to charges for goods delivered to purchasers at such places of delivery on behalf of the at least one vendor,
a display,
at least one input device, wherein the at least one input device is operative to receive inputs from the individual,
at least one wireless communication interface,
at least one portable device processor circuit in operative connection with at least one data store,
wherein the at least one portable device processor circuit is operative to cause,
the at least one reader to read at a place of delivery invoice data included in an invoice document associated with a delivery of goods on behalf of a vendor to a purchaser by the individual, and check data included on a financial check document received by the individual from the purchaser in payment for the delivered goods,
the invoice data and the check data to be wirelessly sent by the at least one wireless communication interface from the portable device,
apparatus comprising:
server circuitry remote from the portable device, wherein the server circuitry is operative to cause
the server circuitry to receive the invoice data and the check data,
a determination to be made that the invoice data corresponds with stored data associated with a purchaser to whom the delivery of goods is authorized to be made,
a check amount corresponding to the check data to be credited to a vendor account associated with the vendor.

22. The apparatus according to claim 21
wherein the invoice document includes at least one of a remittance advice, a payment stub or a delivery acknowledgment.

23. The apparatus according to claim 20
wherein the server circuitry is operative to cause data corresponding to the received cash amount to be sent to a network address associated with the purchaser.

* * * * *